US010963804B1

(12) United States Patent
Ash et al.

(10) Patent No.: US 10,963,804 B1
(45) Date of Patent: Mar. 30, 2021

(54) ANALYTIC SYSTEM WITH EXTRAPOLATION CONTROL IN INTERACTIVE GRAPHICAL PREDICTION EVALUATION

(71) Applicant: SAS Institute Inc., Cary, NC (US)

(72) Inventors: Jeremy Ryan Ash, Raleigh, NC (US); Christopher Michael Gotwalt, Raleigh, NC (US); Laura Carmen Lancaster, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/130,008

(22) Filed: Dec. 22, 2020

Related U.S. Application Data

(60) Provisional application No. 63/046,858, filed on Jul. 1, 2020.

(51) Int. Cl.
| | | |
|---|---|---|
| *G10L 19/02* | (2013.01) | |
| *H04L 29/08* | (2006.01) | |
| *G06F 9/451* | (2018.01) | |
| *H04W 4/60* | (2018.01) | |
| *G01S 17/89* | (2020.01) | |
| *G06N 7/00* | (2006.01) | |
| *G06F 17/16* | (2006.01) | |

(52) U.S. Cl.
CPC ............... *G06N 7/00* (2013.01); *G06F 17/16* (2013.01)

(58) Field of Classification Search
CPC .................................. G06N 7/00; G06F 17/16
USPC ........................................................ 706/1–62
See application file for complete search history.

(56) References Cited

U.S. PATENT DOCUMENTS

| | | | |
|---|---|---|---|
| 7,388,973 B2* | 6/2008 | Fidrich | G06T 7/12 378/21 |
| 2008/0228080 A1* | 9/2008 | Arditi | A61B 8/481 600/458 |
| 2016/0261987 A1* | 9/2016 | Jovicic | H04W 4/024 |
| 2017/0041407 A1* | 2/2017 | Wilbur | H04W 4/60 |
| 2018/0059248 A1* | 3/2018 | O'Keeffe | G01S 7/4811 |

(Continued)

OTHER PUBLICATIONS

F-Distribution, Wikipedia, retrieved from https://en.wikipedia.org/w/index.php?title=F-distribution&oldid=979585570, last edited on Sep. 21, 2020.

(Continued)

*Primary Examiner* — Brandon S Cole
(74) *Attorney, Agent, or Firm* — Bell & Manning, LLC

(57) ABSTRACT

Graphical interactive prediction evaluation is provided. An extrapolation threshold value is computed using an extrapolation threshold function with an explanatory variable value of each of a plurality of explanatory variables read for each observation vector of a plurality of observation vectors. A model is fit to the observation vectors. Model results are presented in a display that include a first value for each explanatory variable. An indicator of a second value of at least one of the explanatory variables that is different from the first value is received. An extrapolation value is computed using an extrapolation function with the second value and the first value of others of the explanatory variables. The extrapolation value is compared to the extrapolation threshold value. An extrapolation indicator is presented in the display when the comparison indicates that the second value is an extrapolation.

30 Claims, 40 Drawing Sheets

(56) References Cited

U.S. PATENT DOCUMENTS

2019/0204423 A1* 7/2019 O'Keeffe ............... G01S 7/4817
2020/0277573 A1* 9/2020 Simpson-Abelson ......................
A61K 39/0011

OTHER PUBLICATIONS

Hotelling's T-squared distribution, Wikipedia, retrieved from https://en.wikipedia.org/w/index.php?title=Hotelling$27s_T-square_distribution&oldid-987943678, last edited Nov. 10, 2020.

JMP Fitting Linear Models, Version 15 JMP, A Business Unit of SAS, Chapters 2, 6, Appendix A and B, 2019, SAS Institute Inc., Cary, NC.

Leverage (statistics) Wikipedia, retrieved from https://en.wikipedia.org/w/index.php?title=Leverage_(statistics)&oldid=984496383, last edited on Oct. 20, 2020.

Mathea et al., "Chemoinformatic Classification Methods and their Applicability Domain," Molecular Informatics, 2016, 35, 160-180.

Ordinary least squares, Wikipedia, retrieved from https://en.wikipedia.org/w/index.php?title=Ordinary_least_squares&oldid=988180709, last edited on Nov. 11, 2020.

Schafer et al., "Statistical Applications in Genetics and Molecular Biology, A Shrinkage Approach to Large-Scale Covariance Matrix Estimation and Implications for Functional Genomics," vol. 4, Issue 1, 2005, Article 32.

JMP Multivariate Methods, Version 15 JMP, A Business Unit of SAS, Chapters 1-5, Appendix A B, and C, 2019, SAS Institute Inc., Cary, NC.

JMP Predictive and Specialized Modeling, Version 15 JMP, A Business Unit of SAS, Chapters 2, 3, 5, 6, 9, 10, 14, 15, 23, 2020, SAS Institute Inc., Cary, NC.

JMP Profilers, Version 15, JMP, A Business Unit of SAS, Chapters 2 and 3, 2020, SAS Institute Inc., Cary, NC.

* cited by examiner

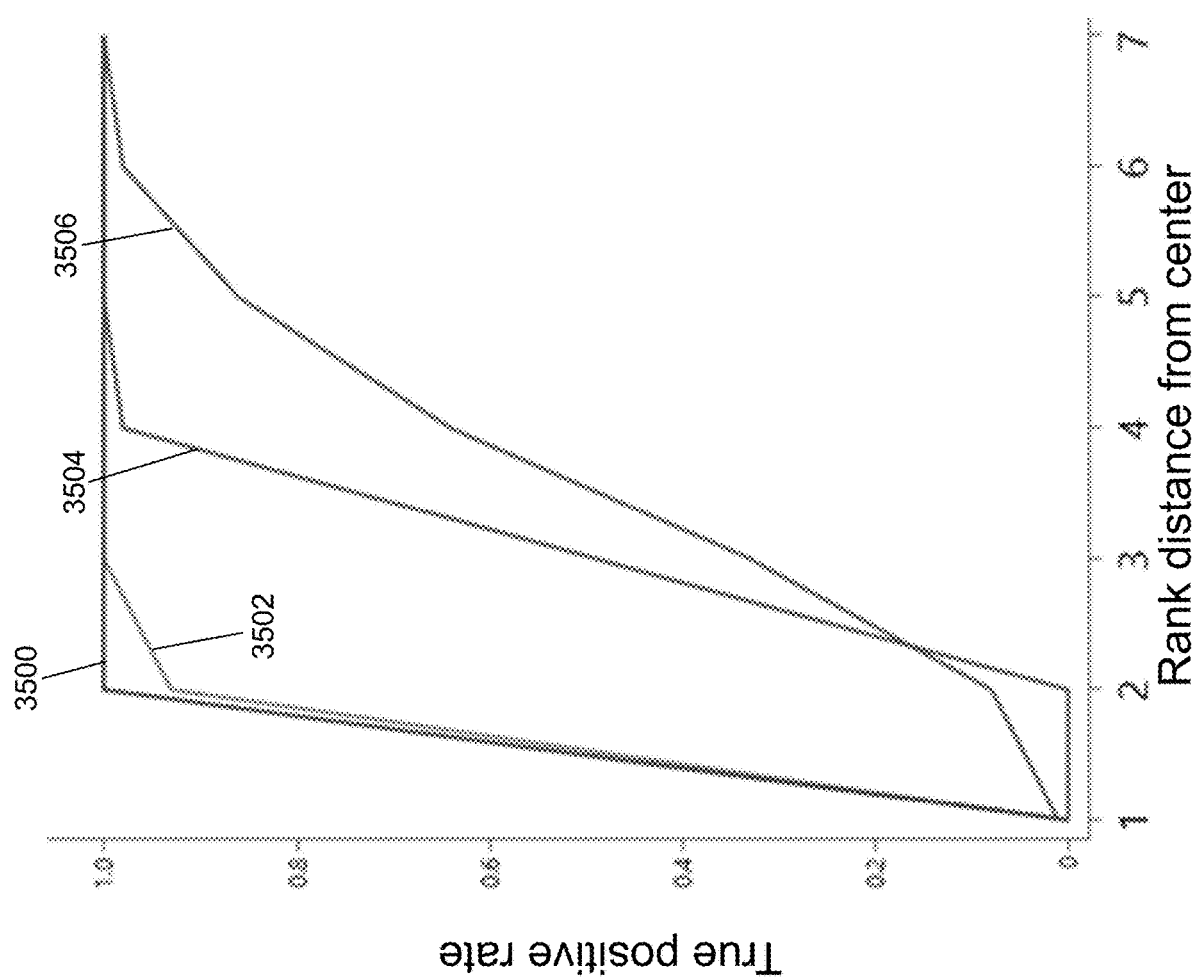

US 10,963,804 B1

ANALYTIC SYSTEM WITH EXTRAPOLATION CONTROL IN INTERACTIVE GRAPHICAL PREDICTION EVALUATION

CROSS-REFERENCE TO RELATED APPLICATIONS

The present application claims the benefit of 35 U.S.C. § 119(e) to U.S. Provisional Patent Application No. 63/046,858 filed on Jul. 1, 2020, the entire contents of which are hereby incorporated by reference.

BACKGROUND

In training or fitting a model, optimal settings or model exploration may extrapolate beyond the correlation structure of the data used to train or fit the model. The user may be unaware of the extrapolation. For example, a user may be exploring model results presented graphically in a graphical user interface and extrapolate beyond the correlation structure of the data without being aware that the exploration is in an extrapolated space. Extrapolation is risky for a number of reasons:
  predictions rely on model assumptions that may become more invalid the further the prediction is from the original data,
  prediction uncertainty increases the further the prediction is from the original data, and
  extrapolations may involve combinations of the data that cannot be realized physically. For example, the temperature and pressure of a system are positively correlated. It may not be physically possible to set a temperature variable value to an extremely high value, and a pressure variable value to an extremely low value.

SUMMARY

In an example embodiment, a non-transitory computer-readable medium is provided having stored thereon computer-readable instructions that, when executed by a computing device, cause the computing device to provide interactive prediction evaluation. A dataset that includes a plurality of observation vectors is read. Each observation vector includes an explanatory variable value for each of a plurality of explanatory variables and a response variable value of a response variable. An extrapolation threshold value is computed using an extrapolation threshold function with the explanatory variable value of each of the plurality of explanatory variables read for each observation vector. A model is fit to the plurality of observation vectors to describe the response variable value as a function of the explanatory variable value for each of the plurality of explanatory variables of each observation vector. Fit model results are presented in a window of a display. The fit model results include a first value for each of the plurality of explanatory variables. An indicator of a second value of at least one of the explanatory variables that is different from the first value of a respective explanatory variable is received. An extrapolation value is computed using an extrapolation function with the second value of the respective explanatory variable and the first value of others of the plurality of explanatory variables. The computed extrapolation value is compared to the computed extrapolation threshold value. An extrapolation indicator is presented in the window of the display when the comparison indicates that the second value of the respective explanatory variable is an extrapolation relative to the explanatory variable value of each of the plurality of explanatory variables read for each observation vector.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to provide interactive prediction evaluation.

In yet another example embodiment, a method of interactive prediction evaluation is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 35A shows a true positive rate as a function of a rank distance from a center computed using the prediction evaluation application with the first dataset, 20 explanatory variables 10 of which are categorical variables, and a rank of 10 for samples sizes from 20 to 1,000.

DETAILED DESCRIPTION

Figure 1:
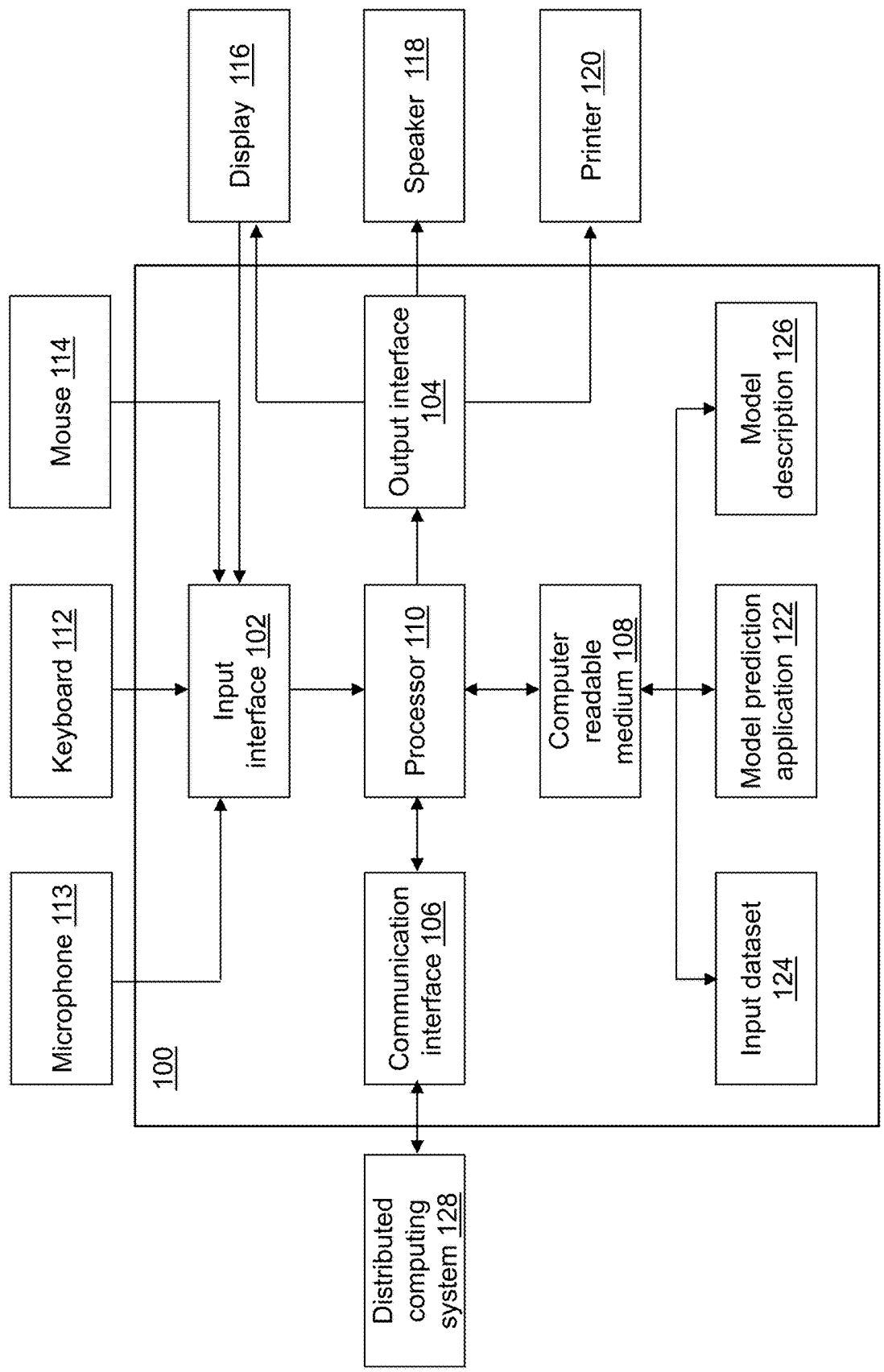
FIG. 1 depicts a block diagram of a prediction evaluation device in accordance with an illustrative embodiment.

Referring to FIG. 1, a block diagram of a prediction evaluation device 100 is shown in accordance with an illustrative embodiment. Prediction evaluation device 100 provides interactive streamlined prediction evaluation and model selection. Prediction evaluation device 100 may include an input interface 102, an output interface 104, a communication interface 106, a non-transitory computer-readable medium 108, a processor 110, a prediction evaluation application 122, an input dataset 124, and a model description 126. Prediction evaluation application 122 provides an interactive and intuitive graphical user interface for users to build, evaluate, and select models using data stored in input dataset 124. The trained model or fit model may be stored in model description 126 for use in predicting a new response. For simplicity, a trained model is already referred to as a fit model herein. Fewer, different, and/or additional components may be incorporated into prediction evaluation device 100.

Prediction evaluation application 122 includes an extrapolation control that allows users to automatically avoid graphically exploring predictions that should be considered an extrapolation beyond input dataset 124. Previously, there was no way for the user to know that they were exploring extrapolated regions. The extrapolation control also supports optimization over a constrained explanatory variable region that avoids extrapolation. Because optimal settings without constraint are frequently extrapolated, this is a useful feature that helps avoid solutions with invalid explanatory variable values that may not be useful to the user.

In an illustrative embodiment, a prediction profiler is a graphical tool for exploring model predictions in a modeling platform. The profiler may include highly interactive cross-sectional views, or profile traces, of a response surface of a model. Sliders for each explanatory variable may allow a user to explore how these cross-sectional views change as the explanatory variable's value changes. The model explanatory variable space in the profiler may automatically enforce rectangular boundary constraints for continuous explanatory variables that are defined by a range of the data included in input dataset 124 for each variable individually. Users may also add mixture constraints or other linear constraints. The model explanatory variable space for categorical explanatory variables may be a discrete grid of explanatory variable level values. Defining the explanatory variable space in this way does not prevent the user from exploring prediction points that should be considered extrapolation. For example, the prediction profiler may allow the user to access points that are outside the correlation structure of the data included in input dataset 124.

Prediction evaluation application 122 performs operations associated with defining model description 126 from data stored in input dataset 124 and with allowing the user of prediction evaluation device 100 to interactively evaluate and select model parameters based on information presented in a display 116. Model description 126 may be used to predict a response variable value for data stored in a second dataset 3724 (shown referring to FIG. 37) based on a relationship identified between the one or more response variables as a function of one or more explanatory variables. Prediction evaluation application 122 is easy to use and provides approximately instantaneous feedback so that the user can quickly and efficiently adjust factor settings and evaluate prediction points while choosing to avoid extrapolation or be made aware of any extrapolation.

Input interface 102 provides an interface for receiving information from the user or another device for entry into prediction evaluation device 100 as understood by those skilled in the art. Input interface 102 may interface with various input technologies including, but not limited to, a keyboard 112, a microphone 113, a mouse 114, display 116, a track ball, a keypad, one or more buttons, etc. to allow the user to enter information into prediction evaluation device 100 or to make selections presented in a user interface displayed on display 116.

The same interface may support both input interface 102 and output interface 104. For example, display 116 comprising a touch screen provides a mechanism for user input and for presentation of output to the user. Prediction evaluation device 100 may have one or more input interfaces that use the same or a different input interface technology. The input interface technology further may be accessible by prediction evaluation device 100 through communication interface 106.

Output interface 104 provides an interface for outputting information for review by a user of prediction evaluation device 100 and/or for use by another application or device. For example, output interface 104 may interface with various output technologies including, but not limited to, display 116, a speaker 118, a printer 120, etc. Prediction evaluation device 100 may have one or more output interfaces that use the same or a different output interface technology. The output interface technology further may be accessible by prediction evaluation device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Prediction evaluation device 100 may have one or more communication interfaces that use the same or a different communication interface technology. For example, prediction evaluation device 100 may support communication using an Ethernet port, a Bluetooth antenna, a telephone jack, a USB port, etc. Data and messages may be transferred between prediction evaluation device 100 and another computing device of distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. prediction evaluation device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Prediction evaluation device 100 also may have one or more drives that support the loading of a memory media such as a CD, DVD, an external hard drive, etc. One or more external hard drives further may be connected to prediction evaluation device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc.

Some processors may be central processing units (CPUs). Some processes may be more efficiently and speedily executed and processed with machine-learning specific processors (e.g., not a generic CPU). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Prediction evaluation device 100 may include a plurality of processors that use the same or a different processing technology.

Some or all of the operations described herein may be embodied in prediction evaluation application 122. The operations may be implemented using hardware, firmware, software, or any combination of these methods. Referring to the example embodiment of FIG. 1, prediction evaluation application 122 is implemented in software (comprised of computer-readable and/or computer-executable instructions) stored in computer-readable medium 108 and accessible by processor 110 for execution of the instructions that embody the operations of prediction evaluation application 122. Prediction evaluation application 122 may be written using one or more programming languages, assembly languages, scripting languages, etc.

Prediction evaluation application 122 may be integrated with other analytic tools. As an example, prediction evaluation application 122 may be part of an integrated data analytics software application and/or software architecture such as that offered by SAS Institute Inc. of Cary, N.C., USA. For example, prediction evaluation application 122 may be integrated with a prediction application 3722 (shown referring to FIG. 37). Merely for illustration, prediction evaluation application 122 may be implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML® all of which are developed and provided by SAS Institute Inc. of Cary, N.C., USA. Data mining, statistical analytics, and response prediction are applicable in a wide variety of industries to solve technical problems.

Prediction evaluation application 122 may be implemented as a Web application. For example, prediction evaluation application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input dataset 124 may include, for example, a plurality of rows and a plurality of columns. The plurality of rows may be referred to as observation vectors or records (observations), and the columns may be referred to as variables. In an alternative embodiment, input dataset 124 may be transposed. The plurality of variables may include one or more response variables that define a response vector Y and one or more explanatory variables that define an explanatory vector X for each observation vector.

Input dataset 124 may include additional variables that are not included in the response vector Y or the explanatory vector X. An $i^{th}$ observation vector may be defined as $(Y_i, X_i)$ that may include a value for each response variable and each explanatory variable of explanatory vector X. In some cases, an explanatory variable may have a missing value for one or more observation vectors. One or more variables of the plurality of variables may describe a characteristic of a physical object. For example, if input dataset 124 includes data related to operation of a vehicle, the variables may include an oil pressure, a speed, a gear indicator, a gas tank level, a tire pressure for each tire, an engine temperature, a radiator level, etc.

Input dataset 124 may include data captured as a function of time for one or more physical objects. The data stored in input dataset 124 may be generated by and/or captured from a variety of sources including one or more sensors of the same or different type, one or more computing devices, etc. Data stored in input dataset 124 may be sensor measurements or signal values captured by a sensor, may be generated or captured in response to occurrence of an event or a transaction, generated by a device such as in response to an interaction by a user with the device, etc. For example, in data science, engineering, and statistical applications, data often consists of multiple measurements (across sensors, characteristics, responses, etc.) collected across multiple time instances (patients, test subjects, experiments, geographic locations, etc.). These measurements may be collected in input dataset 124 for analysis and processing. The data stored in input dataset 124 may be captured at different time points periodically, intermittently, when an event occurs, etc. One or more columns of input dataset 124 may include a time and/or a date value.

The data stored in input dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA.

Input dataset 124 may include data captured at a high data rate such as 200 or more observation vectors per second for one or more physical objects of the same or different type. For example, data stored in input dataset 124 may be generated as part of the Internet of Things (IoT), where things (e.g., machines, devices, phones, sensors) can be connected to networks and the data from these things collected and processed within the things and/or external to the things before being stored in input dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices and may involve edge computing circuitry. These devices may provide a variety of stored or generated data, such as network data or data specific to the network devices themselves. Again, some data may be processed with an ESPE, which may reside in the cloud or in an edge device before being stored in input dataset 124.

The data stored in input dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Input dataset 124 may be stored using various data structures as known to those skilled in the art including one or more files of a file system, a relational database, one or more tables of a system of tables, a structured query language database, a SAS® dataset, etc. on prediction evaluation device 100 or on distributed computing system 128. The data may be organized using delimited fields, such as comma or space separated fields, fixed width fields, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input dataset 124 may be stored on computer-readable medium 108 or on one or more computer-readable media of distributed computing system 128 and accessed by prediction evaluation device 100 using communication interface 106, input interface 102, and/or output interface 104. Prediction evaluation device 100 may coordinate access to input dataset 124 that is distributed across distributed computing system 128 that may include one or more computing devices. For example, input dataset 124 may be stored in a cube distributed across a grid of computers as understood by a person of skill in the art. As another example, input dataset 124 may be stored in a multi-node Hadoop® cluster. For instance, Apache™ Hadoop® is an open-source software framework for distributed computing supported by the Apache Software Foundation. As another example, input dataset 124 may be stored in a cloud of computers and accessed using cloud computing technologies, as understood by a person of skill in the art. The SAS® LASR™ Analytic Server may be used as an analytic platform to enable multiple users to concurrently access data stored in input dataset 124. The SAS® Viya™ open, cloud-ready, in-memory architecture also may be used as an analytic platform to enable multiple users to concurrently access data stored in input dataset 124. SAS® Cloud Analytic Services (CAS) may be used as an analytic server with associated cloud services in SAS® Viya™. Some systems may use SAS In-Memory Statistics for Hadoop® to read big data once and analyze it several times by persisting it in-memory for the entire session. Some systems may be of other types and configurations.

Figure 2A:
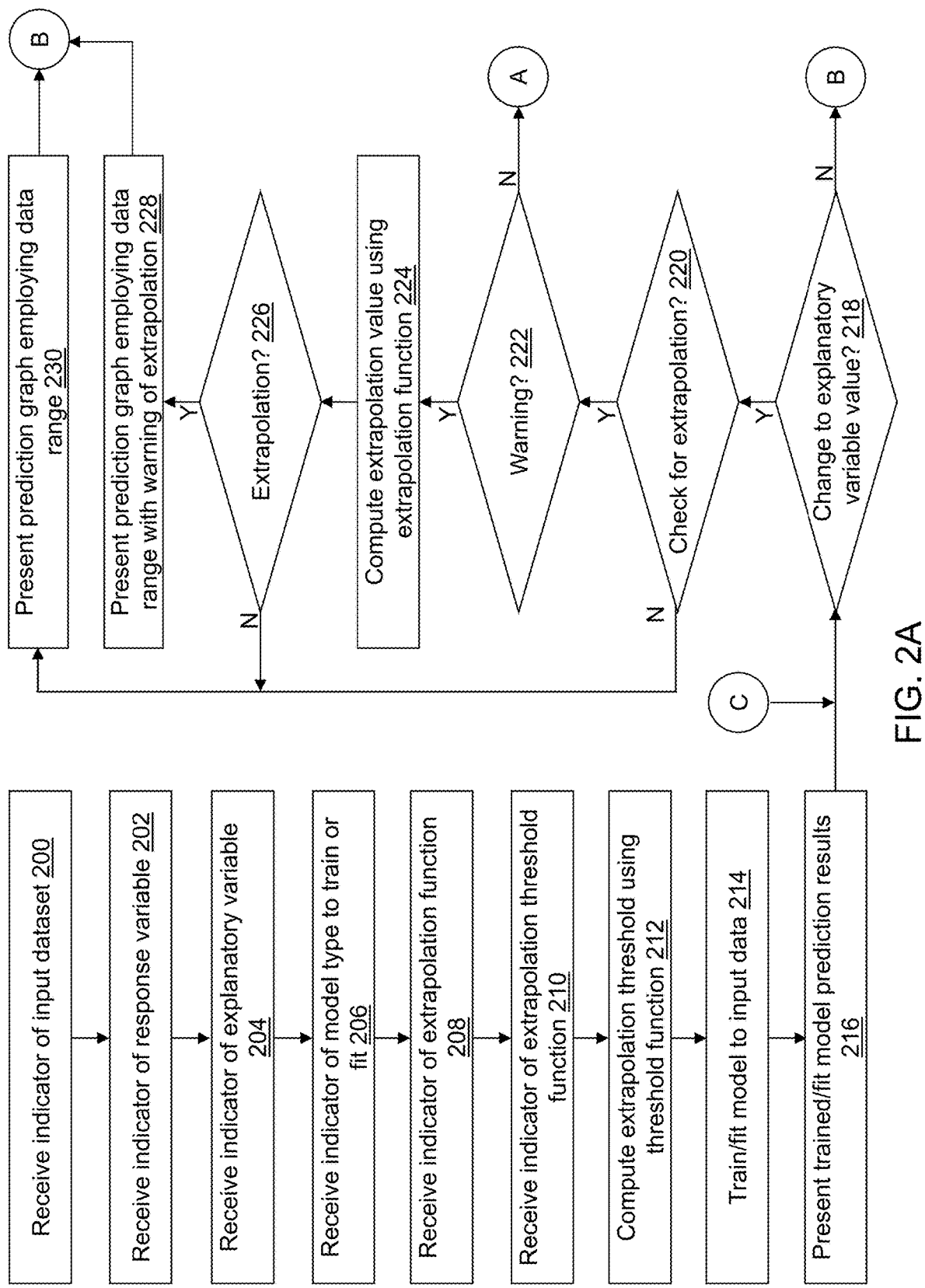
FIGS. 2A, 2B, and 2C depict a flow diagram illustrating examples of operations performed by a prediction evaluation application of the prediction evaluation device of FIG. 1 in accordance with an illustrative embodiment.
Figure 2B:
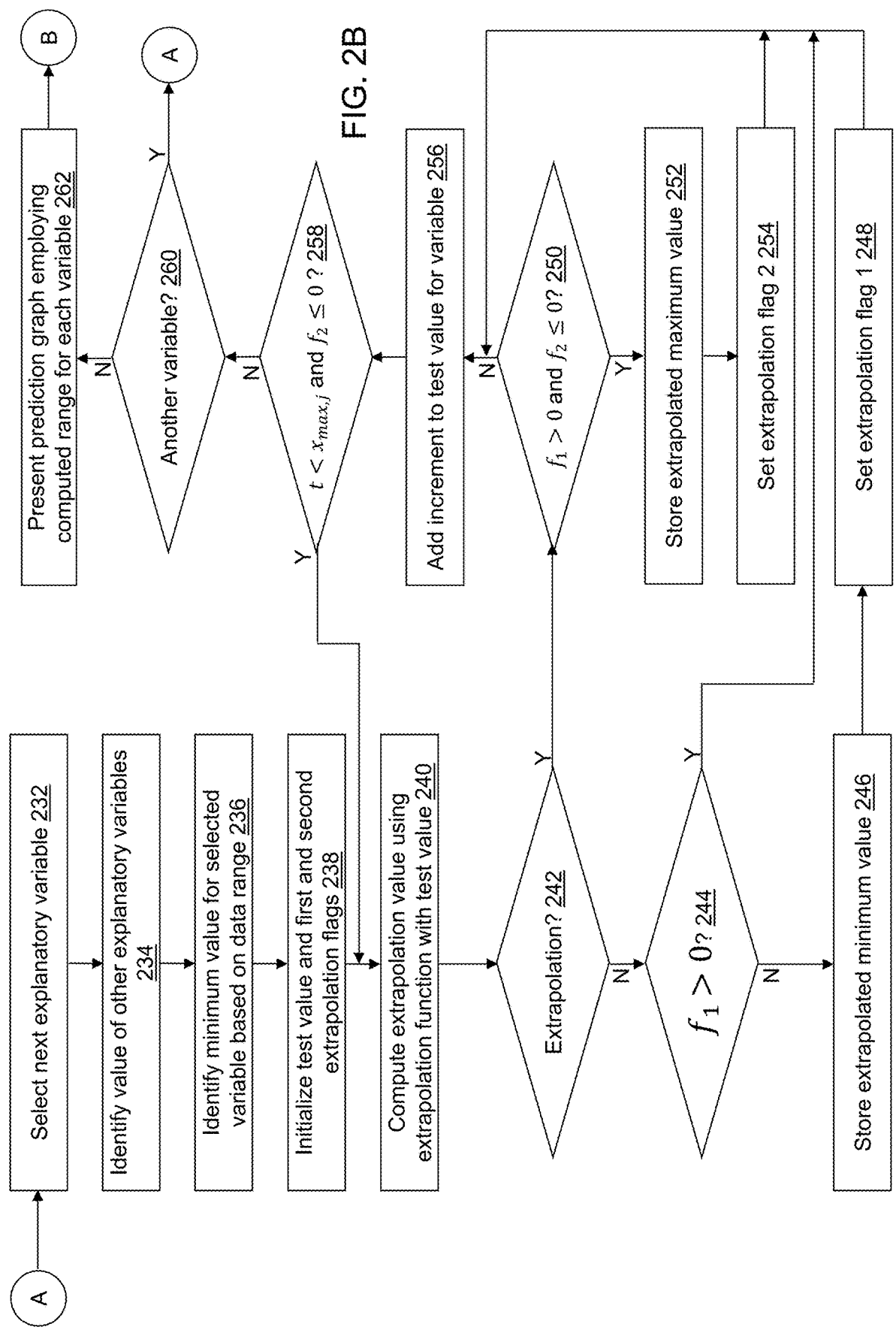
Figure 2C:
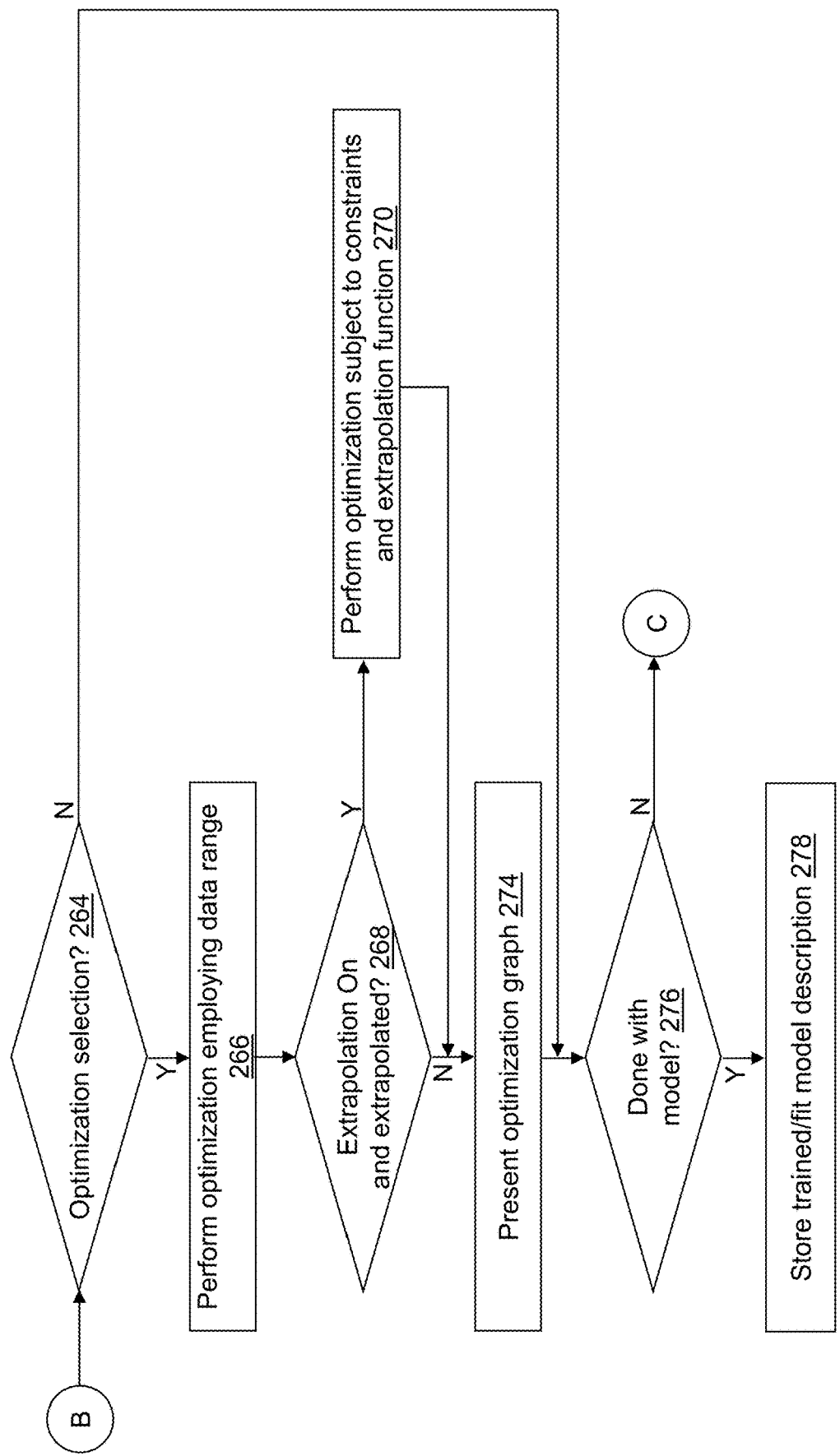

Referring to FIGS. 2A, 2B, and 2C, example operations associated with prediction evaluation application 122 are described. Additional, fewer, or different operations may be performed depending on the embodiment of prediction evaluation application 122. As understood by a person of skill in the art, there are typically many programming methodologies that may be used to perform the same function. The order of presentation of the operations of FIGS. 2A, 2B, and 2C is not intended to be limiting. Some of the operations may not be performed in some embodiments. Although some of the operational flows are presented in sequence, the various operations may be performed in various repetitions, concurrently (in parallel, for example, using threads and/or distributed computing system 128), and/or in other orders than those that are illustrated. For example, a user may execute prediction evaluation application 122, which causes presentation of a first user interface window, which may include a plurality of menus and selectors such as drop-down menus, buttons, text boxes, hyperlinks, etc. associated with prediction evaluation application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by prediction evaluation application 122.

Figure 3:
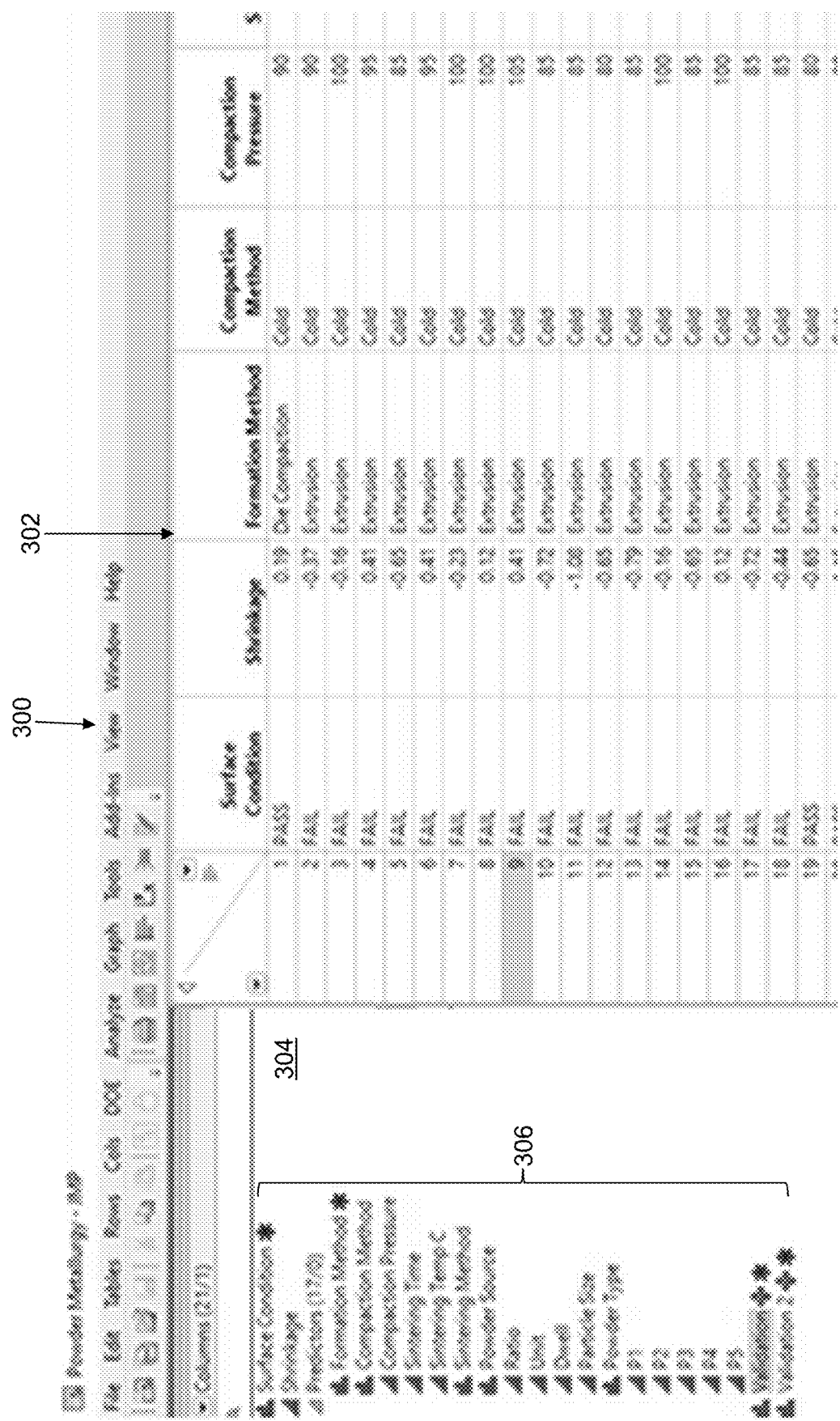
FIGS. 3 through 29 show a user interface supported by the prediction evaluation application of FIGS. 2A, 2B, and 2C and used to interactively evaluate predictions and select a model in accordance with an illustrative embodiment.

Referring to FIG. 2A, in an operation 200, a first indicator may be received that indicates input dataset 124. For example, the first indicator indicates a location and a name of input dataset 124. As an example, the first indicator may be received by prediction evaluation application 122 after selection from a user interface window or after entry by a user into a user interface window. In an alternative embodiment, input dataset 124 may not be selectable. For example, a most recently created dataset may be used automatically. For illustration, referring to FIG. 3, a user interface window 300 is presented on display 116 after selection of a "Powder Metallurgy" dataset as input dataset 124. Data read from the Powder Metallurgy dataset is shown in a table 302. A header of each column of table 302 includes a variable name for a respective column of data. A variable window 304 includes a variable list 306 that lists each variable name read from the Powder Metallurgy dataset.

Referring again to FIG. 2A, in an operation 202, a second indicator may be received that indicates response vector Y in input dataset 124. For example, the second indicator may indicate a column number or a column name for each of the one or more response variables. As another option, a first or a last column of input dataset 124 may be assumed to be the response variable column such that Y includes a single variable.

In an operation 204, a third indicator may be received that indicates one or more explanatory variables in input dataset 124. For example, the third indicator may indicate a column number or a column name for each of the one or more explanatory variables. Explanatory vector $X_i$ may include one or more variable values each of which is associated with a respective explanatory variable of the $i^{th}$ observation vector.

In an operation 206, a fourth indicator may be received that indicates a model type to train or fit. For example, the fourth indicator indicates a name of a type of model. The model type is used to describe a behavior of response vector Y given explanatory vector X. Depending on the model type, other parameters may be selectable or definable by the user or by default. The fourth indicator may be received by prediction evaluation application 122 after selection from a user interface window or after entry by a user into a user interface window. A default value for the model type may further be stored, for example, in computer-readable medium 108. As an example, a model type may be selected from various linear and non-linear models such as a linear regression model type, a generalized linear model type, a nonlinear regression model type, a neural network model type, a random forest model type, a support vector machine model type, a gradient boosting tree model type, a neural network model type, etc.

Figure 4:
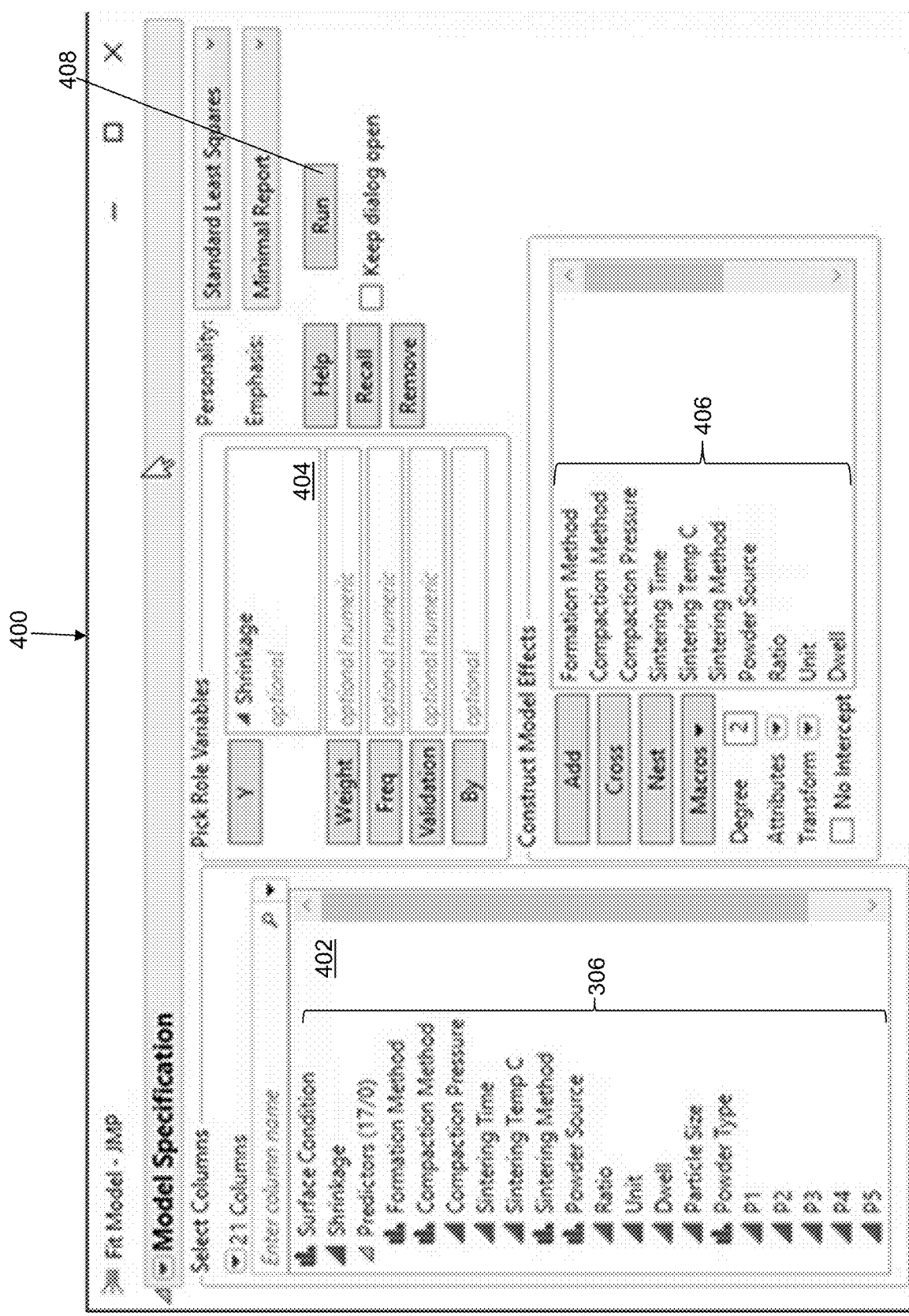

For illustration, referring to FIG. 4, an input window 400 is shown in accordance with an illustrative embodiment after a selection by a user from a drop-down menu of user interface window 300. The selection by the user from the drop-down menu indicates that the user is ready to fit or train a model. Input window 400 may include a variable list section 402 that includes variable list 306, a y-variable selector 404, using an x-variable selector 406, and a train/fit model button 408. Y-variable selector 404 that is used to select one or more response variable y to define response vector Y, for example, by dragging and dropping, from variable list 306. X-variable selector 406 that is used to select one or more explanatory variable x to define explanatory vector X, for example, by dragging and dropping, from variable list 306. Selection of train/fit model button 408 may trigger fitting of a selected model type using the defined explanatory vector X and the defined response vector Y of the selected input dataset 124. When the model is trained or fit, user interface window 300 may include a hierarchy of sub-windows that change as selections are made from selectors presented in user interface window 300.

Referring again to FIG. 2, in an operation 208, a fifth indicator of an extrapolation function may be received. For example, the fifth indicator indicates a name of an extrapolation function. The extrapolation function is used to determine when a given explanatory vector X selected by a user results in extrapolation. The fifth indicator may be received by prediction evaluation application 122 after selection from a user interface window or after entry by a user into a user interface window. A default value for the extrapolation function may further be stored, for example, in computer-readable medium 108 and used automatically. As an example, an extrapolation function may be selected from a leverage extrapolation function, a regularized Hotelling's T Square (also referred to as Hotelling's herein) extrapolation function, etc.

In an operation 210, a sixth indicator of an extrapolation threshold function may be received. For example, the sixth indicator indicates a name of an extrapolation threshold function. The extrapolation threshold function is used to define how an extrapolation threshold is computed. The sixth indicator may be received by prediction evaluation application 122 after selection from a user interface window or after entry by a user into a user interface window. A default value for the extrapolation threshold function may further be stored, for example, in computer-readable medium 108 and used automatically. As an example, an extrapolation threshold function may be selected from a maximum leverage threshold function, an average leverage threshold function, a Hotelling's threshold function, etc.

In an operation 212, an extrapolation threshold T is computed using the extrapolation threshold function indicated in operation 210 with the explanatory variables indicated in operation 204. For example, when the maximum leverage threshold function is indicated in operation 210, extrapolation threshold T is computed as a leverage computed for an observation that is a farthest distance from a mean computed from the explanatory variable values. When the maximum leverage threshold function is indicated in operation 210, extrapolation threshold T is computed using $h_f = x_f^T (X^T X) x_f$, where $x_f$ indicates the explanatory variable values of the observation that is a farthest distance from the mean, X is a design matrix that includes the explanatory variable values for each observation vector included in input dataset 124, and T indicates a transpose. $T = k_1 h_f$, where $k_1$ is a first multiplier value defined for the extrapolation threshold function selection. When $k_1 \geq 1$, prediction points beyond the threshold are outside of a convex hull defined around the observations read from input dataset 124 as defined by $h_f$ that is the leverage of the furthest point on the convex hull of the data. The first multiplier value $k_1$ may be defined by the user with the selection of the extrapolation threshold function or may be defined using a default value.

When the average leverage threshold function is indicated in operation 210, extrapolation threshold T may be computed as $T = k_2 p/n$, where $k_2$ is a second multiplier value defined for the extrapolation threshold function selection, p indicates a number of model parameters for all of the explanatory variables indicated in operation 204, and n indicates a number of the observations included in input dataset 124. $k_2$ may typically be defined as two or three though other values may be used. The second multiplier value $k_2$ may be defined by the user with the selection of the extrapolation threshold function or may be defined using a default value.

When the Hotelling's threshold function is indicated in operation 210, extrapolation threshold T may be computed as $T = \overline{H}^2 + k_3 \sigma_H$, where $\overline{H}^2$ indicates an average Hotelling's $T^2$ value, $\sigma_H$ indicates a standard deviation of the Hotelling's $T^2$ value, and $k_3$ is a third multiplier value defined for the extrapolation threshold function selection. $k_3$ may typically be defined as two or three though other values may be used. The third multiplier value $k_3$ may be defined by the user with the selection of the extrapolation threshold function or may be defined using a default value.

The average Hotelling's $T^2$ value may be computed using $$\overline{H}^2 = \frac{1}{n} \sum_{i=1}^{n} (x_i - \mu)^T \sum^{-1} (x_i - \mu),$$

where $x_i$ indicates $i^{th}$ explanatory variable values of the n observations included in input dataset 124, and $$\mu = \frac{1}{n}\sum_{i=1}^{n} x_i$$

is a mean vector computed from the explanatory variable values of the n observations included in input dataset 124. $\Sigma$ is a regularized covariance matrix estimator computed from the explanatory variable values of the n observations included in input dataset 124. The standard deviation of the Hotelling's $T^2$ value is computed using $$\sigma_H = \sqrt{\frac{1}{n-1}\sum_{i=n}^{n}\left(T_i^2 - \overline{H^2}\right)^2},$$

where $T_i^2 = (x_i-\mu)^\top \Sigma^{-1}(x_i-\mu)$.

One problem with using the sample covariance matrix to estimate $\Sigma$ is that when p>n, the Hotelling's $T^2$ is undefined because there are too many parameters in the covariance matrix $\Sigma$ to estimate with the available data. To address this, a regularized covariance matrix estimator is computed as described in a paper by J. Schafer and K. Strimmer, *A shrinkage approach to large-scale covariance matrix estimation and implications for functional genomics*, Statistical Applications in Genetics and Molecular Biology, 4, pp. 1-30 (2005) (Schäfer/Strimmer). This estimator was originally developed for the estimation of covariance matrices for high-dimensional genomics data. The estimator has been shown to produce a more accurate covariance matrix estimate when p is much larger than n. The covariance matrix used to compute the average Hotelling's $T^2$ value $\overline{H^2}$ and the standard deviation of the Hotelling's $T^2$ value $\sigma_H$ is computed using $\Sigma=(1-\lambda)\Sigma'+\lambda D$, where $\lambda \in [0,1]$ is a predefined shrinkage intensity value, $\Sigma'$ is the pairwise covariance matrix computed from the n observations included in input dataset 124.

D is a diagonal matrix that has a sample variance of each observation included in the diagonal and zeroes in the off diagonal positions. This is defined as target D in the paper by Schäfer/Strimmer. The diagonal entries (variances) for the pairwise covariance matrix $\Sigma'$ and the diagonal matrix D are computed using all non-missing values for each variable. The off-diagonal entries of the pairwise covariance matrix $\Sigma'$ for any pair of variables are computed using all observations that are non-missing for both variables. As a result, data is used to compute a pairwise covariance value unless one or both variable values of a respective pair of variables is missing.

Eigenvalues and eigenvectors are determined from the pairwise covariance matrix $\Sigma'$. Any eigenvectors with negative eigenvalues are removed to make the pairwise covariance matrix $\Sigma'$ positive definite. Negative eigenvalues may result, for example, due to numerical inaccuracy or sampling error.

The predefined shrinkage intensity value $\lambda$ may be computed from the data included in input dataset 124 as described in the paper by Schäfer/Strimmer that includes an analytical expression that minimizes the mean squared error of the estimator asymptotically.

The target diagonal matrix D assumes that variables are uncorrelated, which works well for a general extrapolation control method because it does not assume any correlation structure between the variables without prior knowledge of the data. Also, when there is little data to estimate the covariance matrix, the elliptical extrapolation control constraints are expanded by the shrinkage estimator with the diagonal matrix D resulting in a more conservative test statistic for extrapolation control. That is, when there is little data available to estimate the covariances, it is less likely to label prediction points as violations of the correlation structure with the shrinkage estimator, which is sensible because there is little observational data such that spurious covariances may be observed.

Using the Schäfer/Strimmer estimator to compute Hotelling's $T^2$ value reduces an impact of the curse of dimensionality that plagues most distance based methods for extrapolation control. For high dimensional data sets, observations begin to appear equidistant according to many distance metrics, such as the Euclidean distance, making it challenging to identify points that are distant from data in input dataset 124 for extrapolation control. Using the Schäfer/Strimmer estimator to compute Hotelling's $T^2$ value also makes the covariance estimates more robust to noise and model misspecification. The regularized $T^2$ value is only dependent on the distribution of the predictor variables, and so the same regularized $T^2$ value is used for any model that is selected and any set of response variables.

In an operation 214, a model having the model type indicated in operation 206 is fit or trained using the observation vectors read from input dataset 124 as defined in operations 202 and 204. The trained/fit model may further be validated to compute various error/accuracy statistics for possible review by the user.

Figure 5:
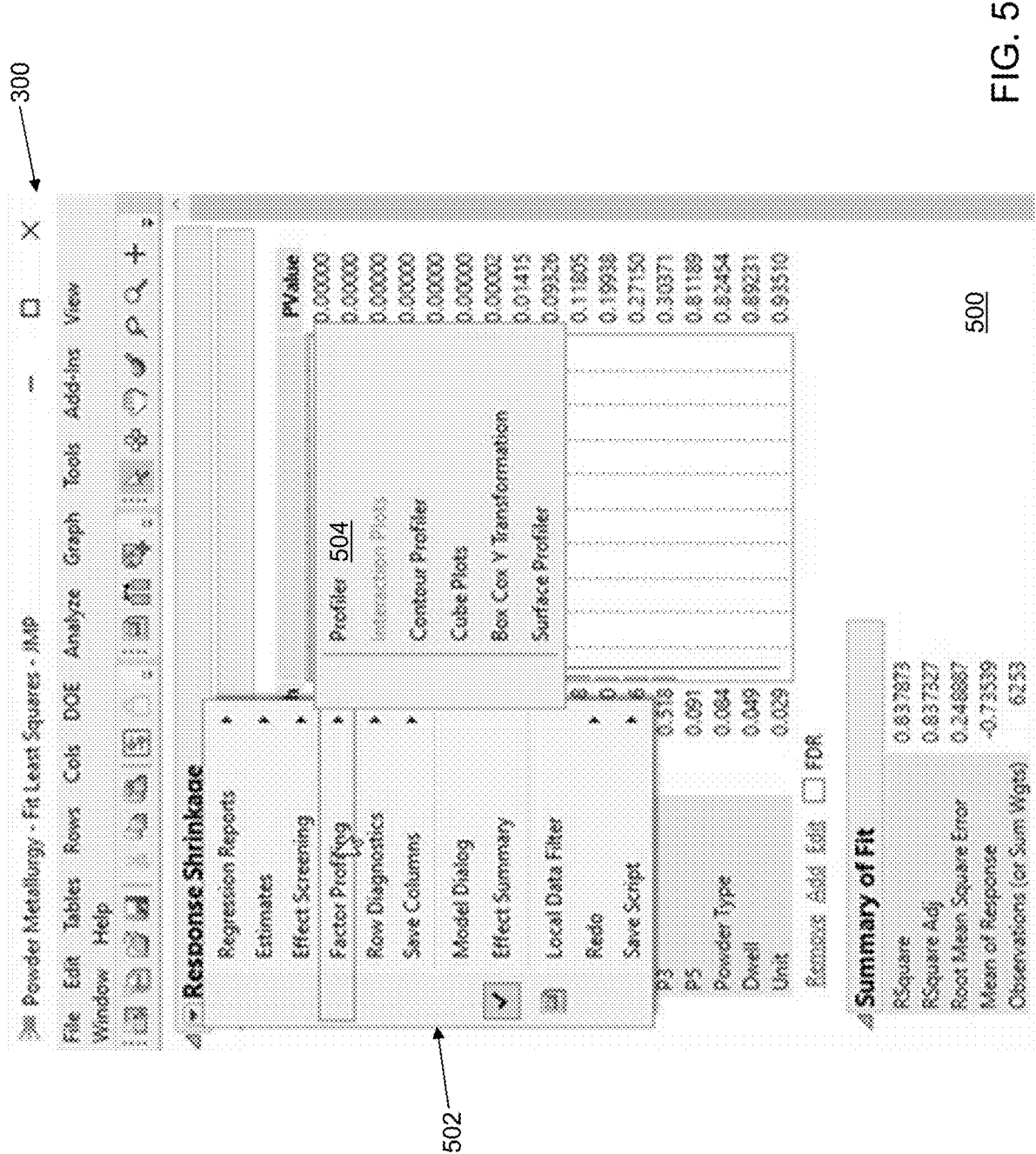

In an operation 216, trained/fit model results are presented in association with user interface window 300. For example, referring to FIG. 5, a summary results window 500 includes summary statistics regarding a performance of the trained/fit model based on the model type selected.

Referring again to FIG. 2A, in an operation 218, a determination is made concerning whether an interaction by the user with user interface window 300 indicates a change to an explanatory variable value. When the interaction indicates a change, processing continues in an operation 220. When the interaction does not indicate a change, processing continues in an operation 264 shown referring to FIG. 2C.

For illustration, referring again to FIG. 5, a drop-down menu 502 is shown in accordance with an illustrative embodiment after a selection of a down arrow from a header bar of summary results window 500. Drop-down menu 502 may include a profiler selector 504.

Figure 6:
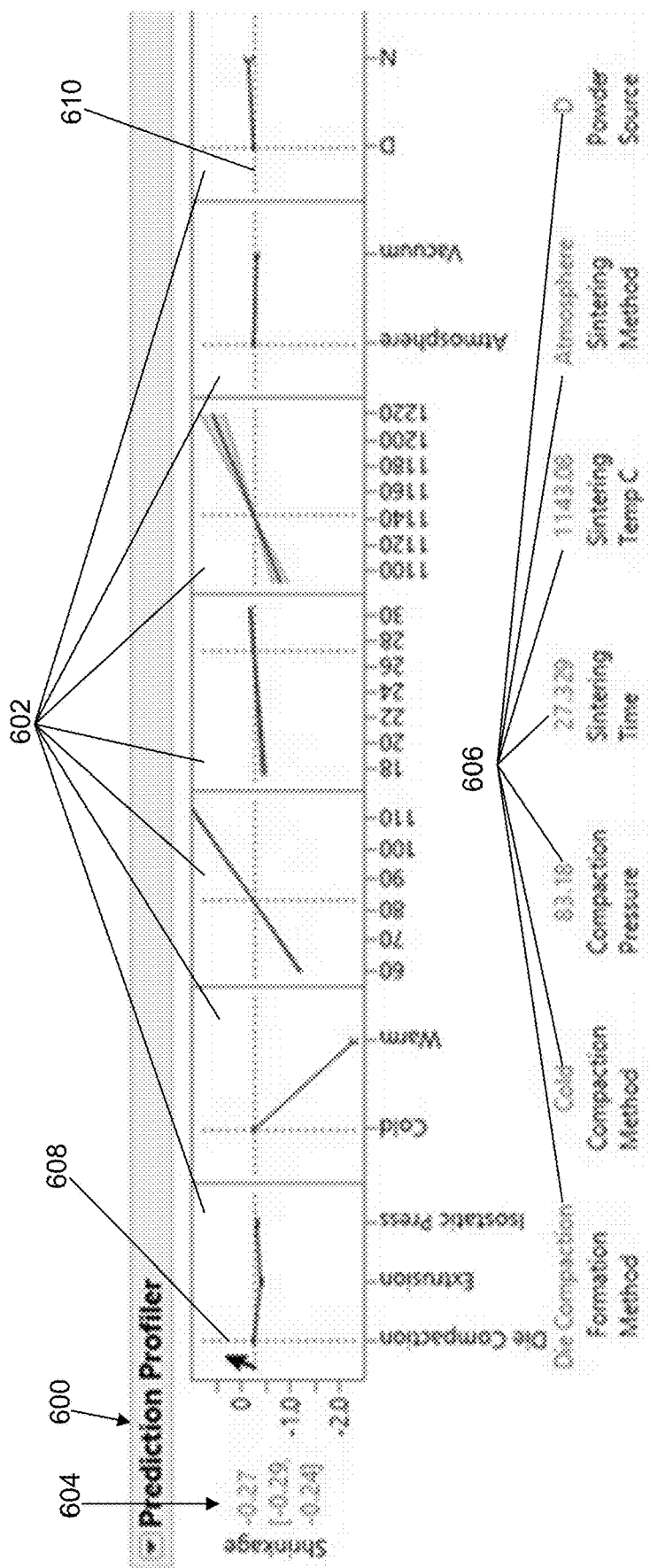

In response to selection of profiler selector 504, user interface window 300 may be updated to include a prediction profiler window 600 shown referring to FIG. 6 in accordance with an illustrative embodiment. Prediction profiler window 600 may include one or more explanatory variable profile graphs 602 with one graph for each explanatory variable. Each graph shows the response variable value as a function of the respective explanatory variable value while the other explanatory variables values are held constant at the current value. A range of values for each explanatory variable that is continuous is defined based on a minimum value and a maximum value identified from input dataset 124. A set of possible values is shown for each explanatory variable that is categorical. For example, a "Formation Method" explanatory variable that is categorical may have values of "Die Compaction", "Extrusion", or "Isostatic Press" while a "Compaction Pressure" explanatory variable that is continuous may have values that range from 60 to 110. The one or more explanatory variable profile graphs 602 include a profile trace for each explanatory variable of the one or more explanatory variables to show how each predicted response variable varies according to the trained/fit model function over the range of values of the respective explanatory variable.

Each of the one or more explanatory variable profile graphs 602 present a profile based on the trained/fit model. The curve within each of the one or more explanatory variable profile graphs 602 shows a profile trace for the respective explanatory variable. A profile trace is a response predicted using the trained/fit model as one explanatory variable is changed over the range of values while the other explanatory variables are held constant at their current values as indicated below each graph.

Response values 604 include the response variable value that results using the trained/fit model with the value below each of the one or more explanatory variable profile graphs 602 and a confidence interval. Initially, below each of the one or more explanatory variable profile graphs 602 is a respective value 606 associated with the initial set of explanatory values usually set to the mean variable value for continuous variables and the first level of categorical variables.

An explanatory variable adjustment line 608, also referred to as a slider, is presented in each of the one or more explanatory variable profile graphs 602. Each explanatory variable adjustment line 608 is initially presented in association with the respective initial value. Movement of any explanatory variable adjustment line 608 changes the value of the respective explanatory variable, shows changes in the profile trace that result while holding the other explanatory variables at their current values, and results in updated response values 604. The user can drag and drop any explanatory variable adjustment line 608 to explore how the prediction model results change as the value of each individual explanatory variable changes.

Figure 7:
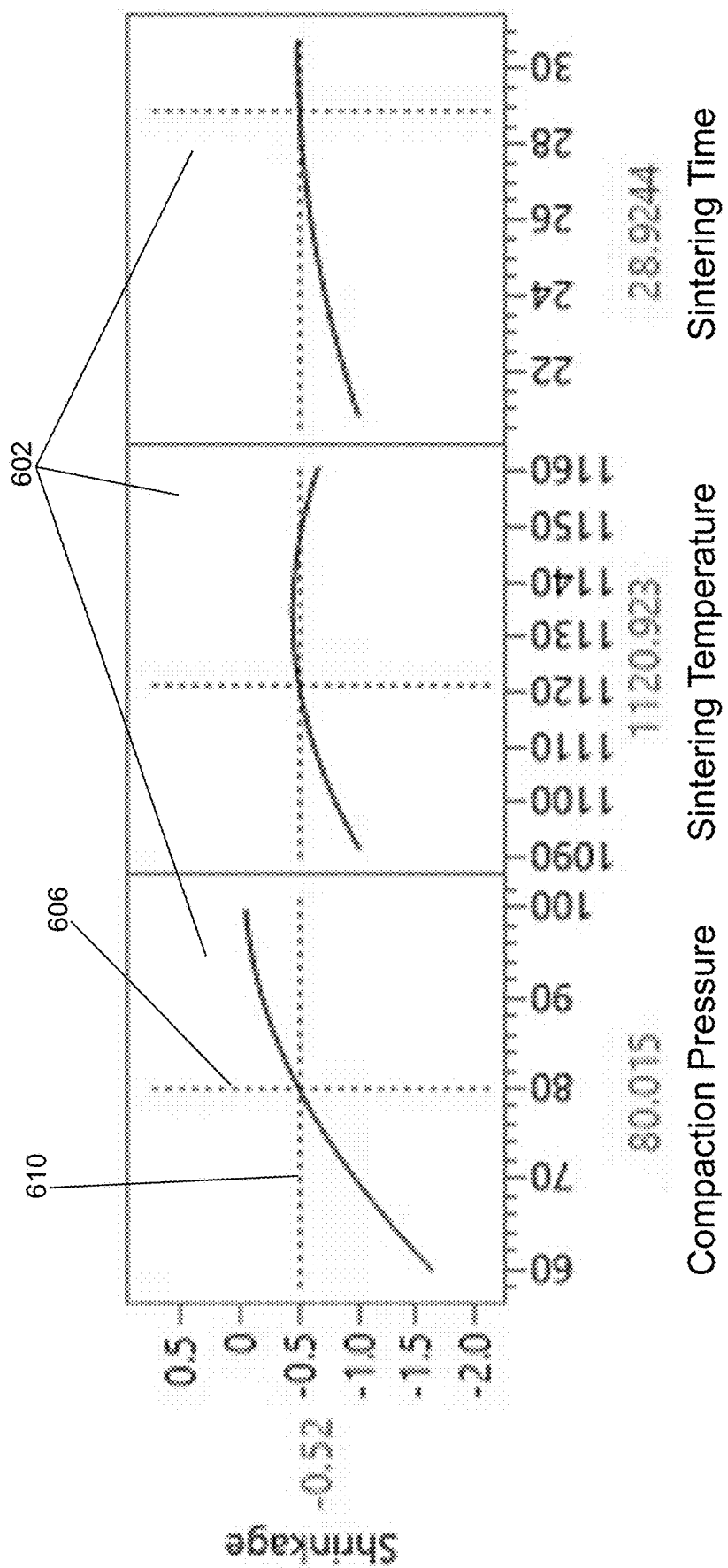

For example, referring to FIG. 7, a zoomed portion of three of the explanatory variables is shown after first adjustments. In the example, powder metallurgy is being used to construct metal drive shafts. The metal parts begin as a metal powder. Compaction pressure is a pressure applied to compact the powder into the desired part shape. Sintering temperature is an average temperature in the sintering furnace. The sintering furnace heats the metal particles so that they bind together, which strengthens the metal part.

Figure 8:
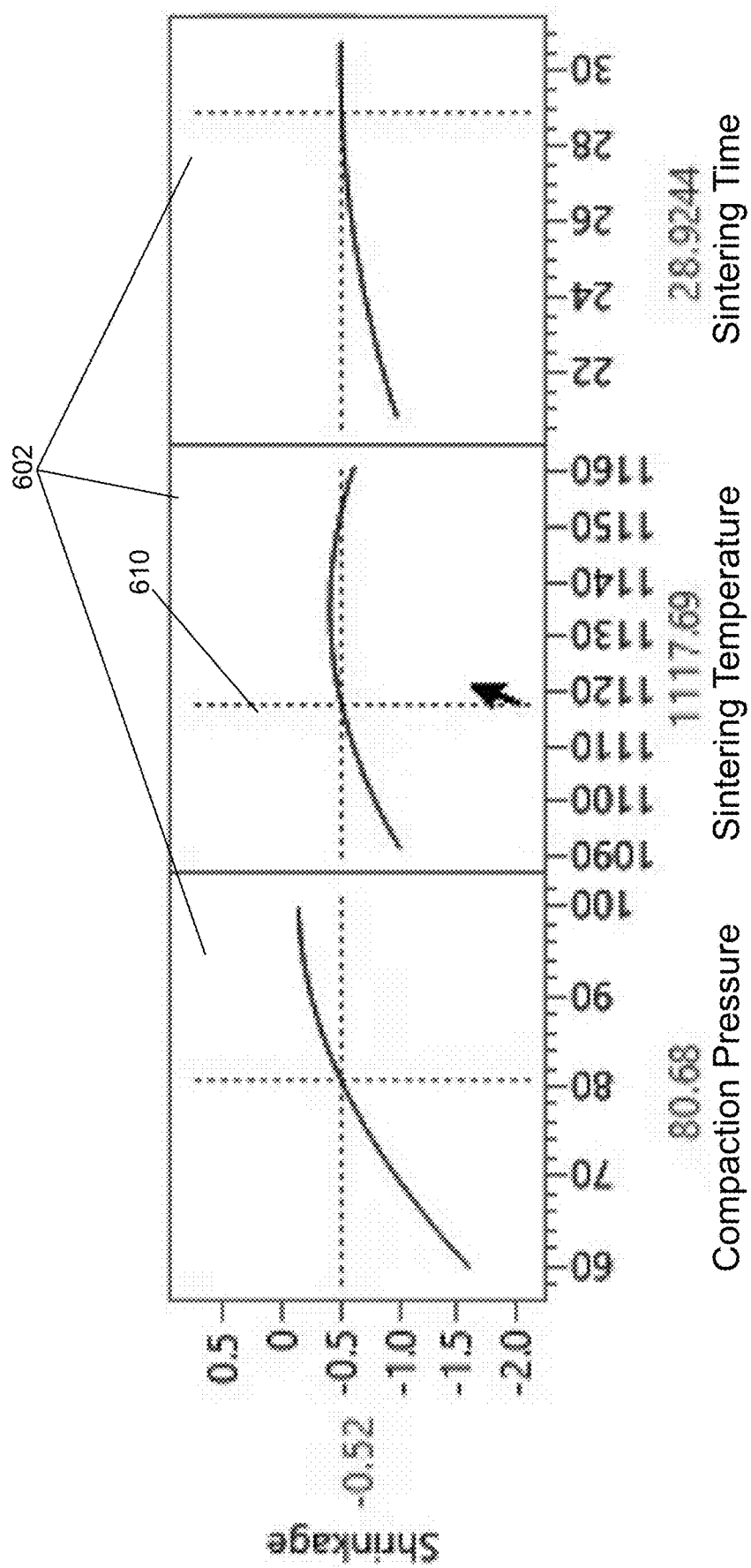
Figure 9:
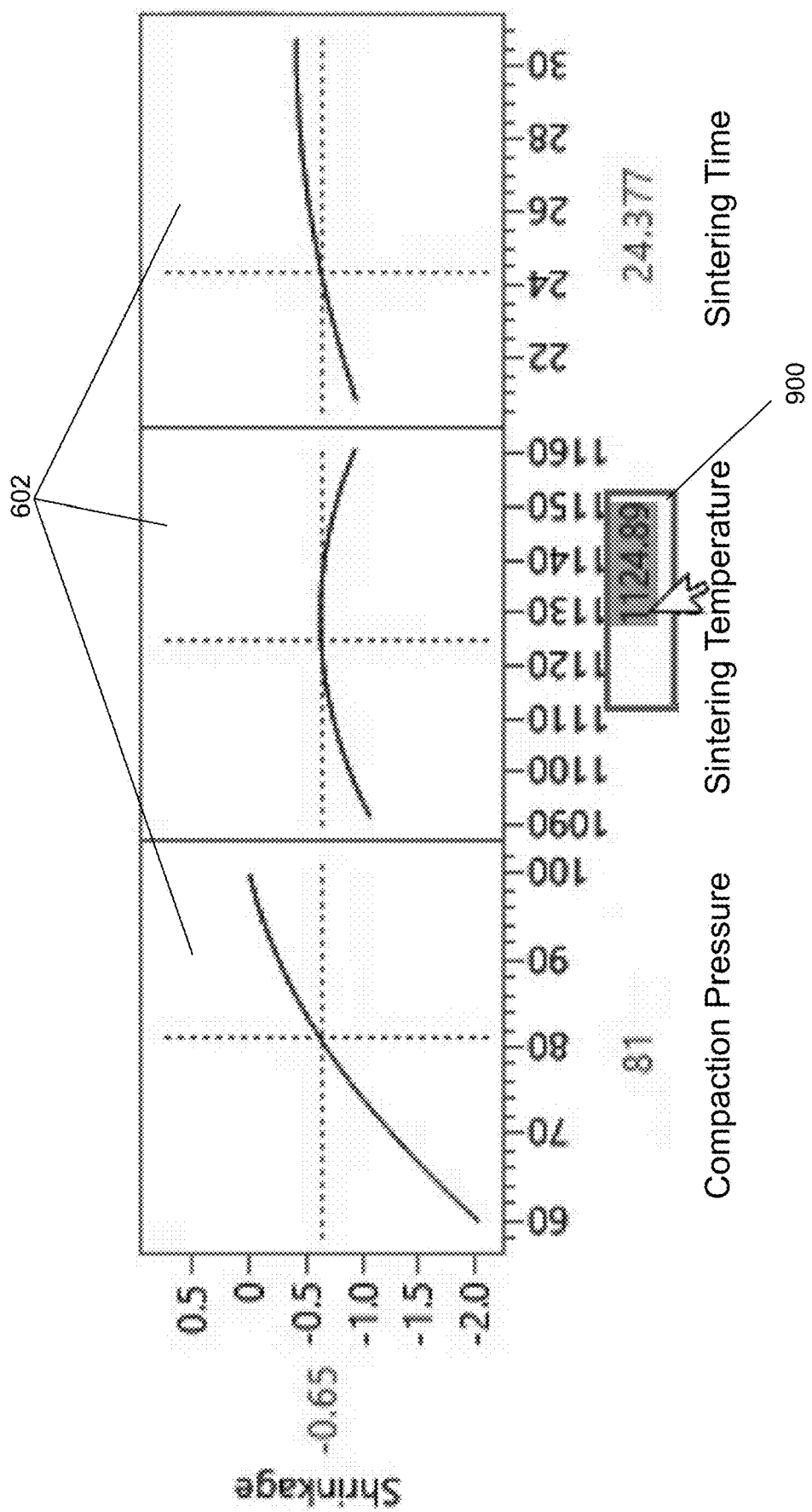
Figure 10:
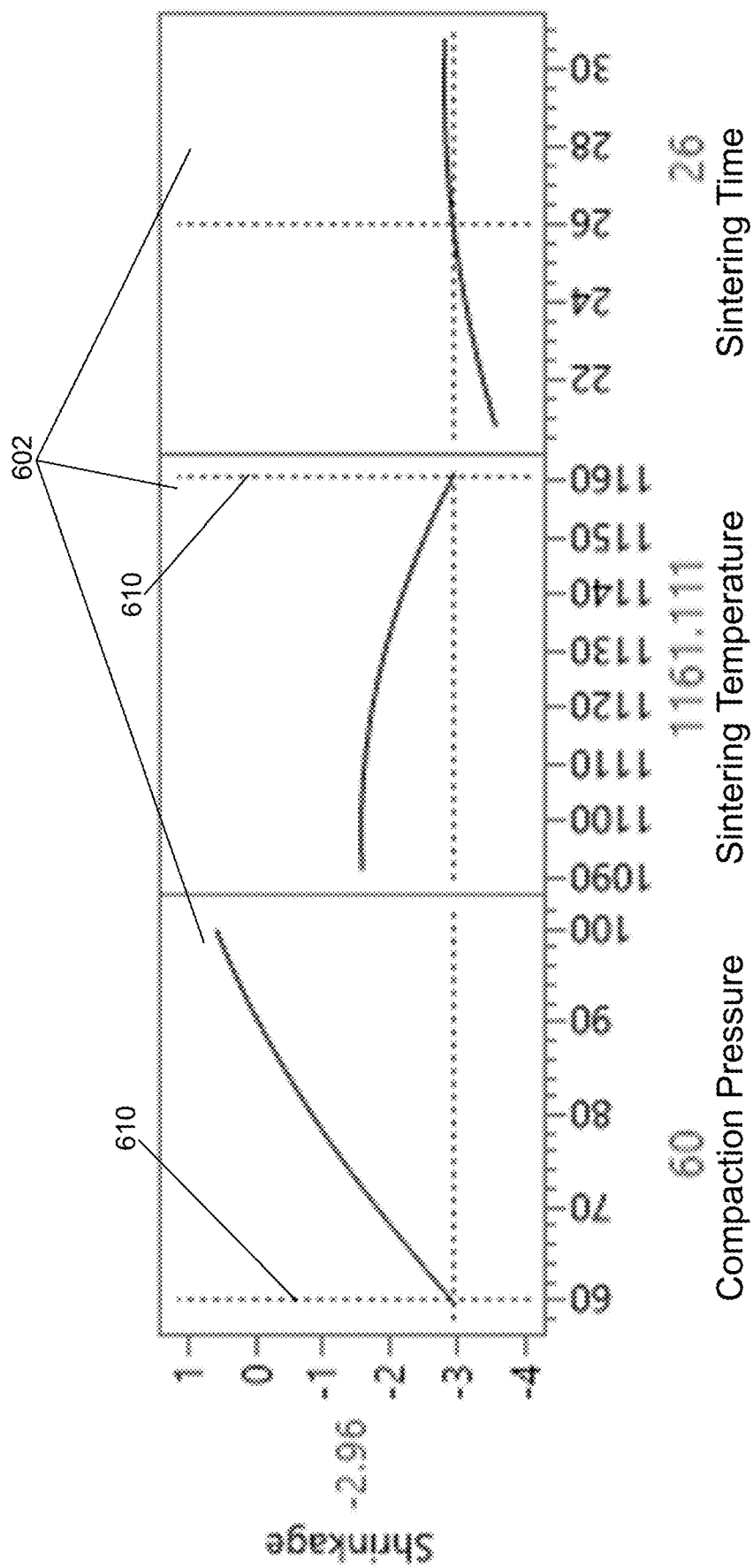
Figure 11:
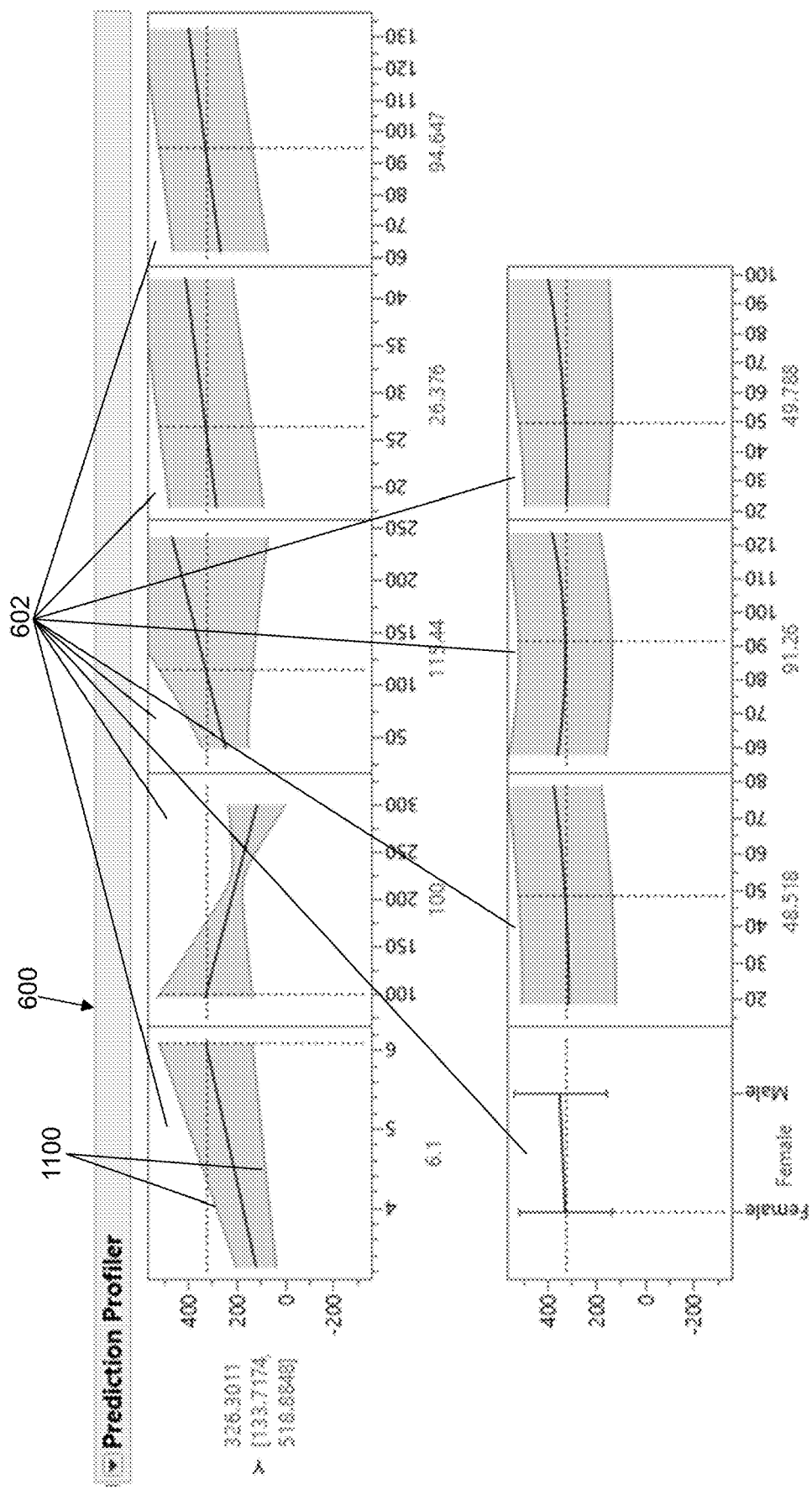

Referring to FIG. 8, the zoomed portion of the three explanatory variables is shown after second adjustments where the user dragged explanatory variable adjustment line 608 to the left or to the right. Referring to FIG. 9, the zoomed portion of the three explanatory variables is shown after third adjustments where the user is entering a value for the "Sintering Temperature" explanatory variable value into a value window 900 instead of using explanatory variable adjustment line 608 to adjust the value. Referring to FIG. 10, the zoomed portion of the three explanatory variables is shown after fourth adjustments where the user has dragged explanatory variable adjustment line 608 for the "Compaction Pressure" explanatory variable and for the "Sintering Temperature" explanatory variable to extreme values. Referring to FIG. 11, confidence interval curves 1100 are optionally shown above and below each mean explanatory variable value.

Referring again to FIG. 6, a response adjustment line 610 is presented in each of the one or more explanatory variable profile graphs 602. Each response adjustment line 610 is vertically aligned with the others and indicates a current predicted value of the response variable that crosses an intersection point of the profile traces to define their current values. If there are interaction effects or cross-product effects in the trained/fit model, the respective profile trace can shift its slope and curvature as any explanatory variable value is changed. If there are no interaction effects, the profile traces change only in height, not slope or shape. The user may also drag and drop any response adjustment line 610 to explore how the explanatory variable values change as the of the response variable value changes.

Moving any explanatory variable adjustment line 608 or any response adjustment line 610 or specifying an explanatory variable value in value window 900 of any explanatory variable may be interpreted as an interaction by the user with user interface window 300 to indicate a change to an explanatory variable value.

In operation 220, a determination is made concerning whether a check for extrapolation is active. When the check for extrapolation is active, processing continues in an operation 222. When the check for extrapolation is not active, processing continues in an operation 230.

Figure 12:
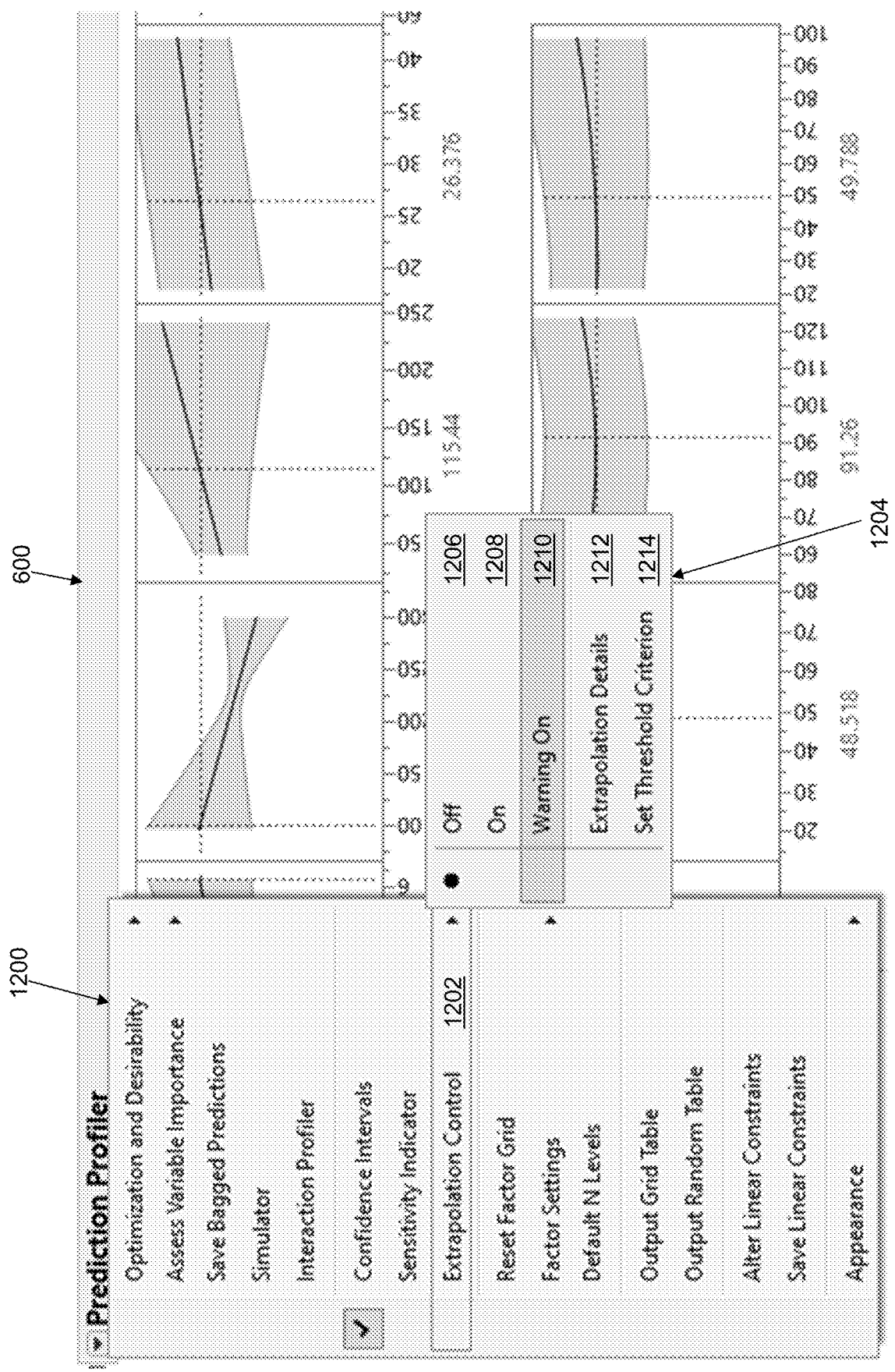

For example, referring to FIG. 12, a profiler drop-down menu 1200 is shown in accordance with an illustrative embodiment after a selection of a down arrow from a header bar of prediction profiler window 600. Profiler drop-down menu 1200 may include an extrapolation control selector 1202. In response to selection of extrapolation control selector 1202, an extrapolation menu 1204 may be opened. Extrapolation menu 1204 may include an "Off" selector 1206, an "On" selector 1208, a "Warning On" selector 1210, an "Extrapolation Details" selector 1212, and a "Set Threshold Criterion" selector 1214. The user selects "Off" selector 1206 to turn off extrapolation control, "On" selector 1208 to turn on extrapolation control, and "Warning On" selector 1210 to generate a warning when one or more explanatory variable value is extrapolated though not restricting the profile traces. In an illustrative embodiment, the extrapolation control may be off by default until turned on by the user. As discussed further below, "Extrapolation Details" selector 1212 triggers presentation of extrapolation details, and "Set Threshold Criterion" selector 1214 triggers presentation of a criterion window that allows the user to define parameters associated with the extrapolation threshold function as discussed in operation 210. Extrapolation may be inactive when the "Off" selector 1206 is selected as indicated in FIG. 12.

In operation 222, a determination is made concerning whether the check for extrapolation is to generate a warning, for example, through selection of "Warning On" selector 1210. When the check for extrapolation is to generate a warning, processing continues in an operation 224. When the check for extrapolation is to apply extrapolation, for example, through selection of "On" selector 1208, processing continues in an operation 232 shown referring to FIG. 2B.

In operation 224, an extrapolation value $h_{prd}$ is computed using each currently defined explanatory variable value. For example, the currently defined explanatory variable value for each respective explanatory variable is indicated by each respective value 606. When the leverage extrapolation function is indicated in operation 208, extrapolation value $h_{prd}$ may be computed using $h_{prd} = x_o^T (X^T X) x_o$, where $x_o$ is the vector of currently defined explanatory variable value for each respective explanatory variable. An interpretation of $h_{prd}$ is that it is a multivariate distance from a center of the observations read from input dataset 124. Another interpretation is that $h_{prd}$ is a scaled prediction variance. That is, as the observation moves further away from the center of the data (in a multivariate sense), the uncertainty of the prediction increases. When the Hotelling's extrapolation function is indicated in operation 208, extrapolation value $h_{prd}$ may be computed using $h_{prd}=(x_o-\mu)^\top \Sigma^{-1}(x_o-\mu)$.

In operation 226, a determination is made concerning whether $x_o$ is an extrapolation far outside the factor space of the original data. For example, an extrapolation may be defined when $h_{prd}>T$. When $h_{prd}>T$, processing continues in an operation 228. When $h_{prd}\leq T$, processing continues in operation 230.

Figure 13:
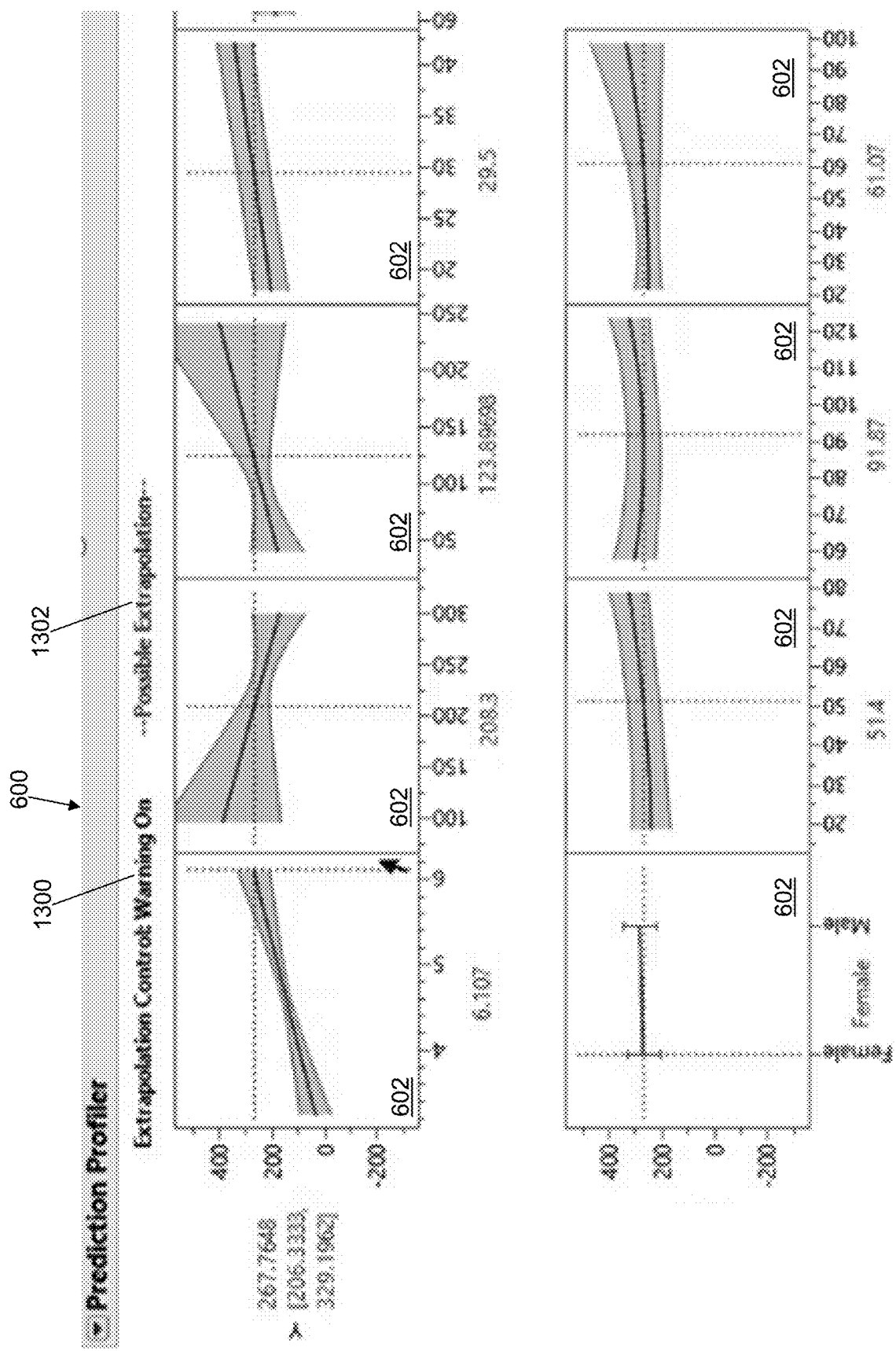

In operation 228, a prediction graph is shown that includes a warning of the extrapolation, and processing continues in operation 264 shown referring to FIG. 2C. The prediction graph shows a range of values for each explanatory variable based on a maximum value and a minimum value of each respective explanatory variable found in input dataset 124. For example, referring to FIG. 13, prediction profiler window 600 has been updated to indicate that the warning selector is active using selector text 1300 and that $x_o$ is a possible extrapolation far outside the factor space of the original data using extrapolation warning text 1302. For example, FIG. 13 shows illustrative prediction graphs in the form of the one or more explanatory variable profile graphs 602.

Figure 14:
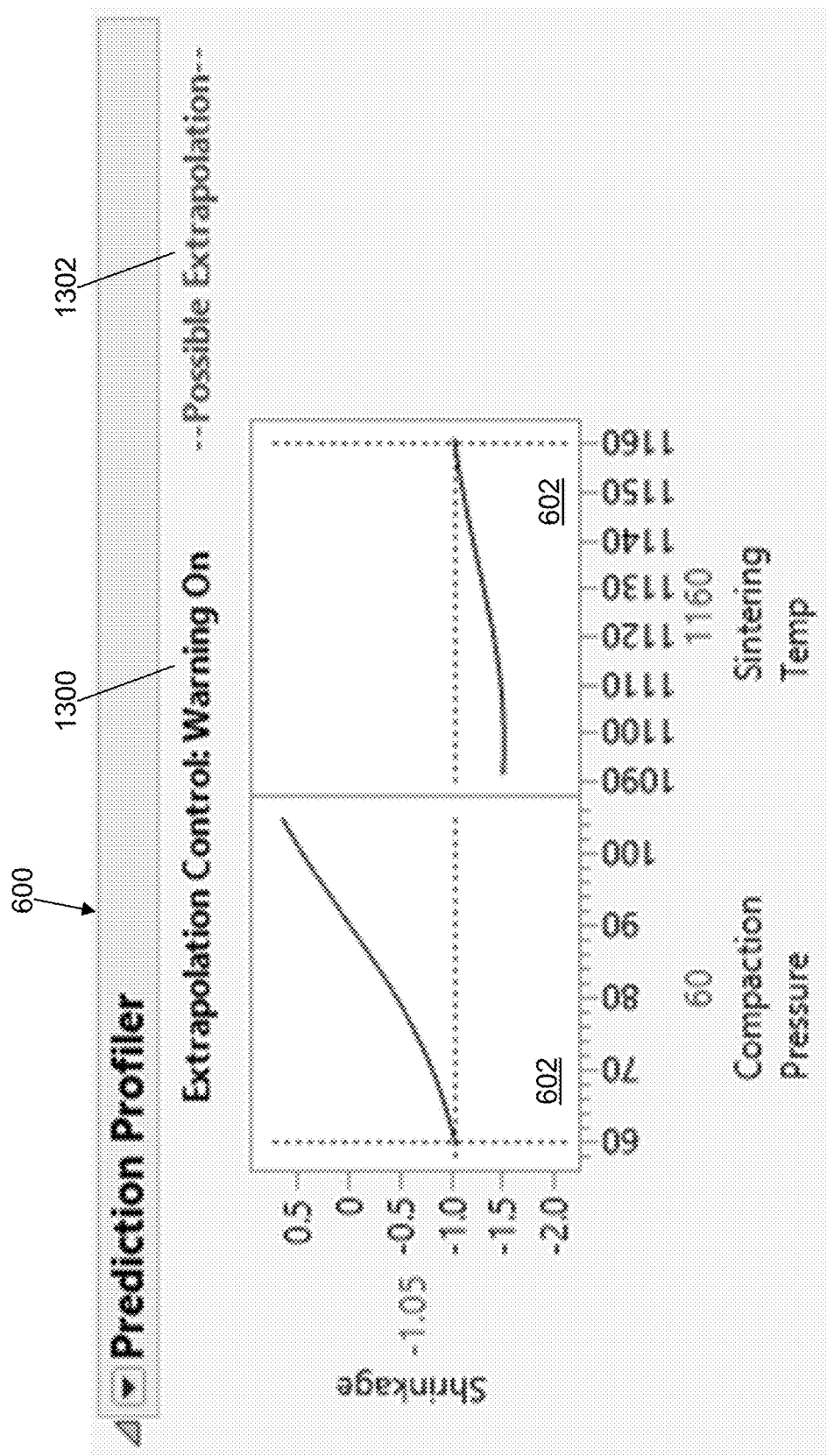
Figure 15:
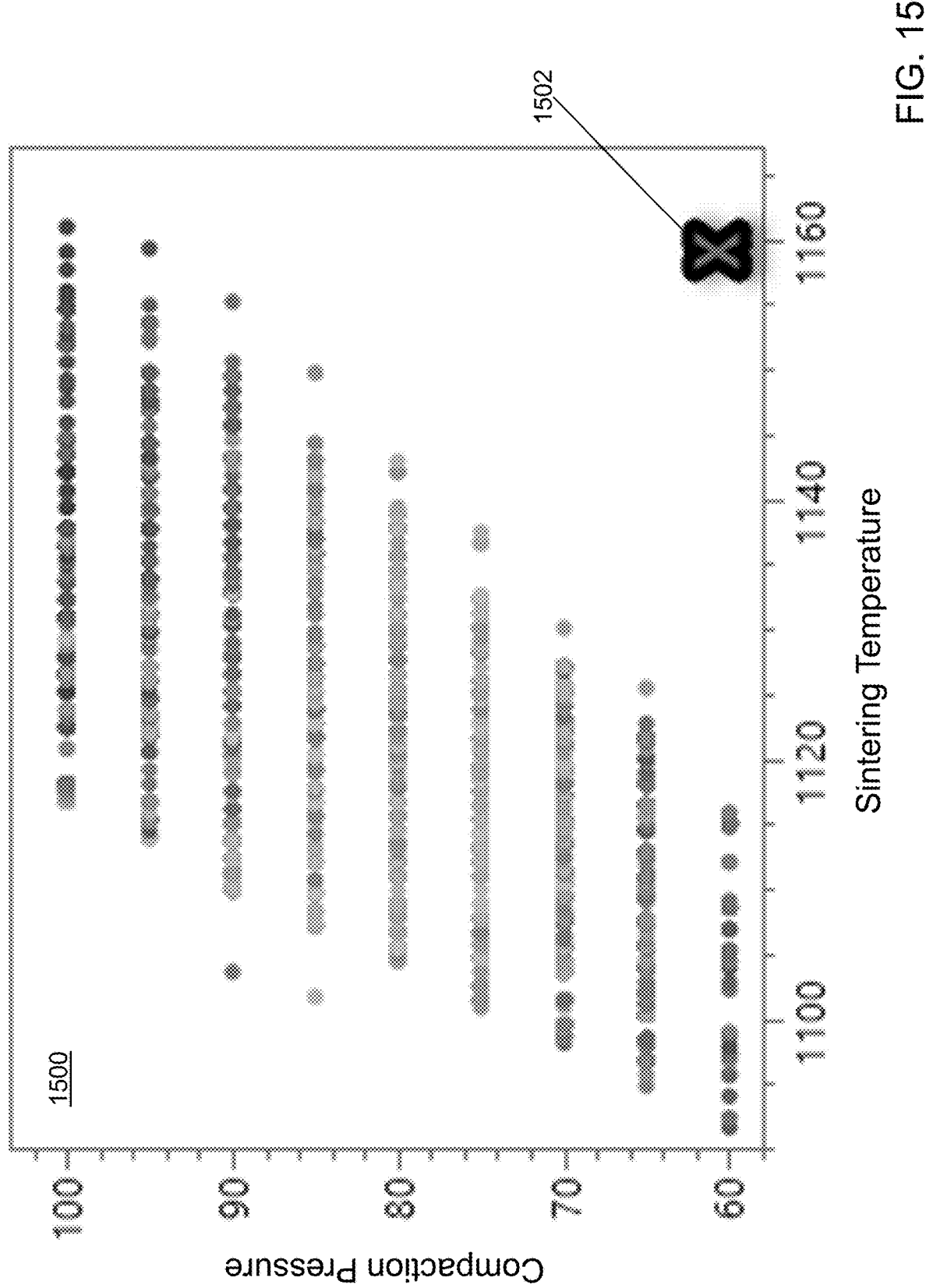

As another example, referring to FIG. 14, prediction profiler window 600 has been updated to indicate that the warning selector is active using selector text 1300 and that $x_o$ is a possible extrapolation far outside the factor space of the original data using extrapolation warning text 1302. For illustration, referring to FIG. 15, a scatterplot 1500 of the compaction explanatory variable as a function of the sintering temperature variable is shown using the values read from input dataset 124. A point 1502 shows the compaction explanatory variable value and the sintering temperature variable value included in $x_o$ and shown by the selections in FIG. 14. Point 1502 is well outside the distribution of the data points despite being within the extreme values of the compaction explanatory variable and the sintering temperature variable. Due to this, the extrapolation value $h_{prd}$ exceeds the threshold T computed in operation 212 triggering inclusion of extrapolation warning text 1302 in prediction profiler window 600 of FIG. 14.

Figure 16:
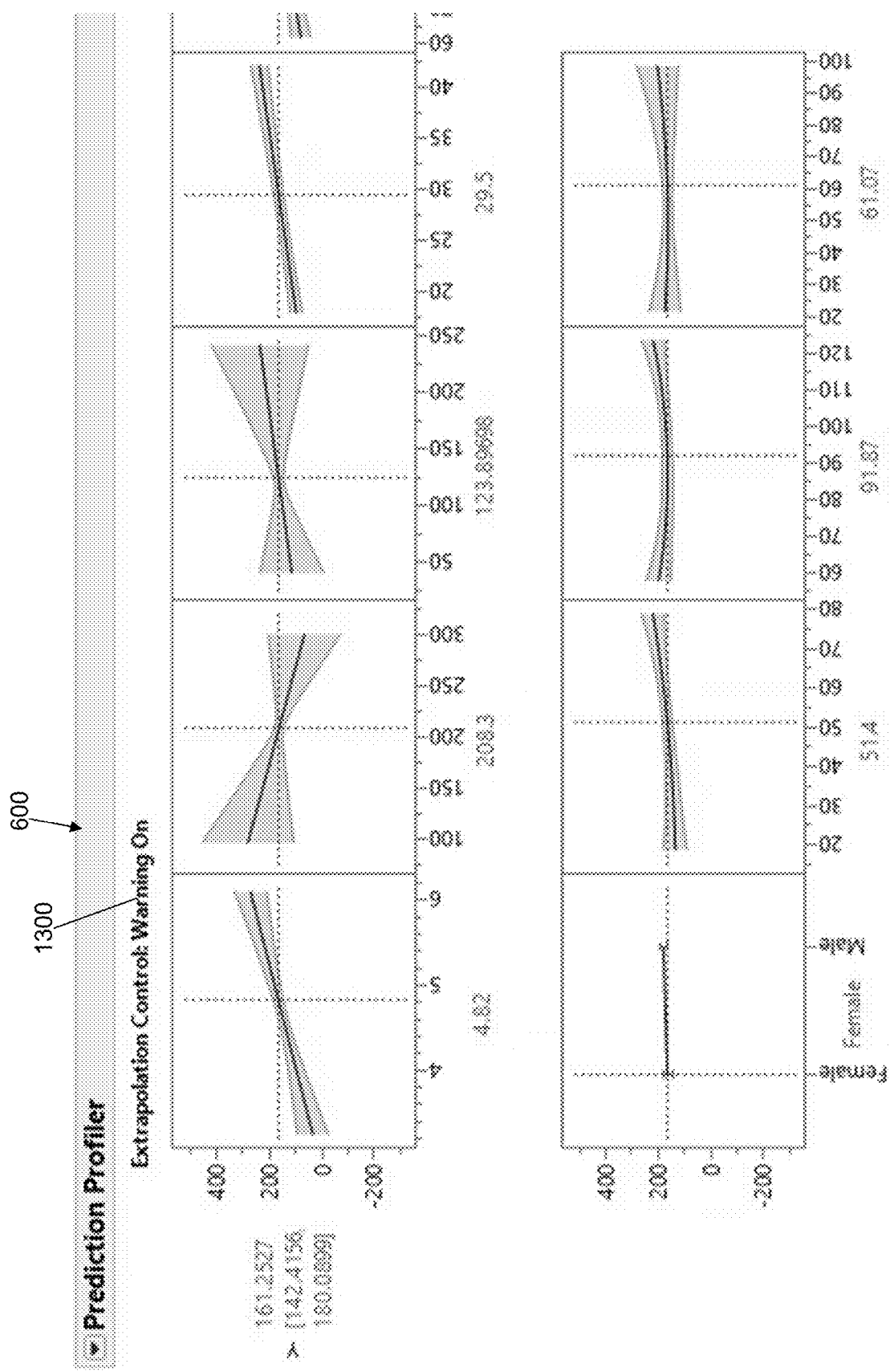

Referring to FIG. 16, prediction profiler window 600 has been updated to indicate that the warning selector is active using selector text 1300 but that $x_o$ is not a possible extrapolation beyond the convex hull of the data because extrapolation warning text 1302 is not included.

Referring again to FIG. 2A, in operation 230, a prediction graph is shown, and processing continues in operation 264 shown referring to FIG. 2C. The prediction graph shows a range of values for each explanatory variable based on the maximum value and the minimum value of each respective explanatory variable found in input dataset 124. For example, FIG. 6 shows illustrative prediction graphs in the form of the one or more explanatory variable profile graphs 602.

Referring to FIG. 2B, in operations 232 through 262, a non-extrapolated range is determined for each explanatory variable based on a current value of each other explanatory variable shown, for example, by value 606 when a profile trace has not already been computed. In an alternative embodiment, a profile trace may be computed for each continuous explanatory variable by calculating the predicted response over a grid of equally spaced points from a minimum value to a maximum value determined from the data for each continuous explanatory variable. Illustrative profile traces are shown in the one or more explanatory variable profile graphs 602. A grid size may be predefined by default or by a user. When extrapolation control is turned to "on", each of these grid points is tested to see if it is considered extrapolated. If it is found to be extrapolated, the point is not shown. If it is not extrapolated, it is shown. A curve is drawn through all the grid points that are shown. In the case of a categorical explanatory variable, the "grid" that is used is all the levels of that categorical explanatory variable.

In operation 232, a next explanatory variable is selected from the one or more explanatory variables indicated in operation 204. For example, in each single loop defined by operation 232 through 260, a first explanatory variable is selected on a first iteration of 232; a second explanatory variable is selected on a second iteration of 232; etc. until a next execution of the single loop. On a next loop, the selections are again, a first explanatory variable is selected on a first iteration of 232; a second explanatory variable is selected on a second iteration of 232; etc.

In an operation 234, a value for each other explanatory variable is identified. For example, the value of each other explanatory variable shown, for example, by value 606 may be identified.

In an operation 236, the minimum value of the selected next explanatory variable $x_{min,j}$ is identified from the data range.

In an operation 238, a test value t, a first extrapolation flag $f_1$, and a second extrapolation flag $f_2$ may be initialized. For example, the test value t may be initialized using $t=x_{min,j}$. For example, the first extrapolation flag $f_1$ and the second extrapolation flag $f_2$ may be initialized using $f_1=0$ and $f_2=0$.

In an operation 240, an extrapolation value $h_{prd}$ is computed using $x_o$ defined with the values identified in operation 234 and with the explanatory variable value associated with the selected next explanatory variable j replaced with test value t. For example, when the leverage extrapolation function is indicated in operation 208, extrapolation value $h_{prd}$ is computed using $h_{prd}=x_o^\top (X^\top X)x_o$; when the Hotelling's extrapolation function is indicated in operation 208, extrapolation value $h_{prd}$ is computed using $h_{prd}=(x_o-\mu)^\top \Sigma^{-1}(x_o-\mu)$.

In an operation 242, a determination is made concerning whether the computed extrapolation value indicates occurrence of extrapolation. When $h_{prd}>T$, processing continues in an operation 250. When $h_{prd}\leq T$, processing continues in an operation 244.

In operation 244, a determination is made concerning whether the first extrapolation flag $f_1>0$. When $f_1>0$, processing continues in an operation 256 because an extrapolated minimum value has already been defined. When $f_1\leq 0$, processing continues in an operation 246 to define the extrapolated minimum value.

In operation 246, the extrapolated minimum value $x_{ex-min,j}$ is stored as $x_{ex-min,j}=t$ for the selected next explanatory variable j.

In an operation 248, the first extrapolation flag is set. For example, $f_1=1$, and processing continues in operation 256.

In operation 250, a determination is made concerning whether the extrapolated minimum value has been defined and an extrapolated maximum value has not been defined based on the extrapolation flags. When $f_1>0$ and $f_2\leq 0$, processing continues in an operation 252 to define the extrapolated maximum value. When $f_1\leq 0$ or $f_2>0$, processing continues in operation 256.

In operation 252, the extrapolated maximum value $x_{ex\text{-}max,j}$ is stored as $X_{ex\text{-}max,j}$=t for the selected next explanatory variable j.

In an operation 254, the second extrapolation flag is set. For example, $f_2$=1, and processing continues in operation 256.

In operation 256, an increment value $\Delta$ is added to the test value t for the selected next explanatory variable j, for example, using t=t+$\Delta$. For example, the increment value $\Delta$ may be defined based on a difference between $x_{min,j}$ and $x_{max,j}$, where $x_{max,j}$ is the maximum value of the selected next explanatory variable j. For example, an illustrative increment value $\Delta$ may be defined using $\Delta=(x_{max,j}-x_{min,j})/10$.

In an operation 258, a determination is made concerning whether the extrapolated maximum value has been defined or the range of values for the selected next explanatory variable j has been evaluated. When t<$x_{max,j}$ and $f_2 \leq 0$, processing continues in operation 240 to continue to evaluate the range of values. When t$\geq x_{max,j}$ or $f_2 > 0$, processing continues in an operation 260.

In operation 260, a determination is made concerning whether there is another explanatory variable for which to determine a range limited to avoid extrapolation. When there is another explanatory variable, processing continues in operation 232. When there is not another explanatory variable, processing continues in an operation 262.

Figure 17:
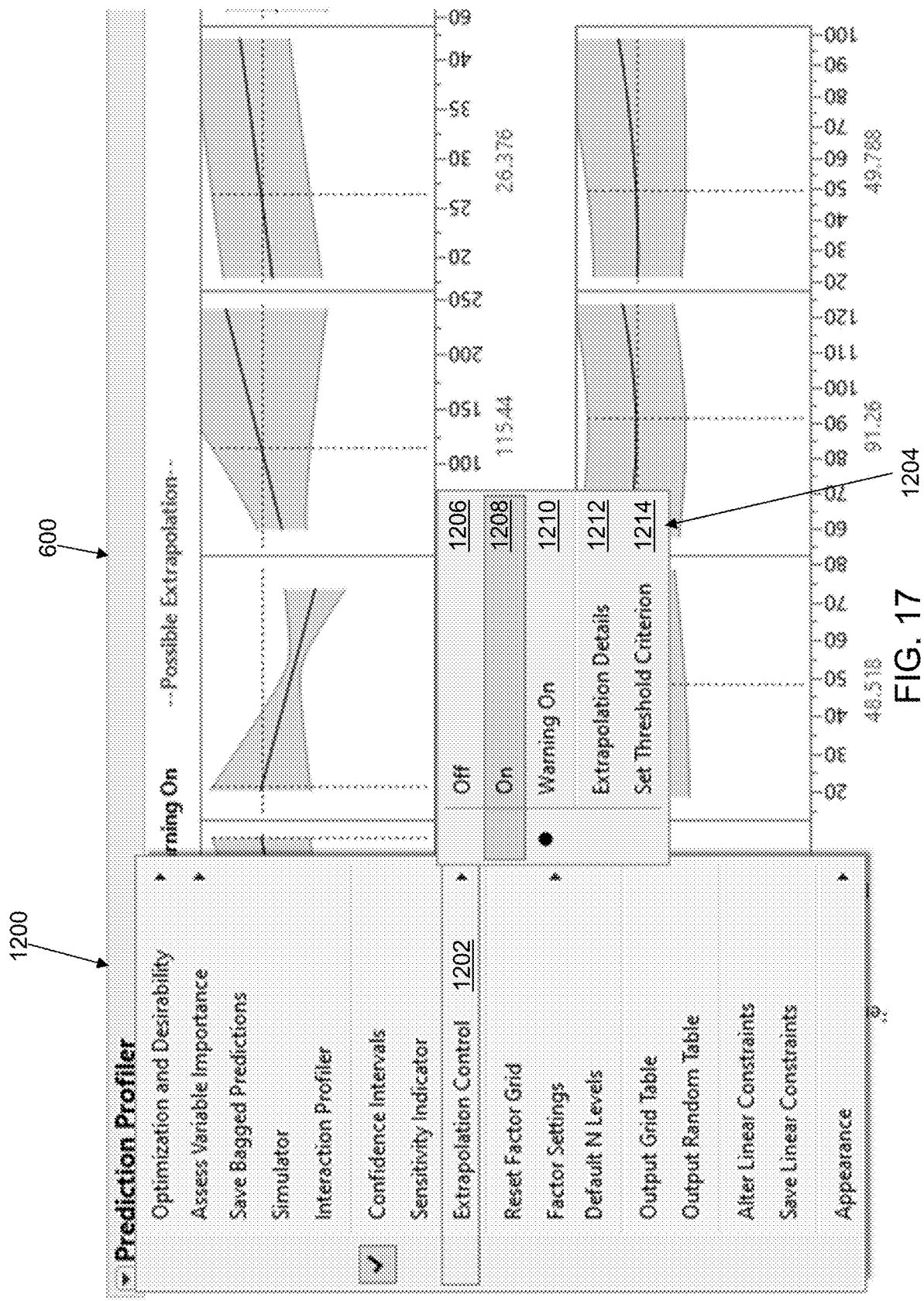

In operation 262, a prediction graph is shown that shows the non-extrapolated range defined using the stored extrapolated minimum value and the stored extrapolated maximum value for each explanatory variable or the tested profile trace grid points, and processing continues in operation 264 shown referring to FIG. 2C. For example, referring to FIG. 17, extrapolation control is active in the warning state when the "Warning On" selector 1210 is selected as indicated in FIG. 17 though the user is switching to the extrapolation control active and on state.

Figure 18:
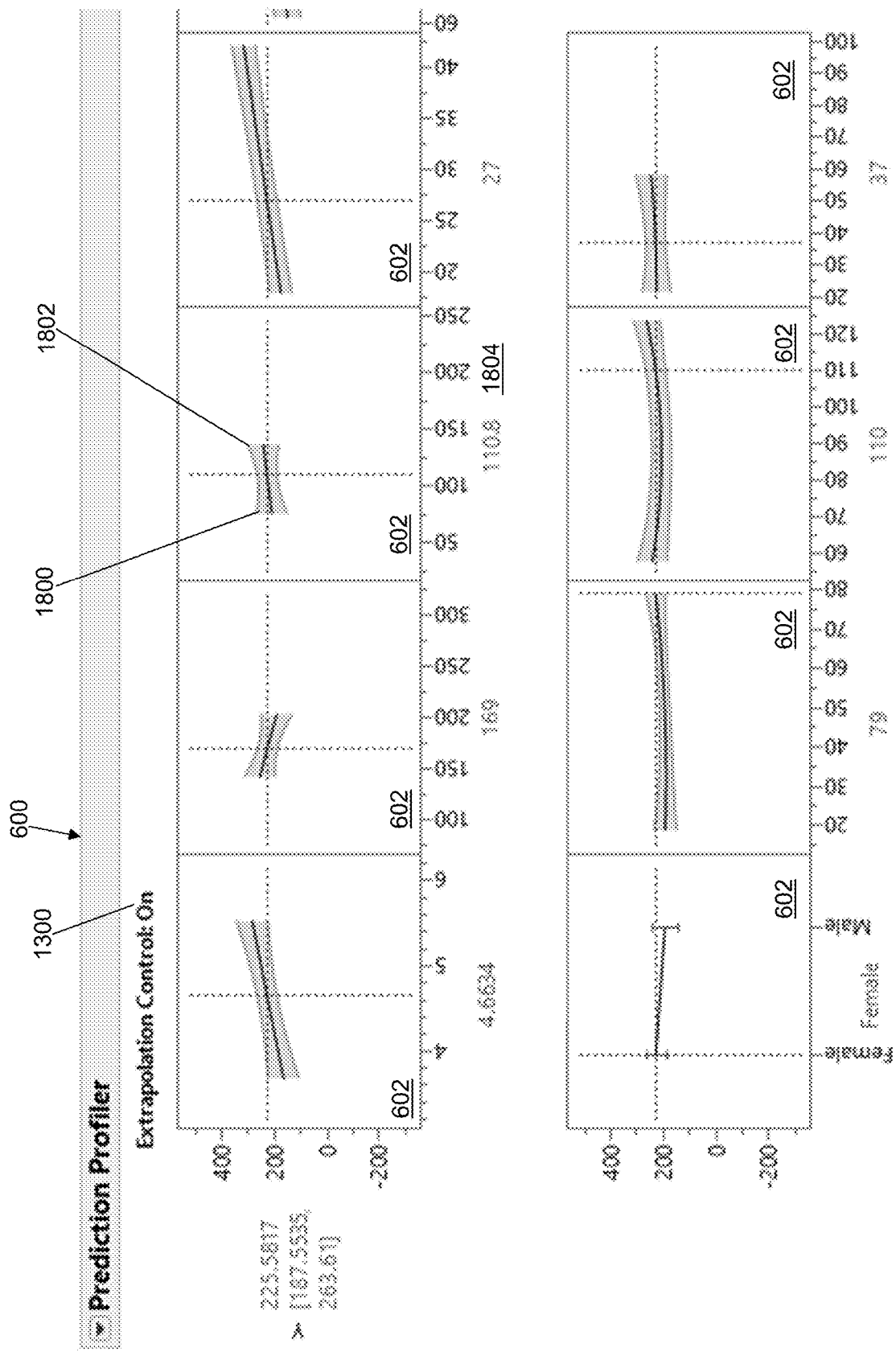

In response to switching to the extrapolation control active and on state, a prediction graph is shown referring to FIG. 18. Selector text 1300 has been updated to recite "On" and the prediction graph shows a range of values for each explanatory variable based on the non-extrapolated range defined using the stored extrapolated minimum value and the stored extrapolated maximum value of each respective explanatory variable found in input dataset 124 or the tested profile trace grid points. For example, an extrapolated minimum value 1800 and an extrapolated maximum value 1802 are shown for a third explanatory variable 1804. FIG. 18 shows illustrative prediction graphs in the form of the one or more explanatory variable profile graphs 602.

Figure 19:
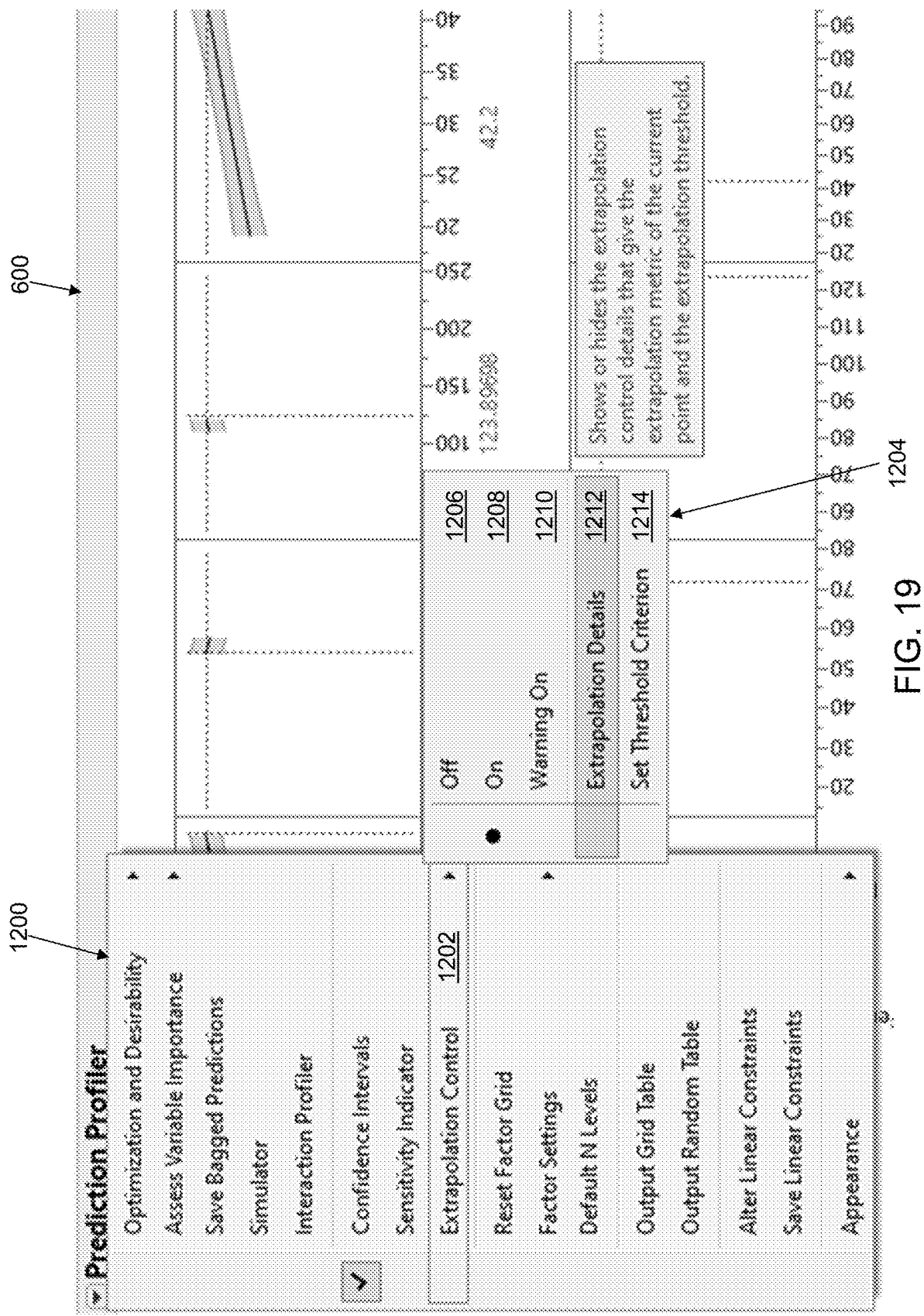
Figure 20:
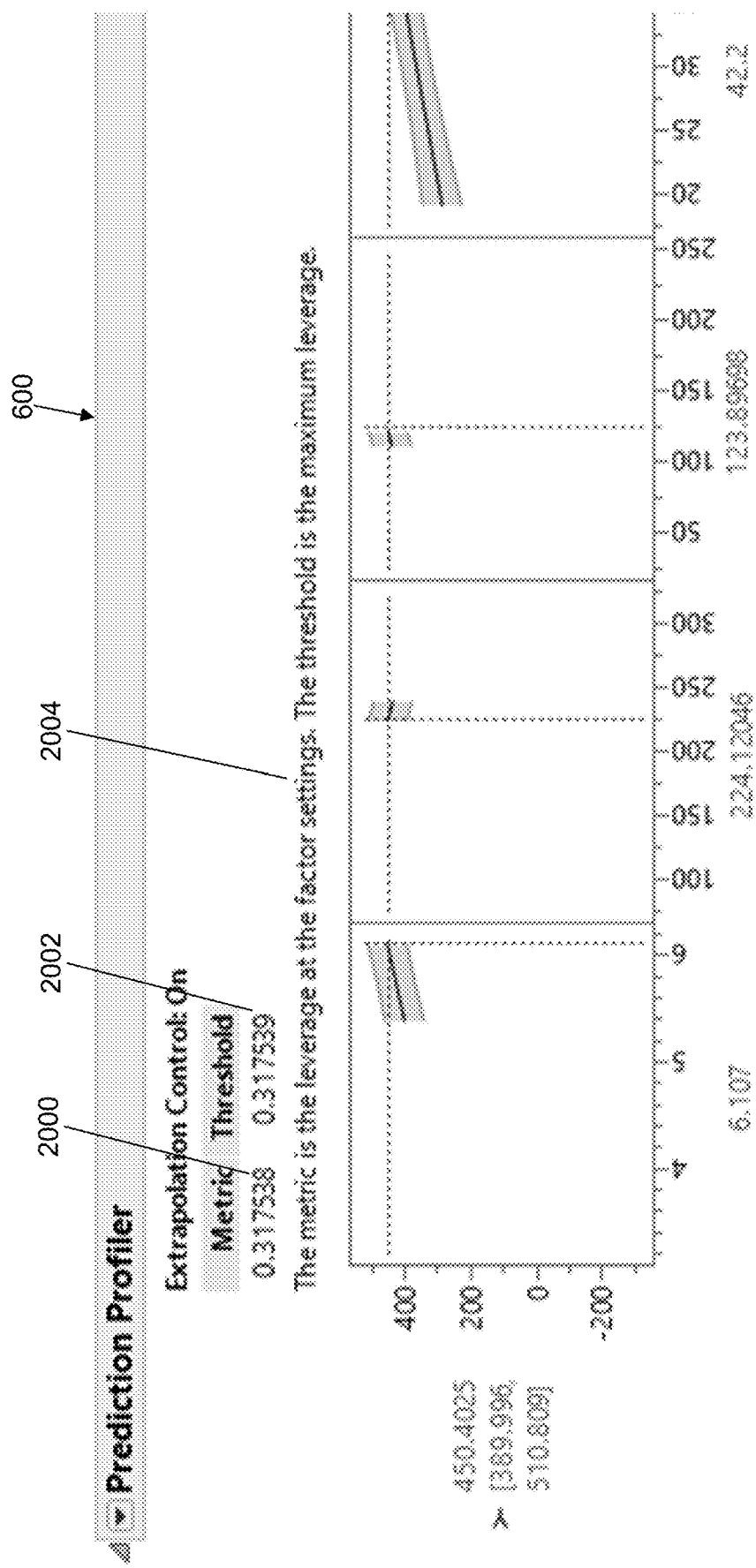
Figure 21:
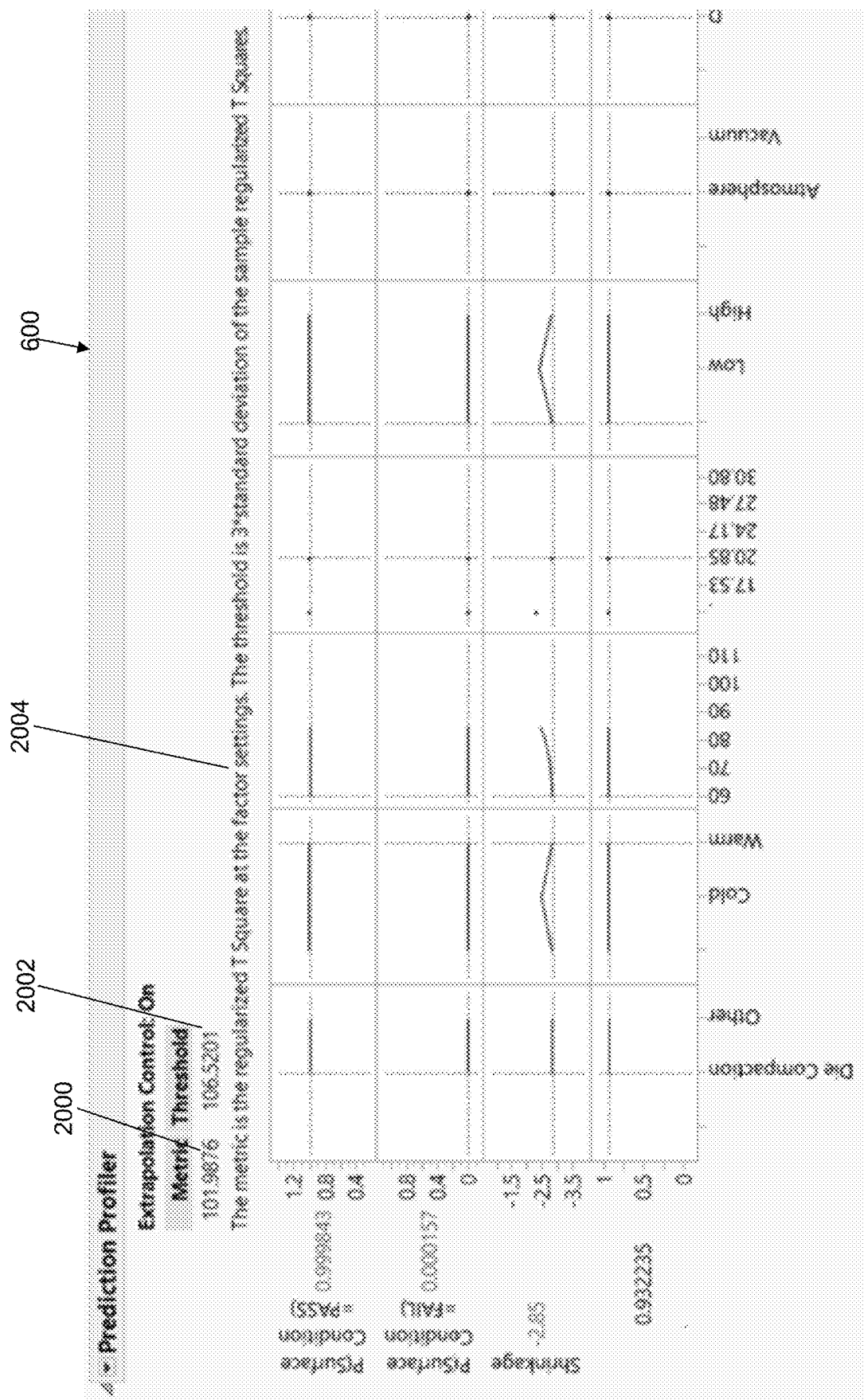

Referring to FIG. 19, "Extrapolation Details" selector 1212 is selected by the user. Selection of "Extrapolation Details" selector 1212 shows or hides extrapolation control details. For example, referring to FIG. 20, prediction profiler window 600 is updated to include a metric value indicator 2000 that shows extrapolation value $h_{prd}$, a threshold value indicator 2002 that shows extrapolation threshold value T, and methodology text 2004 that describes the extrapolation function and the extrapolation threshold function selected in operations 208 and 210, respectively. In the illustrative embodiment of FIG. 20, methodology text 2004 indicates selection of leverage extrapolation function and maximum leverage threshold function. As another illustrative embodiment, referring to FIG. 21, prediction profiler window 600 is updated to include methodology text 2004 that indicates selection of Hotelling's extrapolation function and Hotelling's threshold function.

Figure 22:
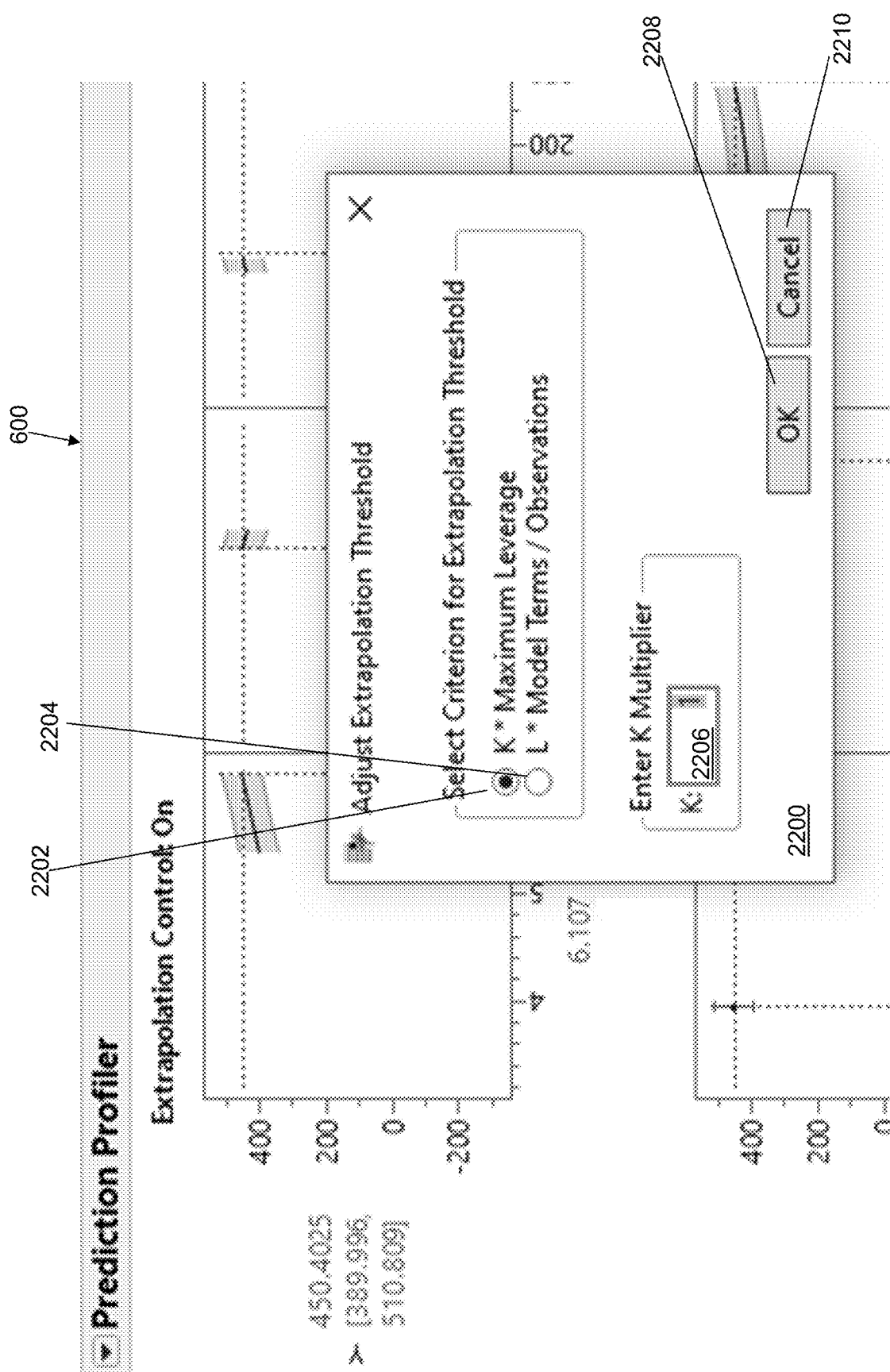

Referring to FIG. 22, "Set Threshold Criterion" selector 1214 has been selected by the user. Selection of "Set Threshold Criterion" selector 1214 triggers presentation of a select threshold function window 2200 in accordance with an illustrative embodiment. Select threshold function window 2200 may include a maximum leverage button 2202, an average leverage button 2204, a multiplier selector 2206, an accept button 2208, and a cancel button 2210. Selection of maximum leverage button 2202 indicates selection of maximum leverage threshold function with the value entered in multiplier selector 2206 used to define the first multiplier value $k_1$. Selection of average leverage button 2204 indicates selection of average leverage threshold function with the value entered in multiplier selector 2206 used to define the second multiplier value $k_2$. Selection of accept button 2208 accepts any changes made using maximum leverage button 2202, average leverage button 2204, and/or multiplier selector 2206. Selection of cancel button 2210 does not accept any changes made using maximum leverage button 2202, average leverage button 2204, and/or multiplier selector 2206.

Figure 23:
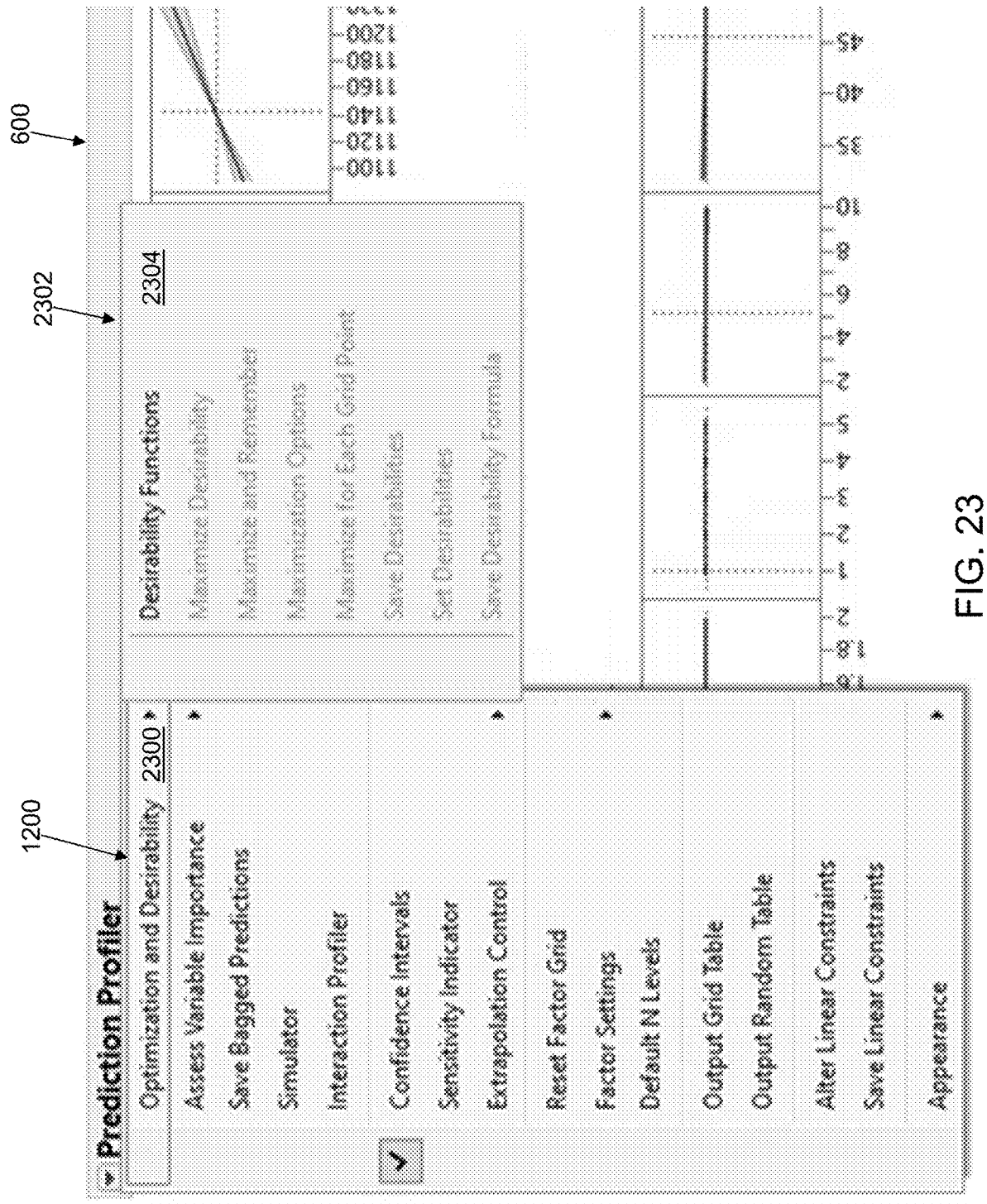
Figure 24:
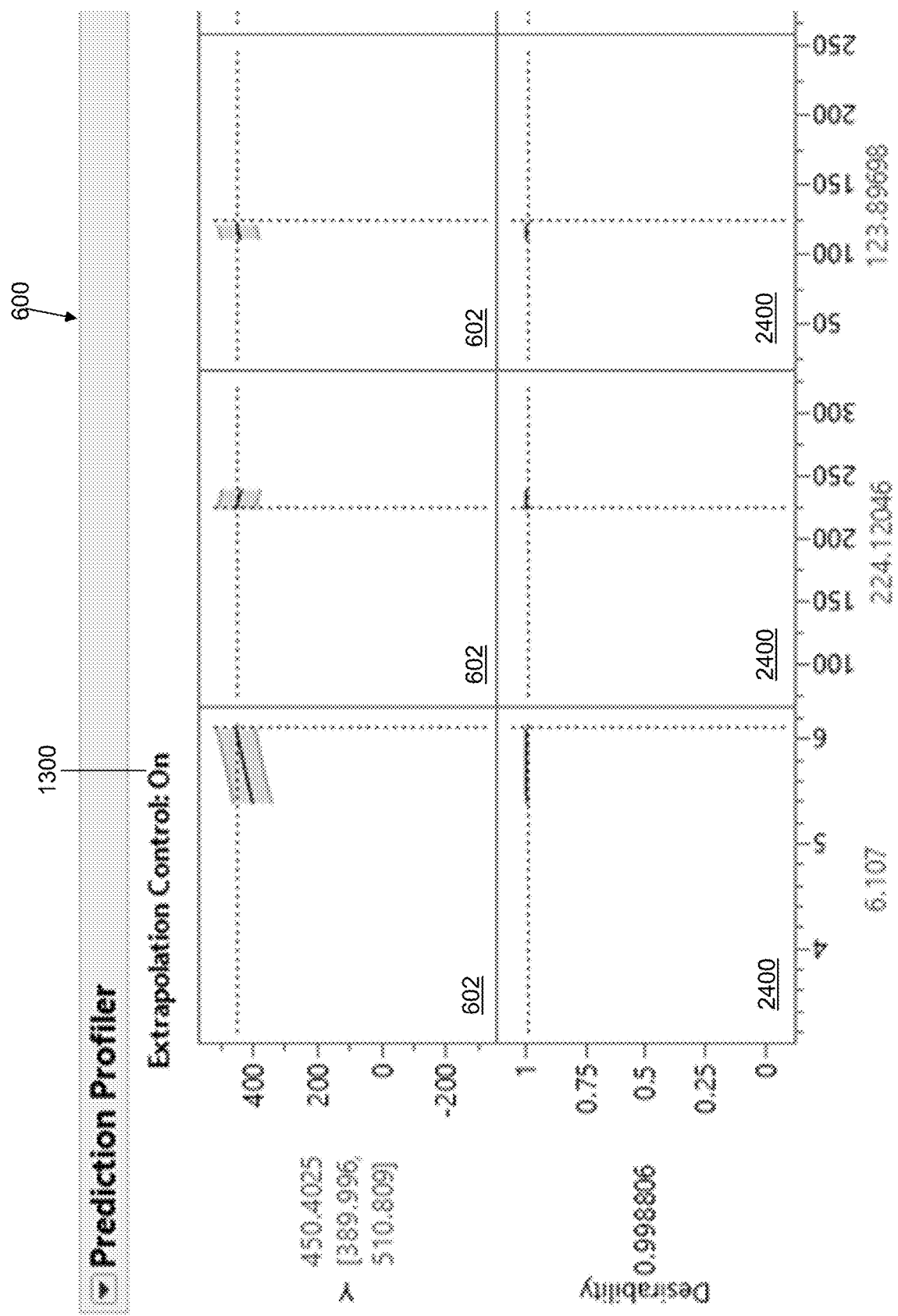

Referring to FIG. 2C, in operation 264, a determination is made concerning whether an interaction by the user with user interface window 300 indicates an optimization of the response variable. When the interaction indicates an optimization, processing continues in an operation 266. When the interaction does not indicate an optimization, processing continues in an operation 276. For example, referring to FIG. 23, profiler drop-down menu 1200 is shown in accordance with an illustrative embodiment after selection of the down arrow from the header bar of prediction profiler window 600. Profiler drop-down menu 1200 may further include an optimization control selector 2300. In response to selection of optimization control selector 2300, an optimization menu 2302 may be opened. Optimization menu 2302 may include a "Desirability Functions" selector 2304. The user selects "Desirability Functions" selector 2304 to turn desirability functions. For example, referring to FIG. 24, a desirability graph 2400 has been created in association with each of the one or more explanatory variable profile graphs 602 to show a plot for each explanatory variable showing its desirability trace. Though not shown, a column may be added that has an adjustable desirability function for each response variable. An overall desirability measure has a scale of zero to one.

Figure 25:
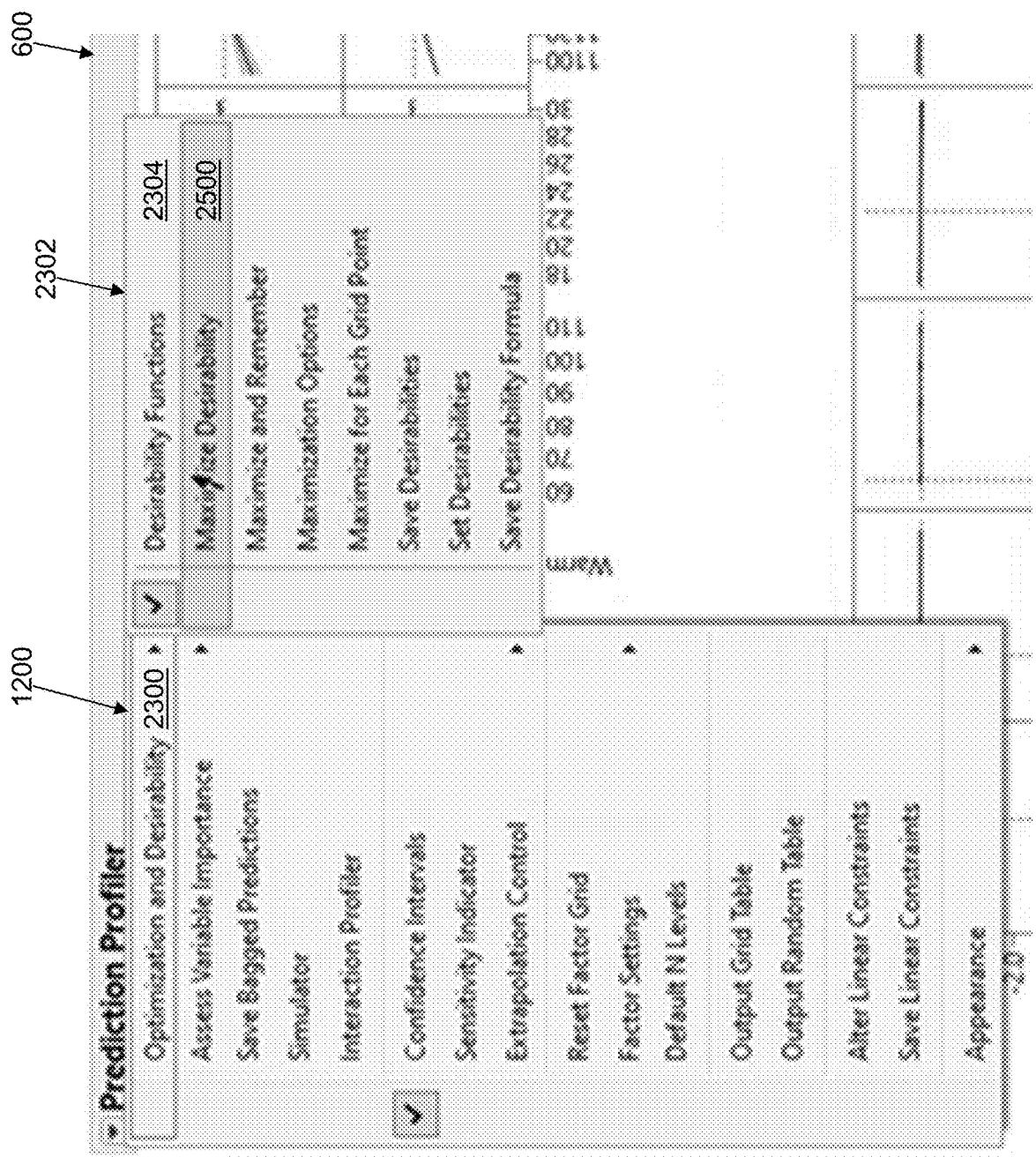

Referring to FIG. 25, optimization menu 2302 may further include a "Maximize Desirability" selector 2500. Selection "Maximize Desirability" selector 2500 triggers an optimization to maximize the desirability and is an illustrative interaction by the user to optimize the response variable.

Referring again to FIG. 2C, in operation 266, an optimization is performed for the response variable using the range of values for each explanatory variable based on the maximum value and the minimum value of each respective explanatory variable found in input dataset 124 as bound constraints.

In operation 268, a determination is made concerning whether the check for extrapolation is on and, if so, whether the optimal solution is extrapolated. When the check for extrapolation is on and the optimal solution is extrapolated, processing continues in an operation 270. When the check for extrapolation is not on or the optimal solution is not extrapolated, processing continues in an operation 274.

In operation 270, an optimization is performed subject to the bound constraints and the extrapolation constraint $f(x) \leq T$, where $f(x)$ is the extrapolation function evaluated at the point x.

In operation 274, an optimization graph is presented. For example, referring to FIG. 26, the optimization to maximize the desirability has been performed with extrapolation control on.

Figure 26:
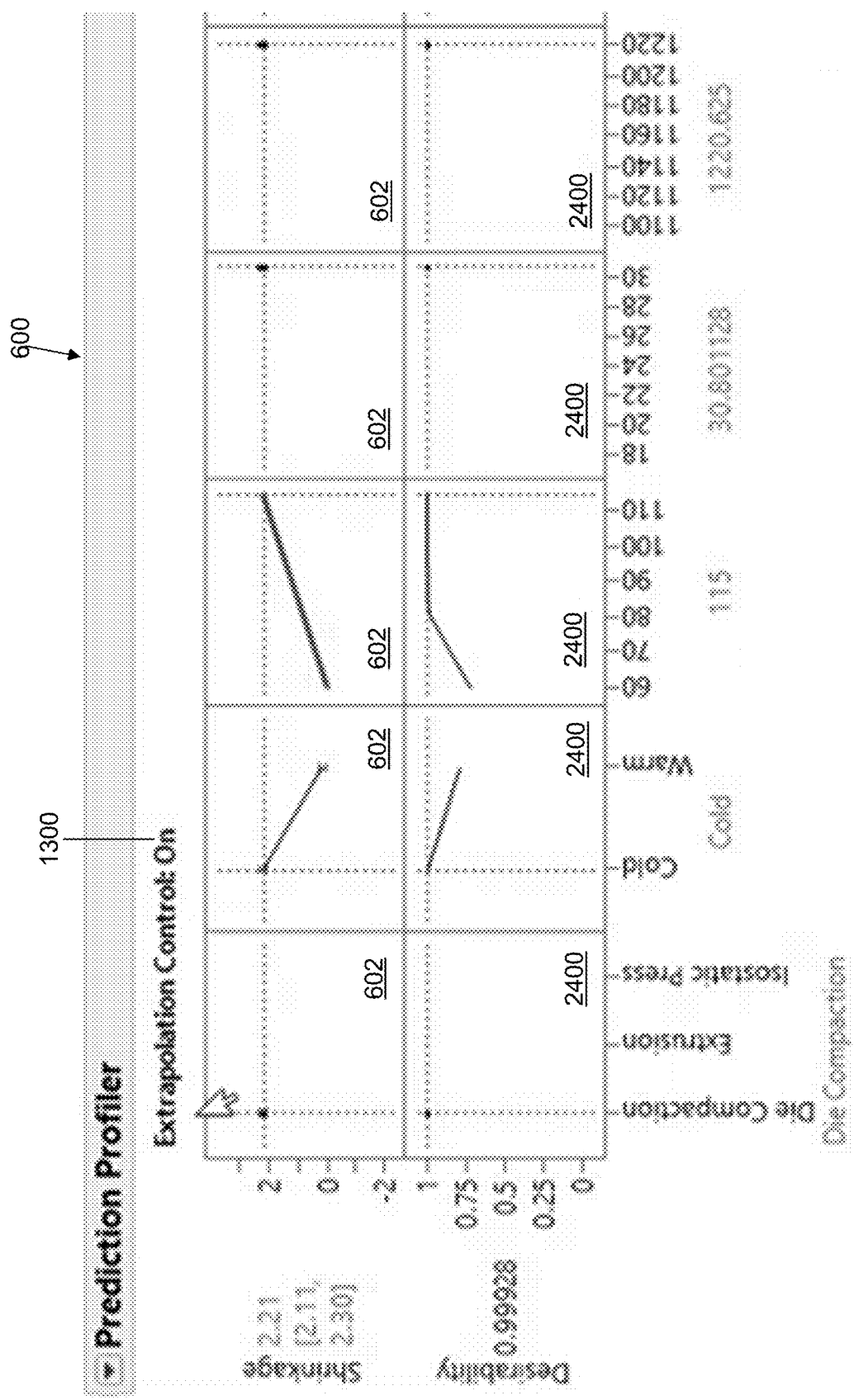
Figure 27:
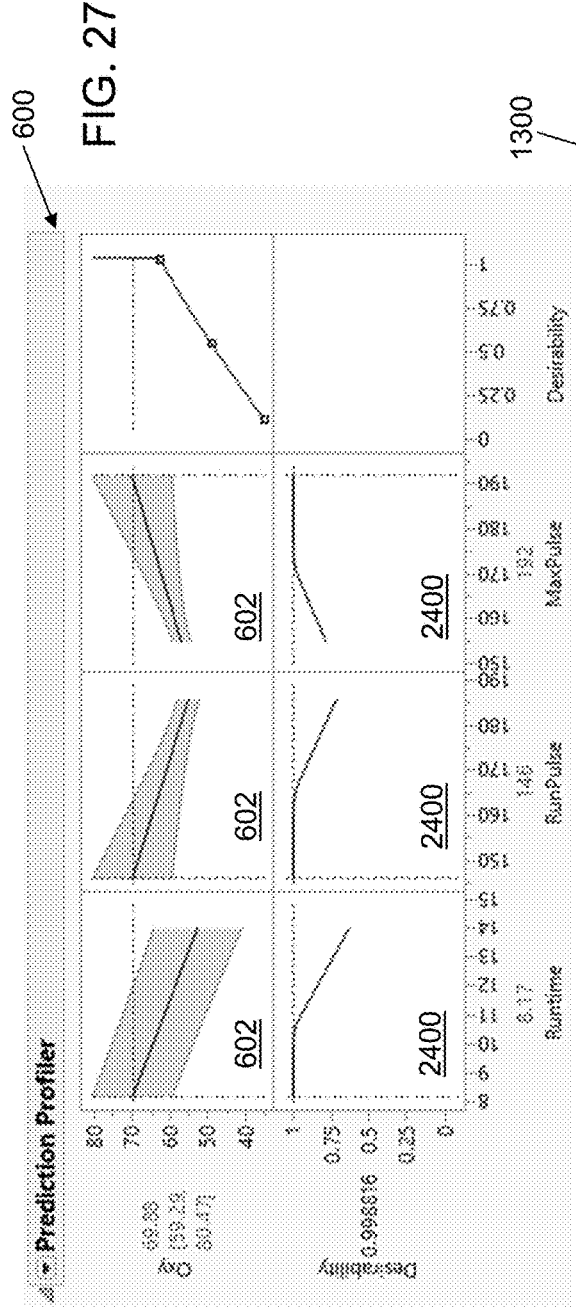
Figure 28:
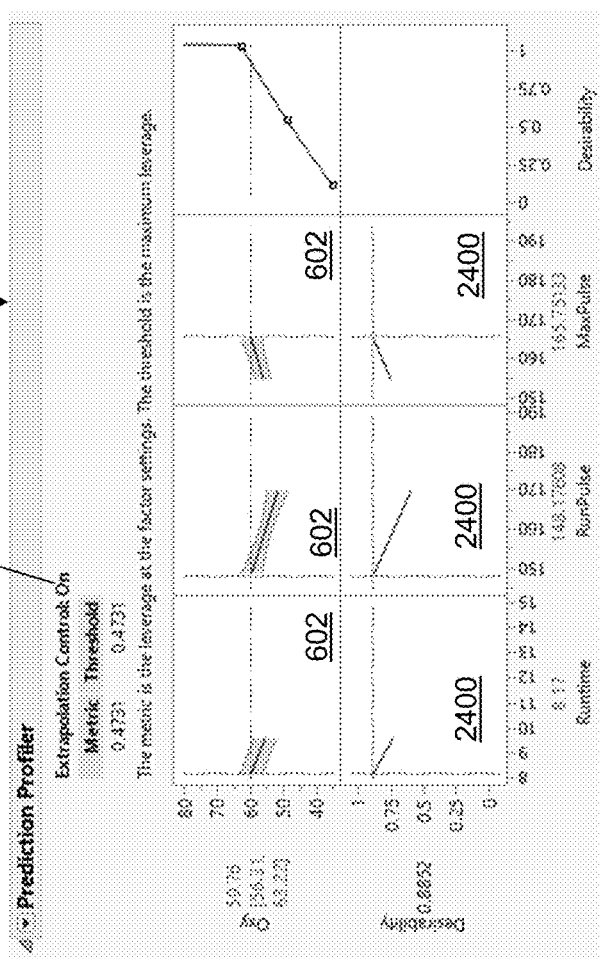

Referring to FIG. 27, a second optimization to maximize the desirability has been performed with extrapolation control off for a different input dataset 124 than that shown in FIG. 26. Referring to FIG. 28, the optimization to maximize the desirability has been performed with extrapolation control on with the different input dataset 124. The desirability value of 0.998816 is greater than the desirability value of 0.8852 achieved with extrapolation control on because there is a possible extrapolation to achieve the higher value. Referring to FIG. 28, the optimization was performed with the additional extrapolation constraint, and the profile traces are drawn to show the constrained region.

Figure 29:
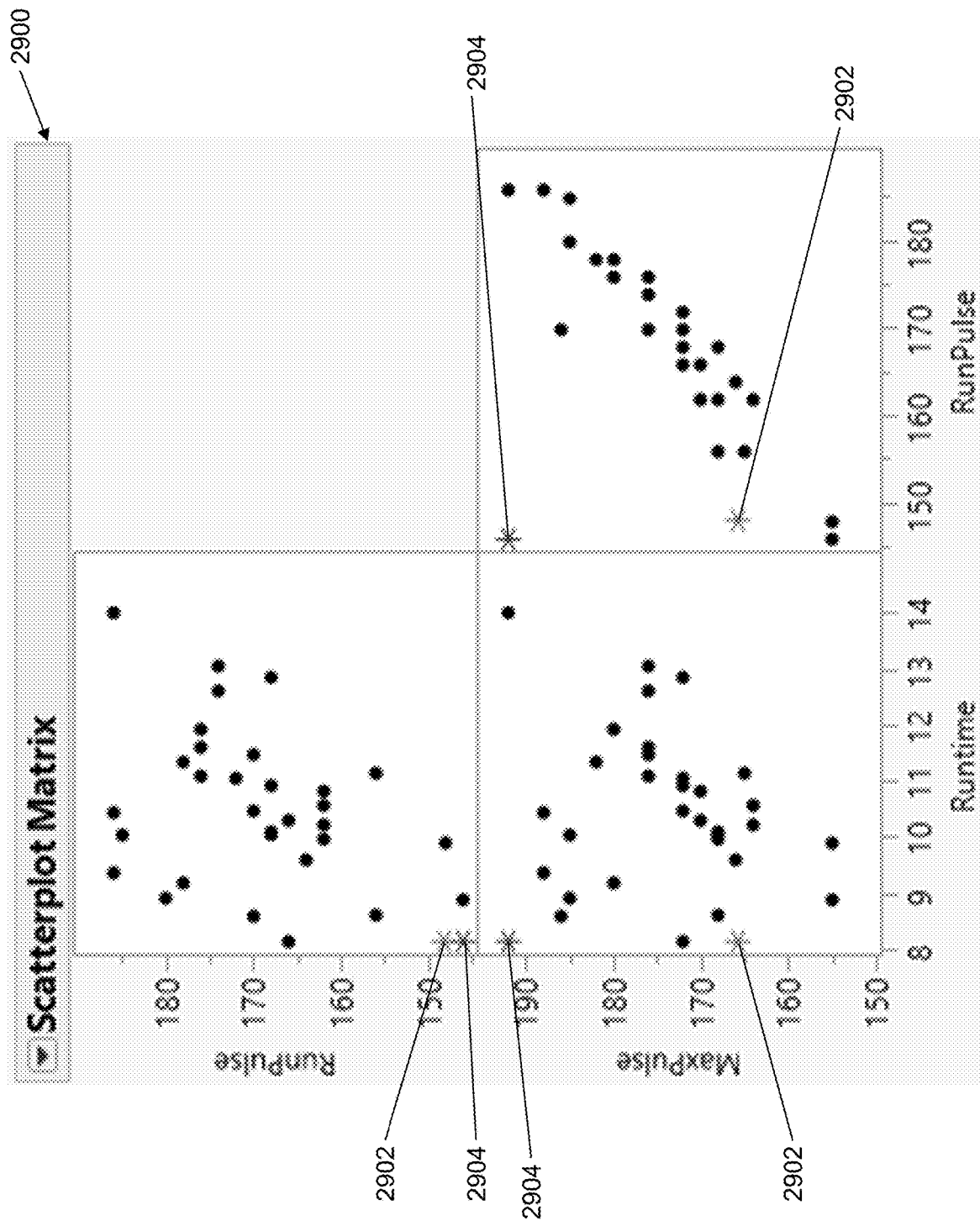

Referring to FIG. 29, a scatterplot 2900 of each pair of explanatory variables is shown using the values read from the different input dataset 124. First points 2902 show the optimum explanatory variable values found to achieve the maximization shown in FIG. 28 with extrapolation control on. Second points 2904 show the optimum explanatory variable values found to achieve the maximization shown in FIG. 27 with extrapolation control off. First points 2902 are all within the distribution of the data points unlike second points 2904.

Referring again to FIG. 2C, in operation 276, a determination is made concerning whether the user is done training/fitting the model. When the user is done training/fitting the model, processing continues in an operation 278. When the user is not done training/fitting the model, processing continues in operation 218 to monitor for user interactions to change the model or explanatory variable values. For example, user interface window 300 may provide many options for training/fitting various models and exploring an effect of various variable values on the trained/fit model.

In operation 278, a description of the trained/fit model is stored, for example, to model description 126 for use as a prediction model. Processing may be stopped or the prediction model may be used to predict new response variable values.

Figure 30:
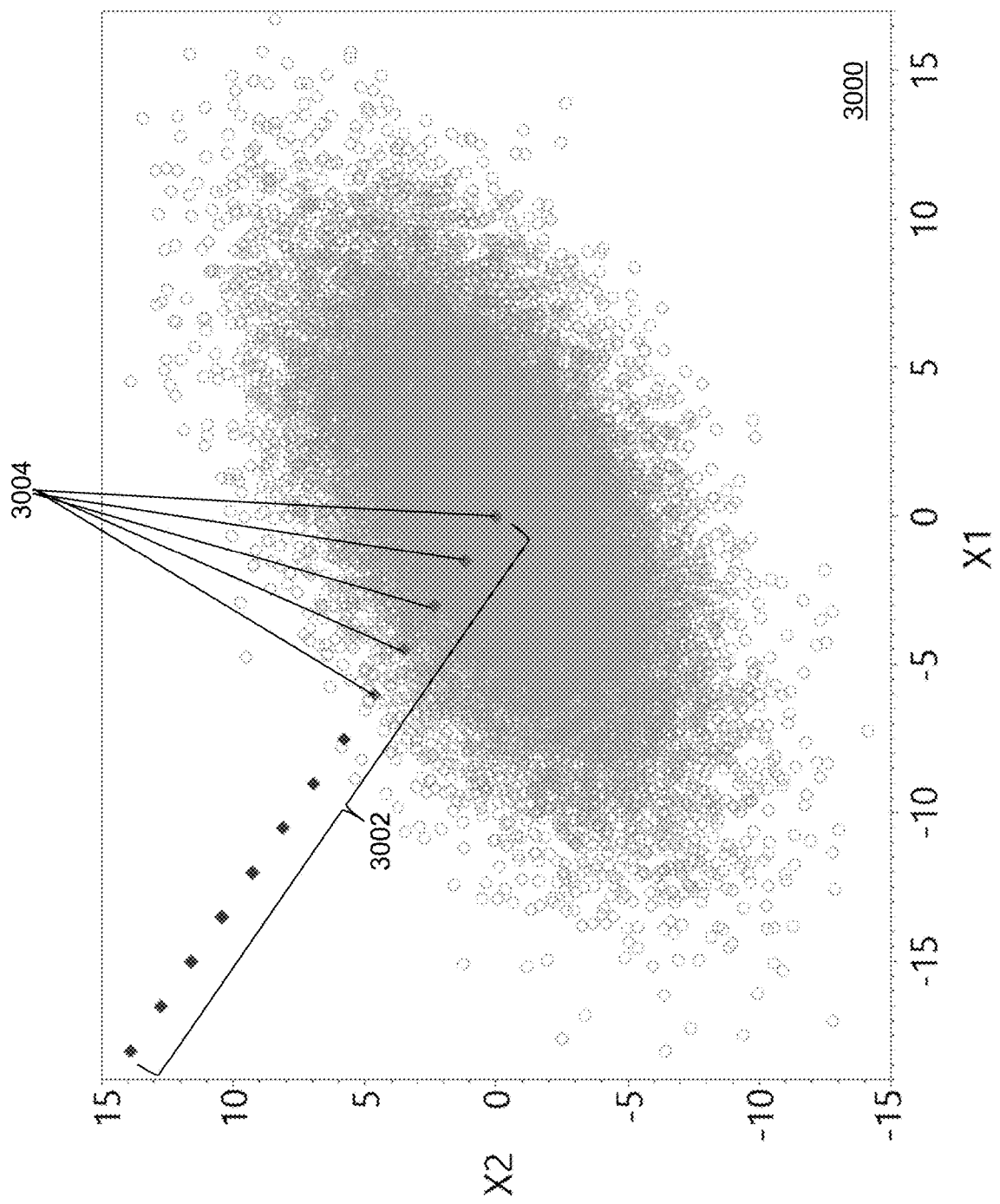
FIG. 30 shows two illustrative variables of a first dataset used to determine a performance of the prediction evaluation application of the prediction evaluation device of FIG. 1 with a grid of points used to identify extrapolation in accordance with an illustrative embodiment.

To evaluate the extrapolation control performance of prediction evaluation application 122, a simulation study was performed. A predictor matrix with a low rank approximation was simulated to evaluate the ability of prediction evaluation application 122 to detect violations of the correlation structure in the data defined using $X_{nxp}=U_{nxr}D_{rxp}+e_{nx1}$, where r is a desired rank, and each element of U, D, and e is independent identically distributed as a standard normal. Referring to FIG. 30, a scatterplot graph 3000 shows a distribution of $X_{nxp}$ for a pair of the most correlated variables, X1 and X2. Equally spaced grid points 3002 were extended from a center of the data to a corner of a box constraint defined based on a maximum value of variable X2 and a minimum value of X1 in $X_{nxp}$. Since the predictor variables are multivariate normal with known covariance matrix, $T^2$ is $\chi^2$-distributed. The probability that $T_{prd}^2$ for a grid point of the grid points 3002 is from the same distribution as the data is used to classify points as extrapolation or not extrapolation. Any observation with $P(T^2 \geq T_{prd}^2) < 0.05$ was considered extrapolation.

To evaluate the extrapolation control performance of model evaluation application 122 in terms of both false positive rate (FPR) and true positive rate (TPR), data were simulated with increasing sample sizes n from the multivariate normal distribution to get true class labels for grid points 3002. The sample data was used to compute the regularized Hotelling's T Square extrapolation threshold and determine how well grid points 3002 were classified as extrapolation or not. Grid points 3002 include non-extrapolated grid points 3004. 1,000 simulation replicates were performed.

Figure 31:
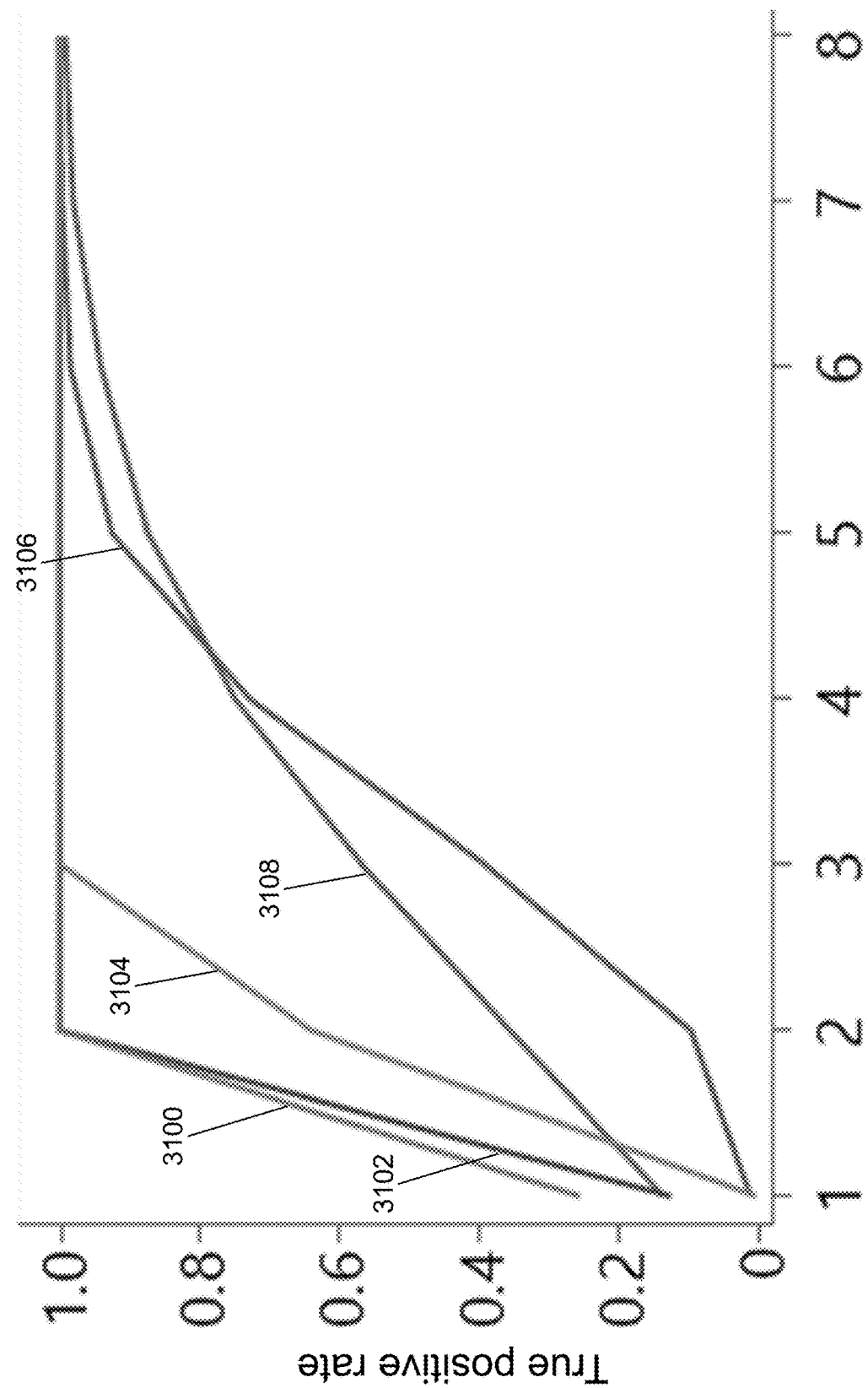
FIG. 31 shows a true positive rate as a function of a rank distance from a center computed using the prediction evaluation application with the first dataset, 20 explanatory variables, and a rank of 10 for samples sizes from 10 to 1,000.

Referring to FIG. 31, a true positive rate as a function of a rank distance from the center was computed using prediction evaluation application 122 with $X_{nxp}$ for p=20 explanatory variables and r=10. A first curve 3100 shows the TPR for n=1,000. A second curve 3102 shows the TPR for n=500. A third curve 3104 shows the TPR for n=100. A fourth curve 3106 shows the TPR for n=20. A fifth curve 3108 shows the TPR for n=10.

Figure 32:
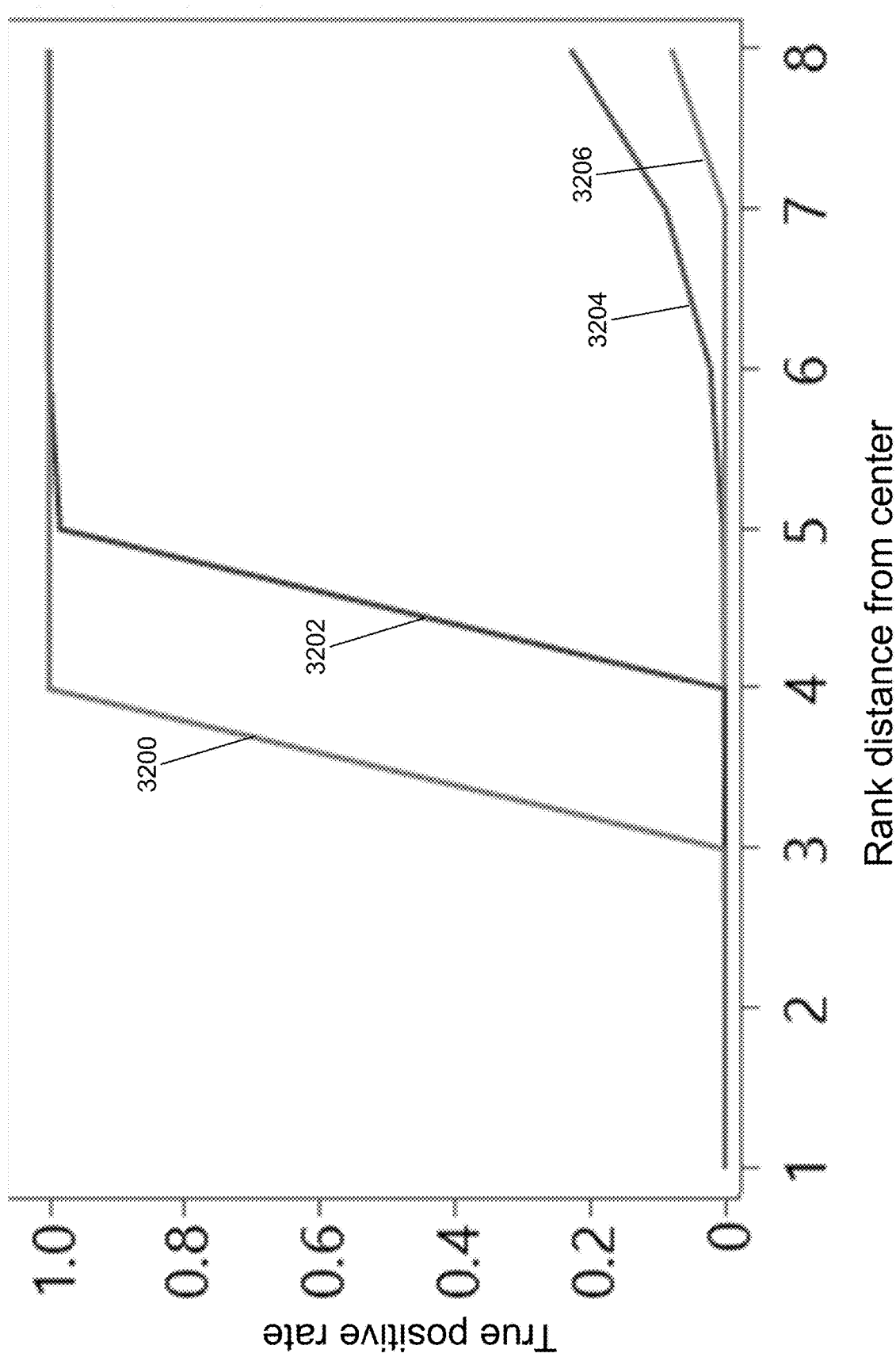
FIG. 32 shows a true positive rate as a function of a rank distance from a center computed using the prediction evaluation application with the first dataset, 100 explanatory variables, and a rank of 50 for samples sizes from 10 to 1,000.

Referring to FIG. 32, a true positive rate as a function of a rank distance from the center was computed using prediction evaluation application 122 with $X_{nxp}$ for p=100 explanatory variables and r=50. A first curve 3200 shows the TPR for n=1,000. A second curve 3202 shows the TPR for n=500. A third curve 3204 shows the TPR for n=100. A fourth curve 3206 shows the TPR for n=20.

Figure 33:
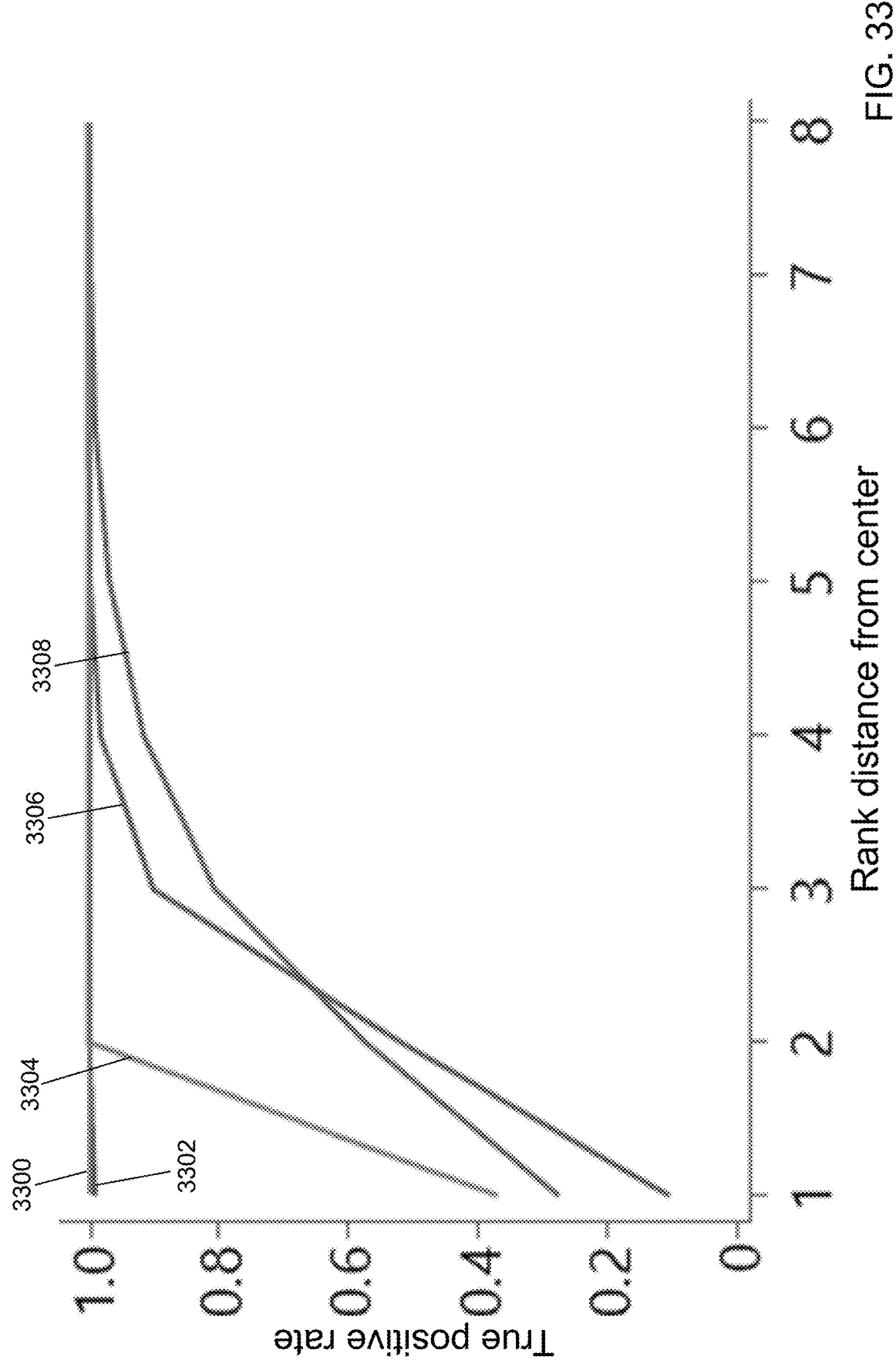
FIG. 33 shows a true positive rate as a function of a rank distance from a center computed using the prediction evaluation application with the first dataset, 20 explanatory variables, and a rank of 5 for samples sizes from 10 to 1,000.

Referring to FIG. 33, a true positive rate as a function of a rank distance from the center was computed using prediction evaluation application 122 with $X_{nxp}$ for p=20 explanatory variables and r=5. A first curve 3300 shows the TPR for n=1,000. A second curve 3302 shows the TPR for n=500. A third curve 3304 shows the TPR for n=100. A fourth curve 3306 shows the TPR for n=20. A fifth curve 3308 shows the TPR for n=10.

Figure 34:
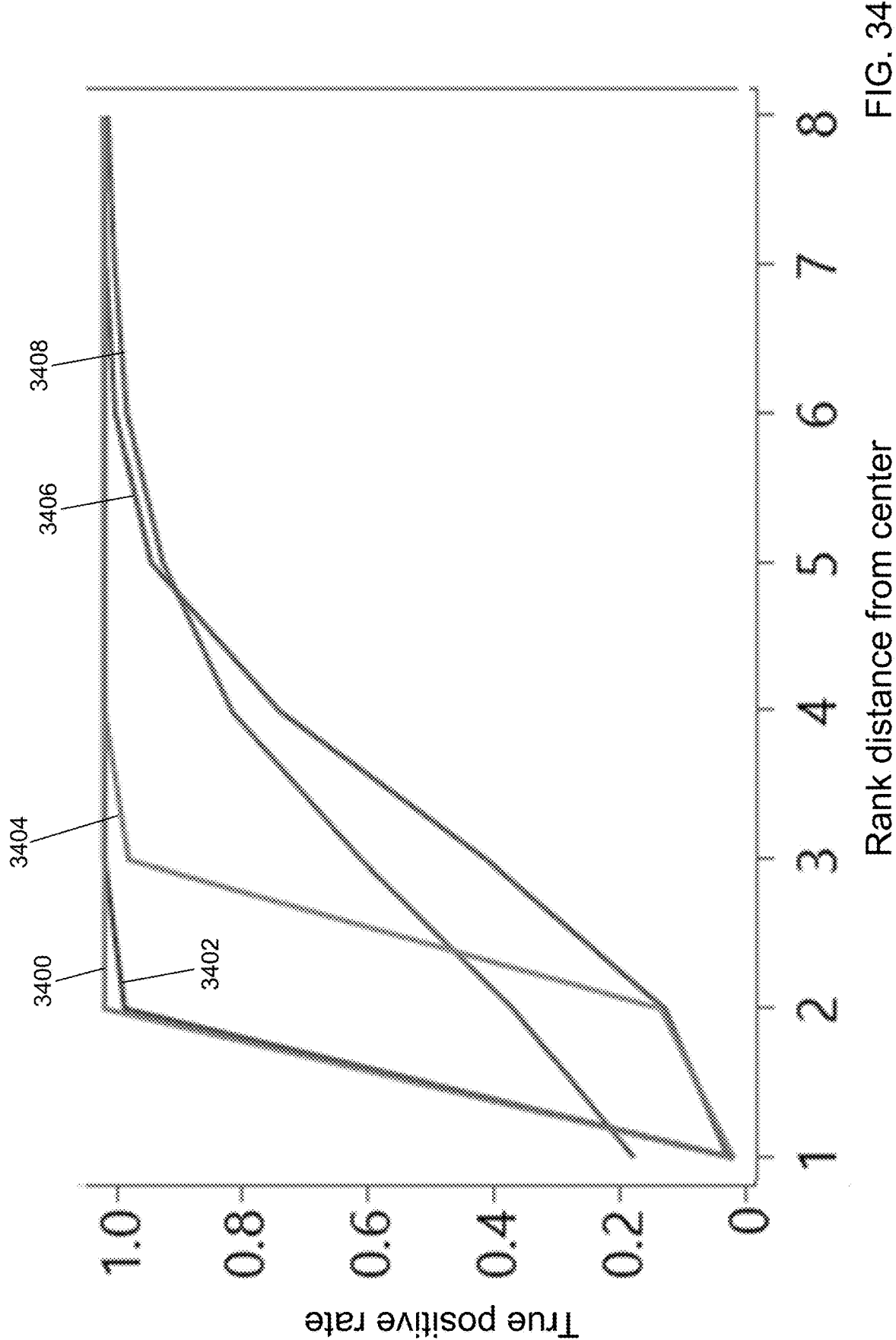
FIG. 34 shows a true positive rate as a function of a rank distance from a center computed using the prediction evaluation application with the first dataset, 20 explanatory variables, and a rank of 15 for samples sizes from 10 to 1,000.

Referring to FIG. 34, a true positive rate as a function of a rank distance from the center was computed using prediction evaluation application 122 with $X_{nxp}$ for p=20 explanatory variables and r=15. A first curve 3400 shows the TPR for n=1,000. A second curve 3402 shows the TPR for n=500. A third curve 3404 shows the TPR for n=100. A fourth curve 3406 shows the TPR for n=20. A fifth curve 3408 shows the TPR for n=10.

For all of the scenarios shown in FIGS. 31-34, the false positive rate was less than 0.05 so only the TPR for extrapolated points is shown. The grid points are ordered by the extent of extrapolation. The control limit is conservative so the TPR is low around a boundary between extrapolation and not extrapolation, but the TPR improves as the sample size increases. The TPR is high when n=10, even when p>n, which is possible through use of $\Sigma$ the regularized Schäfer/Strimmer covariance matrix estimator. Referring to FIG. 32, the TPR is low for n=20 and n=100, but the TPRs improve as the sample size increases. FIGS. 33 and 34 show how TPR is affected by varying the rank with fixed p. The TPR is better when the intrinsic dimensionality of the data is low.

To evaluate the extrapolation control performance of prediction evaluation application 122, a second simulation study was performed with a mix of continuous and categorical variables. An entirely continuous predictor matrix was simulated using $X_{nxp}=U_{nxr}D_{rxp}\ e_{nx1}$ as before. A number of variables were selected and transformed into a number of categorical variables $p_{cat}$ by randomly selecting a number of categories from two to four for each variable and using equally spaced quantiles to discretize each variable. 1,000 simulation replicates were performed.

Referring to FIG. 35A, a true positive rate as a function of a rank distance from the center was computed using prediction evaluation application 122 with $X_{nxp}$ for p=20 continuous explanatory variables, $p_{rat}=10$ categorical explanatory variables, and r=10. Half of the variables were categorical, and the rank of the predictor matrix was half of the number of variables. A first curve 3500 shows the TPR for n=1,000. A second curve 3502 shows the TPR for n=500.

A third curve 3504 shows the TPR for n=100. A fourth curve 3506 shows the TPR for n=20.

Figure 35B:
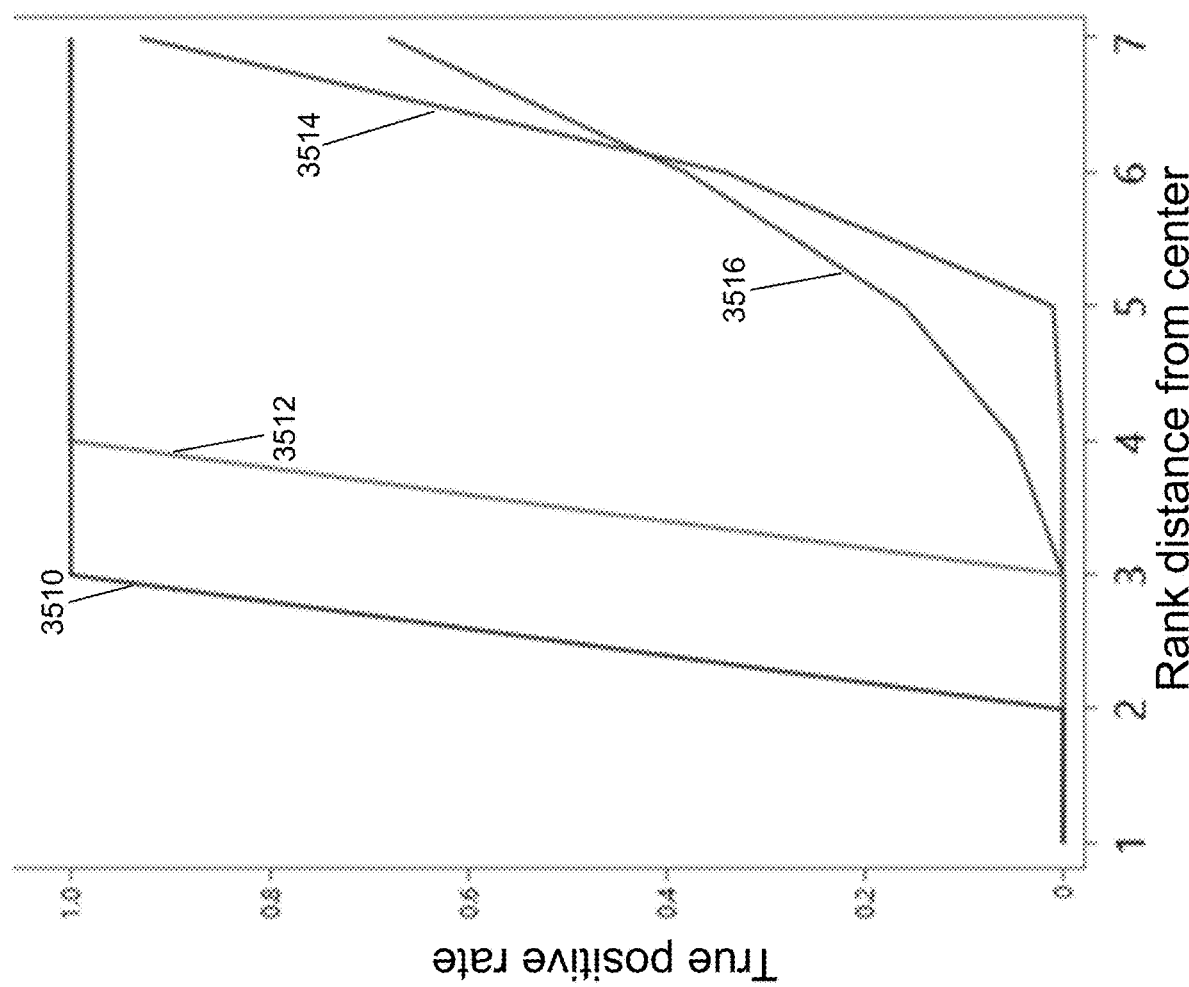
FIG. 35B shows a true positive rate as a function of a rank distance from a center computed using the prediction evaluation application with the first dataset, 50 explanatory variables 25 of which are categorical variables, and a rank of 25 for samples sizes from 20 to 1,000.

Referring to FIG. 35B, a true positive rate as a function of a rank distance from the center was computed using prediction evaluation application 122 with $X_{n \times p}$ for p=50 continuous explanatory variables, $p_{rat}$=25 categorical explanatory variables, and r=25. Half of the variables were categorical, and the rank of the predictor matrix was half of the number of variables. A first curve 3510 shows the TPR for n=1,000. A second curve 3512 shows the TPR for n=500. A third curve 3514 shows the TPR for n=100. A fourth curve 3516 shows the TPR for n=20.

Referring to FIG. 35A, high TPRs were obtained for points that are at least moderately extrapolated, but the problem becomes more challenging when p>n.

Figure 36:
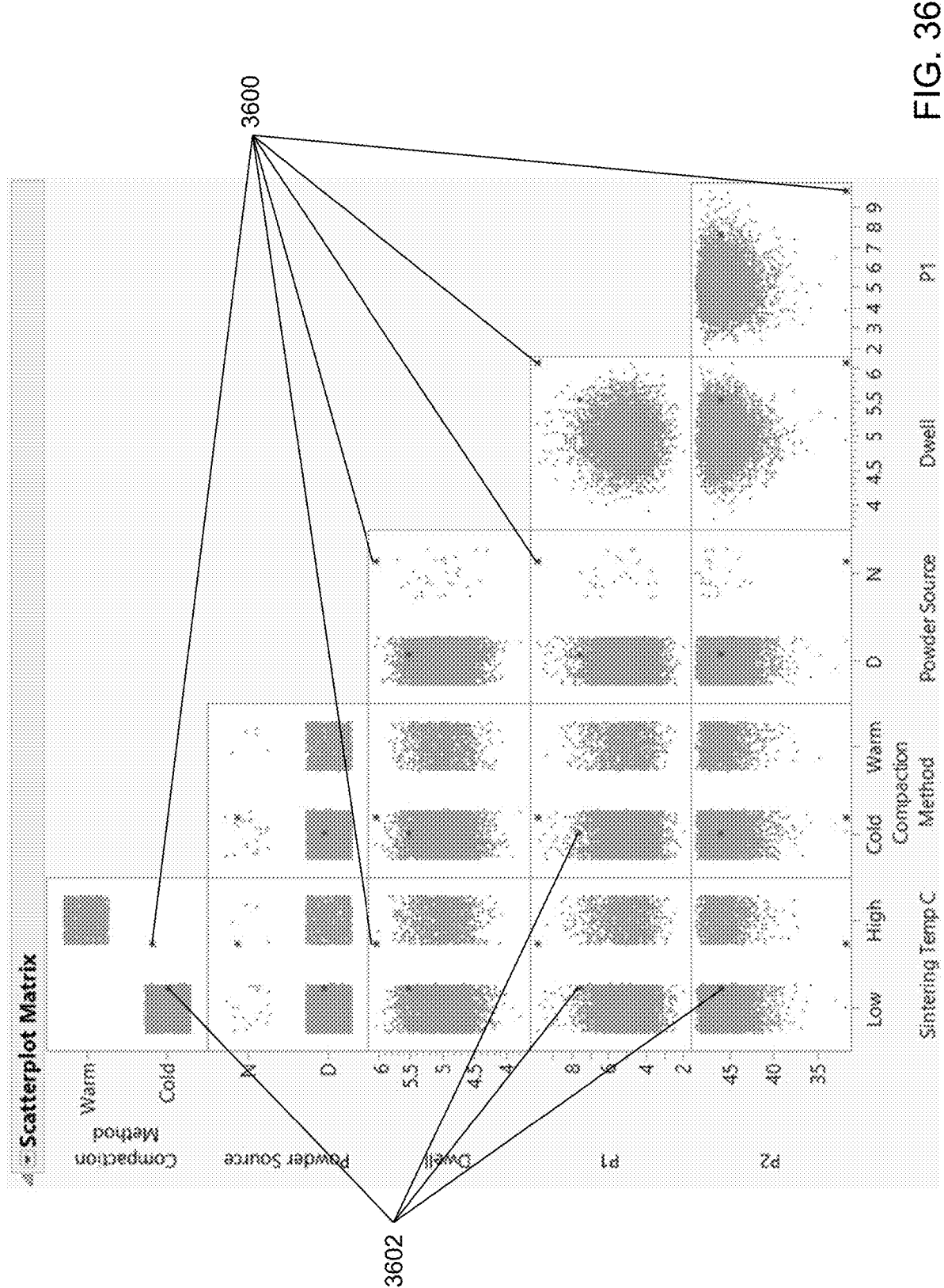
FIG. 36 shows an example of an optimal prediction point computed using a neural network without extrapolation and with extrapolation control.

To evaluate the extrapolation control performance of prediction evaluation application 122, a neural network model was trained using metallurgy data, named "Powder Metallurgy", as input dataset 124. Since neural network supports a categorical response, both response variables shrinkage, which is a continuous response, and surface condition, which is a categorical response indicating whether the product was a failure or not, were modeled to demonstrate extrapolation control in a multivariate response setting. 10 percent of the data cells were removed at random to simulate missing data. The neural network was trained and desirability optimized with extrapolation control on and off. Referring to FIG. 36, shows unconstrained solution points 3600 and constrained solution points 3602. The constrained solution points 3602 remain within the correlation structure of all of the variables while the unconstrained solution points 3600 violate the correlation structure of many of the variables.

Figure 37:
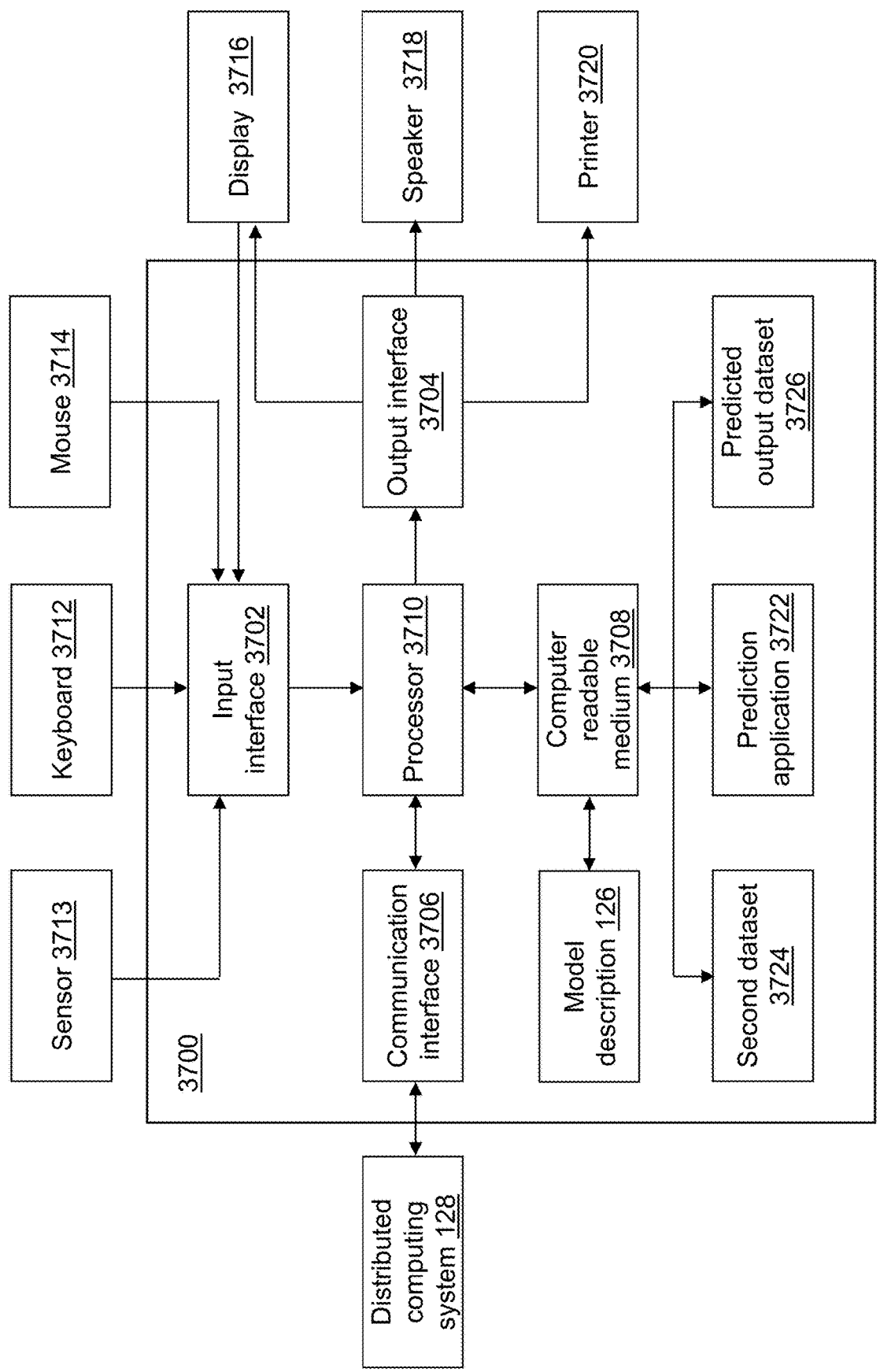
FIG. 37 depicts a block diagram of a prediction device that uses a selected model to predict a result in accordance with an illustrative embodiment.

Referring to FIG. 37, a block diagram of a prediction device 3700 is shown in accordance with an illustrative embodiment. Prediction device 3700 may include a second input interface 3702, a second output interface 3704, a second communication interface 3706, a second non-transitory computer-readable medium 3708, a second processor 3710, a prediction application 3722, model description 126, second dataset 3724, and predicted output dataset 3728. Fewer, different, and/or additional components may be incorporated into prediction device 3700. Prediction device 3700 and prediction evaluation device 100 may be the same or different devices.

Second input interface 3702 provides the same or similar functionality as that described with reference to input interface 102 of prediction evaluation device 100 though referring to prediction device 3700. Second output interface 3704 provides the same or similar functionality as that described with reference to output interface 104 of prediction evaluation device 100 though referring to prediction device 3700. Second communication interface 3706 provides the same or similar functionality as that described with reference to communication interface 106 of prediction evaluation device 100 though referring to prediction device 3700. Data and messages may be transferred between prediction device 3700 and distributed computing system 128 using second communication interface 3706. Second computer-readable medium 3708 provides the same or similar functionality as that described with reference to computer-readable medium 108 of prediction evaluation device 100 though referring to prediction device 3700. Second processor 3710 provides the same or similar functionality as that described with reference to processor 110 of prediction evaluation device 100 though referring to prediction device 3700.

Prediction application 3722 performs operations associated with predicting values for response variable Y using model description 126 based on values for the explanatory variable X stored in second dataset 3724. Dependent on the type of data stored in input dataset 124 and second dataset 3724, prediction application 3722 may identify anomalies as part of process control, for example, of a manufacturing process, for machine condition monitoring, for example, an electro-cardiogram device, etc. Some or all of the operations described herein may be embodied in prediction application 3722. The operations may be implemented using hardware, firmware, software, or any combination of these methods.

Referring to the example embodiment of FIG. 37, prediction application 3722 is implemented in software (comprised of computer-readable and/or computer-executable instructions) stored in second computer-readable medium 3708 and accessible by second processor 3710 for execution of the instructions that embody the operations of prediction application 3722. Prediction application 3722 may be written using one or more programming languages, assembly languages, scripting languages, etc. Prediction application 3722 may be integrated with other analytic tools. For example, prediction application 3722 may be implemented using or integrated with one or more SAS software tools such as JMP®, Base SAS, SAS/STAT®, of SAS® Enterprise Miner™ SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. One or more operations of prediction application 3722 further may be performed by an ESPE. Prediction application 3722 and prediction evaluation application 122 further may be integrated applications.

Prediction application 3722 may be implemented as a Web application. Prediction application 3722 may be integrated with other system processing tools to automatically process data generated as part of operation of an enterprise using second input interface 3702, second output interface 3704, and/or second communication interface 3706 so that appropriate action can be initiated in response. For example, a warning or an alert may be presented using a second display 3716, a second speaker 3718, a second printer 3720, etc. or sent to one or more computer-readable media, display, speaker, printer, etc. of distributed computing system 128 based on predicted values for response variable Y.

Input dataset 124 and second dataset 3724 may be generated, stored, and accessed using the same or different mechanisms. Similar to input dataset 124, second dataset 3724 may include a plurality of rows and a plurality of columns with the plurality of rows referred to as observation vectors or records, and the columns referred to as variables that are associated with an observation. Second dataset 3724 may be transposed.

Similar to input dataset 124, second dataset 3724 may be stored on second computer-readable medium 3708 or on one or more computer-readable media of distributed computing system 128 and accessed by prediction device 3700 using second communication interface 3706. Data stored in second dataset 3724 may be a sensor measurement or a data communication value, for example, from a sensor 3713, may be generated or captured in response to occurrence of an event or a transaction, generated by a device such as in response to an interaction by a user with the device, for example, from a second keyboard 3712 or a second mouse 3714, etc. The data stored in second dataset 3724 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second dataset 3724 may be captured at different time points periodically, intermittently, when an event occurs, etc. One or more columns may include a time value. Similar to input dataset 124, data stored in second dataset 3724 may be generated as part of the IoT, and some or all data may be pre- or post-processed by an ESPE.

Similar to input dataset 124, second dataset 3724 may be stored in various compressed formats such as a coordinate format, a compressed sparse column format, a compressed sparse row format, etc. Second dataset 3724 further may be stored using various structures as known to those skilled in the art including a file system, a relational database, a system of tables, a structured query language database, etc. on prediction evaluation device 100, on prediction device 3700, and/or on distributed computing system 128. Prediction device 3700 and/or distributed computing system 128 may coordinate access to second dataset 3724 that is distributed across a plurality of computing devices. For example, second dataset 3724 may be stored in a cube distributed across a grid of computers as understood by a person of skill in the art. As another example, second dataset 3724 may be stored in a multi-node Hadoop® cluster. As another example, second dataset 3724 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in second dataset 3724.

Figure 38:
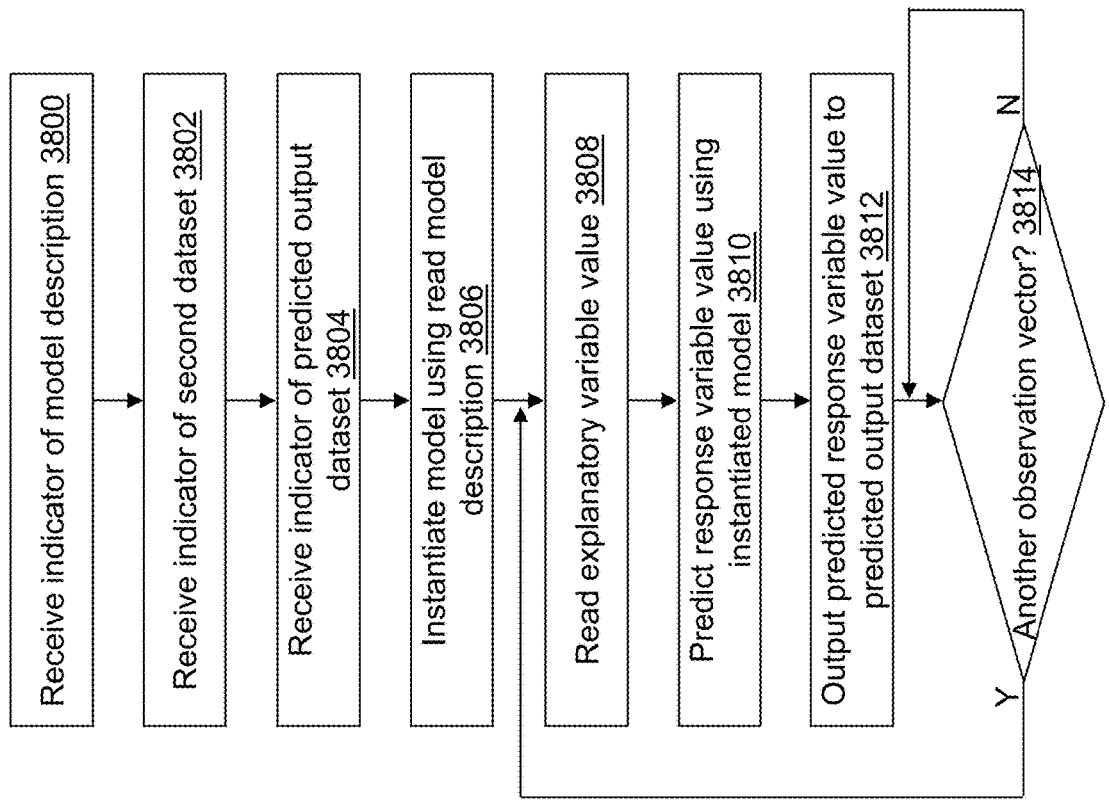
FIG. 38 depicts a flow diagram illustrating examples of operations performed by the prediction device of FIG. 37 in accordance with an illustrative embodiment.

Referring to FIG. 38, example operations of prediction application 3722 are described. Additional, fewer, or different operations may be performed depending on the embodiment of prediction application 3722. The order of presentation of the operations of FIG. 38 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 3800, a seventh indicator may be received that indicates model description 126. For example, the seventh indicator indicates a location and a name of model description 126. As an example, the seventh indicator may be received by prediction application 3722 after selection from a user interface window or after entry by a user into a user interface window. In an alternative embodiment, model description 126 may not be selectable. For example, a most recently created model description may be used automatically.

In an operation 3802, an eighth indicator may be received that indicates second dataset 3724. For example, the eighth indicator indicates a location and a name of second dataset 3724. As an example, the eighth indicator may be received by prediction application 3722 after selection from a user interface window or after entry by a user into a user interface window. In an alternative embodiment, second dataset 3724 may not be selectable. For example, a most recently created dataset may be used automatically.

In an operation 3804, a ninth indicator may be received that indicates predicted output dataset 3728. For example, the ninth indicator indicates a location and a name of predicted output dataset 3728. As an example, the ninth indicator may be received by prediction application 3722 after selection from a user interface window or after entry by a user into a user interface window. In an alternative embodiment, predicted output dataset 3728 may not be selectable. For example, a default name and location for predicted output dataset 3728 may be used automatically.

In an operation 3806, a model is instantiated based on the model description read from model description 126.

In an operation 3808, a value x for the explanatory variable X is read from a next line of second dataset 3724 or optionally is received from an ESPE.

In an operation 3810, a value y for the response variable Y is predicted using the instantiated model and the read value x.

In an operation 3812, the predicted value y for the response variable Y is output to predicted output dataset 3728. The value x and/or other values read from second dataset 3724 further may be output to predicted output dataset 3728.

In an operation 3814, a determination is made concerning whether there is another observation vector to process. When there is another observation vector to process, processing continues in operation 3808. When there is not another observation vector to process, processing continues in operation 3814 to wait for receipt of another observation vector, for example, from an ESPE, or processing is done.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

read a dataset that includes a plurality of observation vectors, wherein each observation vector includes an explanatory variable value for each of a plurality of explanatory variables and a response variable value of a response variable;

compute an extrapolation threshold value using an extrapolation threshold function with the explanatory variable value of each of the plurality of explanatory variables read for each observation vector;

fit a model to the plurality of observation vectors to describe the response variable value as a function of the explanatory variable value for each of the plurality of explanatory variables of each observation vector;

present fit model results in a window of a display, wherein the fit model results include a first value for each of the plurality of explanatory variables;

receive an indicator of a second value of at least one of the explanatory variables that is different from the first value of a respective explanatory variable;

compute an extrapolation value using an extrapolation function with the second value of the respective explanatory variable and the first value of others of the plurality of explanatory variables;

compare the computed extrapolation value to the computed extrapolation threshold value; and present an extrapolation indicator in the window of the display when the comparison indicates that the second value of the respective explanatory variable is an extrapolation relative to the explanatory variable value of each of the plurality of explanatory variables read for each observation vector.

2. The non-transitory computer-readable medium of claim 1, wherein the extrapolation threshold value is computed using $T=k_1 h_f$, where T is the extrapolation threshold value, $k_1$ is a predefined multiplier value, $h_f = x^T {}_f (X^T X) x_f$, $x_f$ is the explanatory variable value of each of the plurality of explanatory variables for an observation vector of the plurality of observation vectors that is a farthest distance from a center of the explanatory variable value of each of the plurality of explanatory variables read for each observation vector of the plurality of observation vectors, X is a design matrix that includes the explanatory variable value of each of the plurality of explanatory variables read for each observation vector of the plurality of observation vectors, and T indicates a transpose.

3. The non-transitory computer-readable medium of claim 1, wherein the extrapolation threshold value is computed using $T=k_2 p/n$, where T is the extrapolation threshold value, $k_2$ is a predefined multiplier value, p is a number of model parameters, and n is a number of the plurality of observation vectors.

4. The non-transitory computer-readable medium of claim 1, wherein the extrapolation threshold value is computed using $T=\overline{H}^2 + k_3 \sigma_H$, where T is the extrapolation threshold value, $\overline{H}^2$ is an average of a Hotelling's $T^2$ value, $\sigma_H$ is a standard deviation of the Hotelling's $T^2$ value, and $k_3$ is a predefined multiplier value.

5. The non-transitory computer-readable medium of claim 4, wherein the average of the Hotelling's $T^2$ value is computed using $$\overline{H}^2 = \frac{1}{n}\sum_{i=1}^{n}(x_i - \mu)^T {\sum}^{-1}(x_i - \mu),$$

where n indicates a number of the plurality of observation vectors, $x_i$ indicates $i^{th}$ explanatory variable values of the plurality of observation vectors, $$\mu = \frac{1}{n}\sum_{i=1}^{n} x_i,$$

T indicates a transpose, and $\Sigma$ is a sample covariance matrix computed for the explanatory variable value of each of the plurality of explanatory variables read for each observation vector of the plurality of observation vectors.

6. The non-transitory computer-readable medium of claim 4, wherein the standard deviation of the Hotelling's $T^2$ value is computed using $$\sigma_H = \sqrt{\frac{1}{n-1}\sum_{i=n}^{n}(T_i^2 - \overline{H}^2)^2},$$

where n indicates a number of the plurality of observation vectors, $x_i$ indicates $i^{th}$ explanatory variable values of the plurality of observation vectors, $$T_i^2 = (x_i - \mu)^T {\sum}^{-1}(x_i - \mu), \mu = \frac{1}{n}\sum_{i=1}^{n} x_i,$$

T indicates a transpose, and $\Sigma$ is a sample covariance matrix computed for the explanatory variable value of each of the plurality of explanatory variables read for each observation vector of the plurality of observation vectors.

7. The non-transitory computer-readable medium of claim 4, wherein the average of the Hotelling's $T^2$ value is computed using $$\overline{H}^2 = \frac{1}{n}\sum_{i=1}^{n}(x_i - \mu)^T {\sum}^{-1}(x_i - \mu),$$

where n indicates a number of the plurality of observation vectors, $x_i$ indicates $i^{th}$ explanatory variable values of the plurality of observation vectors, $$\mu = \frac{1}{n}\sum_{i=1}^{n} x_i,$$

T indicates a transpose, $\Sigma$ is a covariance matrix computed using $\Sigma=(1-\lambda)\Sigma'+\lambda D$, $\lambda$ is a predefined shrinkage intensity value, $\Sigma'$ is a pairwise covariance matrix, and D is a diagonal matrix.

8. The non-transitory computer-readable medium of claim 7, wherein the pairwise covariance matrix is computed using values for each pair of the plurality of explanatory variables that are not missing a value for either explanatory variable of a respective pair of the plurality of explanatory variables.

9. The non-transitory computer-readable medium of claim 8, wherein eigenvectors are computed from the pairwise covariance matrix and any eigenvectors with negative eigenvalues are removed from the pairwise covariance matrix before computing the covariance matrix.

10. The non-transitory computer-readable medium of claim 7, wherein the diagonal matrix has a sample variance computed for each explanatory variable included on a diagonal of the diagonal matrix with zeroes in off diagonal positions.

11. The non-transitory computer-readable medium of claim 10, wherein the diagonal entries are computed using all non-missing values for each explanatory variable.

12. The non-transitory computer-readable medium of claim 4, wherein the standard deviation of the Hotelling's $T^2$ value is computed using $$\sigma_H = \sqrt{\frac{1}{n-1}\sum_{i=n}^{n}(T_i^2 - \overline{H^2})^2},$$

where n indicates a number of the plurality of observation vectors, $x_i$ indicates $i^{th}$ explanatory variable values of the plurality of observation vectors, $T_i^2 = (x_i-\mu)^\top \Sigma^{-1}(x_i-\mu)$ $$\mu = \frac{1}{n}\sum_{i=1}^{n}x_i,$$

T indicates a transpose, and $\Sigma$ is a covariance matrix computed using $\Sigma=(1-\lambda)\Sigma'+\lambda D$, $\lambda$ is a predefined shrinkage intensity value, $\Sigma'$ is a pairwise covariance matrix, and D is a diagonal matrix.

13. The non-transitory computer-readable medium of claim 1, wherein the extrapolation value is computed using $h_{prd} = x_o^\top (X^\top X) x_o$, where $h_{prd}$ is the extrapolation value, $x_o$ is the second value of the respective explanatory variable and the first value of others of the plurality of explanatory variables, X is a design matrix that includes the explanatory variable value of each of the plurality of explanatory variables read for each observation vector of the plurality of observation vectors, and T indicates a transpose.

14. The non-transitory computer-readable medium of claim 1, wherein the extrapolation value is computed using $h_{prd} = (x_o-\mu)^\top \Sigma^{-1}(x_o-\mu)$, where $h_{prd}$ is the extrapolation value, $x_o$ is the second value of the respective explanatory variable and the first value of others of the plurality of explanatory variables, $$\mu = \frac{1}{n}\sum_{i=1}^{n}x_i,$$

n indicates a number of the plurality of observation vectors, $x_i$ indicates $i^{th}$ explanatory variable values of the plurality of observation vectors, T indicates a transpose, and $\Sigma$ is a sample covariance matrix computed for the explanatory variable value of each of the plurality of explanatory variables read for each observation vector of the plurality of observation vectors.

15. The non-transitory computer-readable medium of claim 1, wherein the extrapolation value is computed using $h_{prd} = (x_o-\mu)^\top \Sigma^{-1}(x_o-\mu)$, where $h_{prd}$ is the extrapolation value, $x_o$ is the second value of the respective explanatory variable and the first value of others of the plurality of explanatory variables, $$\mu = \frac{1}{n}\sum_{i=1}^{n}x_i,$$

indicates a number of the plurality of observation vectors, $x_i$ indicates $i^{th}$ explanatory variable values of the plurality of observation vectors, T indicates a transpose, and $\Sigma$ is a covariance matrix computed using $\Sigma=(1-\lambda)\Sigma'+\lambda D$, $\lambda$ is a predefined shrinkage intensity value, $\Sigma'$ is a pairwise covariance matrix, and D is a diagonal matrix.

16. The non-transitory computer-readable medium of claim 15, wherein the pairwise covariance matrix is computed using values for each pair of the plurality of explanatory variables that are not missing a value for either explanatory variable of a respective pair of the plurality of explanatory variables.

17. The non-transitory computer-readable medium of claim 16, wherein eigenvectors are computed from the pairwise covariance matrix and any eigenvectors with negative eigenvalues are removed from the pairwise covariance matrix before computing the covariance matrix.

18. The non-transitory computer-readable medium of claim 15, wherein the diagonal matrix has a variance computed for each explanatory variable included on a diagonal of the diagonal matrix with zeroes in off diagonal positions.

19. The non-transitory computer-readable medium of claim 18, wherein the diagonal entries are computed using all non-missing values for each explanatory variable.

20. The non-transitory computer-readable medium of claim 1, wherein the extrapolation indicator is a warning of the extrapolation.

21. The non-transitory computer-readable medium of claim 1, wherein the extrapolation indicator includes a range of non-extrapolated values computed for each explanatory variable of the plurality of explanatory variables using the extrapolation function.

22. The non-transitory computer-readable medium of claim 21, wherein the range of non-extrapolated values are included on a profile trace graph computed for each explanatory variable of the plurality of explanatory variables using the extrapolation function.

23. The non-transitory computer-readable medium of claim 1, wherein the computer-readable instructions further cause the computing device to:
read a second explanatory variable value from a scoring dataset;
compute a new response variable value using parameters that describe the fit model with the read, second explanatory variable value; and
output the computed new response variable value.

24. A computing device comprising:
a processor; and
a non-transitory computer-readable medium operably coupled to the processor, the computer-readable medium having computer-readable instructions stored thereon that, when executed by the processor, cause the computing device to
read a dataset that includes a plurality of observation vectors, wherein each observation vector includes an explanatory variable value for each of a plurality of explanatory variables and a response variable value of a response variable;
compute an extrapolation threshold value using an extrapolation threshold function with the explanatory variable value of each of the plurality of explanatory variables read for each observation vector;
fit a model to the plurality of observation vectors to describe the response variable value as a function of the explanatory variable value for each of the plurality of explanatory variables of each observation vector;
present fit model results in a window of a display, wherein the fit model results include a first value for each of the plurality of explanatory variables;

receive an indicator of a second value of at least one of the explanatory variables that is different from the first value of a respective explanatory variable;

compute an extrapolation value using an extrapolation function with the second value of the respective explanatory variable and the first value of others of the plurality of explanatory variables;

compare the computed extrapolation value to the computed extrapolation threshold value; and present an extrapolation indicator in the window of the display when the comparison indicates that the second value of the respective explanatory variable is an extrapolation relative to the explanatory variable value of each of the plurality of explanatory variables read for each observation vector.

25. A method of providing interactive prediction evaluation, the method comprising:

reading, by a computing device, a dataset that includes a plurality of observation vectors, wherein each observation vector includes an explanatory variable value for each of a plurality of explanatory variables and a response variable value of a response variable;

computing, by the computing device, an extrapolation threshold value using an extrapolation threshold function with the explanatory variable value of each of the plurality of explanatory variables read for each observation vector;

fitting, by the computing device, a model to the plurality of observation vectors to describe the response variable value as a function of the explanatory variable value for each of the plurality of explanatory variables of each observation vector;

presenting, by the computing device, fit model results in a window of a display, wherein the fit model results include a first value for each of the plurality of explanatory variables;

receiving, by the computing device, an indicator of a second value of at least one of the explanatory variables that is different from the first value of a respective explanatory variable;

computing, by the computing device, an extrapolation value using an extrapolation function with the second value of the respective explanatory variable and the first value of others of the plurality of explanatory variables;

comparing, by the computing device, the computed extrapolation value to the computed extrapolation threshold value; and presenting, by the computing device, an extrapolation indicator in the window of the display when the comparison indicates that the second value of the respective explanatory variable is an extrapolation relative to the explanatory variable value of each of the plurality of explanatory variables read for each observation vector.

26. The method of claim 25, wherein the extrapolation threshold value is computed using $T=k_1 h_f$, where T is the extrapolation threshold value, $k_1$ is a predefined multiplier value, $h_f = x_f^T (X^T X) x_f$, $x_f$ is the explanatory variable value of each of the plurality of explanatory variables for an observation vector of the plurality of observation vectors that is a farthest distance from a center of the explanatory variable value of each of the plurality of explanatory variables read for each observation vector of the plurality of observation vectors, X is a design matrix that includes the explanatory variable value of each of the plurality of explanatory variables read for each observation vector of the plurality of observation vectors, and T indicates a transpose.

27. The method of claim 25, wherein the extrapolation threshold value is computed using $T=k_2 p/n$, where T is the extrapolation threshold value, $k_2$ is a predefined multiplier value, p is a number of model parameters, and n is a number of the plurality of observation vectors.

28. The method of claim 25, wherein the extrapolation threshold value is computed using $T=\overline{H}+k_3 \sigma_H$, where T is the extrapolation threshold value, $\overline{H}^2$ is an average of a Hotelling's $T^2$ value, $\sigma_H$ is a standard deviation of the Hotelling's $T^2$ value, and $k_3$ is a predefined multiplier value.

29. The method of claim 28, wherein the average of the Hotelling's $T^2$ value is computed using $$\overline{H}^2 = \frac{1}{n}\sum_{i=1}^{n}(x_i - \mu)^T \Sigma^{-1}(x_i - \mu),$$

where n indicates a number of the plurality of observation vectors, $x_i$ indicates $i^{th}$ explanatory variable values of the plurality of observation vectors, $$\mu = \frac{1}{n}\sum_{i=1}^{n}x_i,$$

T indicates a transpose, $\Sigma$ is a covariance matrix computed using $\Sigma=(1-\lambda)\Sigma'+\lambda D$, $\lambda$ is a predefined shrinkage intensity value, $\Sigma'$ is a pairwise covariance matrix, and D is a diagonal matrix.

30. The method of claim 25, wherein the extrapolation value is computed using $h_{prd}=x_o^T (X^T X) x_o$, where $h_{prd}$ is the extrapolation value, $x_o$ is the second value of the respective explanatory variable and the first value of others of the plurality of explanatory variables, X is a design matrix that includes the explanatory variable value of each of the plurality of explanatory variables read for each observation vector of the plurality of observation vectors, and T indicates a transpose.

* * * * *

UNITED STATES PATENT AND TRADEMARK OFFICE
CERTIFICATE OF CORRECTION

PATENT NO. : 10,963,804 B1
APPLICATION NO. : 17/130008
DATED : March 30, 2021
INVENTOR(S) : Jeremy Ryan Ash et al.

Page 1 of 2

It is certified that error appears in the above-identified patent and that said Letters Patent is hereby corrected as shown below:

In the Specification

Column 10, Line 27:

Delete the phrase "$h_f = x_f^T (X^T X) x_f$," and replace with -- $h_f = x_f^T(X^T X)x_f,$ --.

Column 11, Line 22:

Delete the phrase "$T_i^2 = (x_i - \mu)^T \Sigma^{-1} (x_i - \mu)$." and replace with -- $T_i^2 = (x_i - \mu)^T \Sigma^{-1}(x_i - \mu).$ --.

Column 14, Line 63:

Delete the phrase "$h_{prd} = x_o^T(X^T X)x_o$," and replace with -- $h_{prd} = x_o^T(X^T X)x_o,$ --.

Column 16, Line 42:

Delete the phrase "$h_{prd} = x_o^T (X^T X)x_o$;" and replace with -- $h_{prd} = x_o^T(X^T X)x_o;$ --.

Column 19, Line 57:

Delete the phrase "$T_{prd}^2$" and replace with -- $T_{prd}^2$ --.

Column 19, Lines 60-61:

Delete the phrase "$P(T^2 \geq T_{prd}^2) < 0.05$" and replace with -- $P(T^2 \geq T_{prd}^2) < 0.05$ --.

Column 20, Line 63:
Delete the phrase "$p_{rat} = 10$" and replace with --$p_{cat} = 10$--.

Column 21, Line 6:
Delete the phrase "$p_{rat} = 25$" and replace with --$p_{cat} = 25$--.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,963,804 B1

In the Claims

Claim 2, Column 25, Line 24:
Delete the phrase "$h_f = x^{\mathsf{T}}{}_f (X^{\mathsf{T}} X) x_f, x_f$" and replace with --$h_f = x_f^{\mathsf{T}}(X^{\mathsf{T}}X)x_f, x_f$--.

Claim 12, Column 27, Line 13:
Delete the phrase "$T_i^2 = (x_i - \mu)^{\mathsf{T}} \Sigma^{-1} (x_i - \mu),$" and replace with --$T_i^2 = (x_i - \mu)^{\mathsf{T}} \Sigma^{-1}(x_i - \mu),$--.

Claim 13, Column 27, Line 35:
Delete the phrase "$h_{prd} = x_o^{\mathsf{T}} (X^{\mathsf{T}} X) x_o,$" and replace with --$h_{prd} = x_o^{\mathsf{T}}(X^{\mathsf{T}}X)x_o,$--.

Claim 26, Column 30, Line 4:
Delete the phrase "$h_f = x_f^{\mathsf{T}} (X^{\mathsf{T}}X)x_f,$" and replace with --$h_f = x_f^{\mathsf{T}}(X^{\mathsf{T}}X)x_f,$--.

Claim 28, Column 30, Line 20:
Delete the phrase "$T = \overline{H} + k_3 \sigma_H,$" and replace with --$T = \overline{H}^2 + k_3 \sigma_H,$--.

Claim 30, Column 30, Line 46:
Delete the phrase "$h_{prd} = x_o^{\mathsf{T}} (X^{\mathsf{T}} X) x_o,$" and replace with --$h_{prd} = x_o^{\mathsf{T}}(X^{\mathsf{T}}X)x_o,$--.